US007291410B2

(12) United States Patent
Kinkelaar et al.

(10) Patent No.: US 7,291,410 B2
(45) Date of Patent: Nov. 6, 2007

(54) ORIENTATION INDEPENDENT LIQUID FUEL RESERVOIR

(76) Inventors: Mark R. Kinkelaar, 60 Sean La., Glenmoore, PA (US) 19343; Kenneth P. Overk, 135 Voyager Dr., Deptford, NJ (US) 08096; Salvatore C. Panarello, 5 Clearbrook La., Sewell, NJ (US) 08080; Joseph W. Lovette, 1107 Musket Rd., Newark, DE (US) 19013; Roeland J. Tuinman, 1008 Farm La., West Chester, PA (US) 19382; Richard M. Good, 1632 Fairview Rd., Glenmoore, PA (US) 19343

( * ) Notice: Subject to any disclaimer, the term of this patent is extended or adjusted under 35 U.S.C. 154(b) by 645 days.

(21) Appl. No.: 10/665,719

(22) Filed: Sep. 22, 2003

(65) Prior Publication Data
US 2004/0155065 A1 Aug. 12, 2004

Related U.S. Application Data

(63) Continuation-in-part of application No. 10/329,776, filed on Dec. 27, 2002.

(60) Provisional application No. 60/460,406, filed on Apr. 7, 2003, provisional application No. 60/411,359, filed on Sep. 18, 2002, provisional application No. 60/411,353, filed on Sep. 18, 2002, provisional application No. 60/411,352, filed on Sep. 18, 2002.

(51) Int. Cl.
*H01M 8/00* (2006.01)
*H01M 2/02* (2006.01)
*H01M 2/08* (2006.01)
*H01M 2/14* (2006.01)

(52) U.S. Cl. .......................... 429/12; 429/34; 429/35; 429/38

(58) Field of Classification Search ................ 429/12, 429/34, 35, 38
See application file for complete search history.

(56) References Cited

U.S. PATENT DOCUMENTS 2,305,923 A 12/1942 Held (Continued)

FOREIGN PATENT DOCUMENTS

DE 2831 799 C2 8/1986

(Continued)

OTHER PUBLICATIONS

Derwent Patent Abstract of DE 2831799.

(Continued)

*Primary Examiner*—Dah-Wei Yuan
(74) *Attorney, Agent, or Firm*—Drinker Biddle & Reath LLP

(57) ABSTRACT

A fuel reservoir for a liquid fuel cell particularly useful for portable electronic devices or for a reformer, includes (a) a container defining a volume for holding a liquid fuel; (b) a wicking structure positioned within the volume and into which at least one portion of the liquid fuel wicks and from which said liquid fuel subsequently may be metered, such as by pumping; (c) a retainer to hold the wicking structure in a desired orientation within the container; and (d) an outlet for the liquid fuel that is in communication with the wicking structure. A method of dispensing liquid fuel and a method of assembling a fuel cartridge are also disclosed.

199 Claims, 39 Drawing Sheets

U.S. PATENT DOCUMENTS

| | | | |
|---|---|---|---|
| 2,339,366 A | 1/1944 | Williams | |
| 2,997,282 A | 8/1961 | Binter et al. | |
| 3,207,441 A | 9/1965 | Schreiber | |
| 3,334,789 A | 8/1967 | Kay et al. | |
| 3,396,923 A | 8/1968 | Windecker | |
| 3,428,222 A | 2/1969 | Wright | |
| 3,560,264 A | 2/1971 | Biddick | |
| 3,561,639 A | 2/1971 | Allen | 220/88 |
| 3,567,536 A | 3/1971 | Wickersham, Jr. | 156/78 |
| 3,615,845 A | 10/1971 | Gray | 136/86 |
| 3,650,431 A | 3/1972 | Stewart | 220/88 |
| 3,691,620 A | 9/1972 | Harr | 29/451 |
| 3,708,330 A | 1/1973 | Harr | 117/94 |
| 3,782,588 A | 1/1974 | Allen | 220/88 |
| 3,881,457 A | 5/1975 | Benner et al. | 123/136 |
| 3,896,964 A | 7/1975 | Takei et al. | 220/88 |
| 3,992,223 A | 11/1976 | Guthier | 429/14 |
| 4,007,058 A | 2/1977 | Nelson et al. | 429/34 |
| 4,035,551 A | 7/1977 | Grevstad | 429/44 |
| 4,175,165 A | 11/1979 | Adlhart | 429/30 |
| 4,179,027 A | 12/1979 | Weisberg | 206/205 |
| 4,294,279 A | 10/1981 | Wyeth | 137/264 |
| 4,303,755 A | 12/1981 | Yukuta et al. | 521/52 |
| 4,463,068 A | 7/1984 | Cohn et al. | 429/34 |
| 4,467,019 A | 8/1984 | Feigenbaum | 429/34 |
| 4,537,840 A | 8/1985 | Tsukui et al. | 429/33 |
| 4,615,455 A | 10/1986 | Tansill | 220/88 |
| 4,764,408 A | 8/1988 | Stedman et al. | 428/71 |
| 4,765,458 A | 8/1988 | Flanigen | 206/7 |
| 4,826,741 A | 5/1989 | Aldhart et al. | 429/19 |
| 4,855,194 A | 8/1989 | Wright | 429/38 |
| 4,876,162 A | 10/1989 | McElroy | 429/13 |
| 4,955,512 A * | 9/1990 | Sharples | 222/386.5 |
| 5,224,843 A | 7/1993 | Van Lintel | 417/413 |
| 5,288,159 A | 2/1994 | Wirt | 401/133 |
| 5,298,207 A | 3/1994 | Mifune et al. | 264/41 |
| 5,319,841 A | 6/1994 | Yata et al. | 29/451 |
| 5,358,799 A | 10/1994 | Gardner | |
| 5,374,711 A | 12/1994 | Toda et al. | 536/16.8 |
| 5,398,840 A | 3/1995 | Luhman et al. | 220/563 |
| 5,432,023 A | 7/1995 | Yamada et al. | 429/34 |
| 5,529,855 A | 6/1996 | Watanabe | 429/34 |
| 5,534,363 A | 7/1996 | Sprouse et al. | 429/34 |
| 5,544,785 A | 8/1996 | Frigiere | |
| 5,573,866 A | 11/1996 | Van Dine | |
| 5,599,638 A | 2/1997 | Surampudi et al. | 429/33 |
| 5,738,657 A * | 4/1998 | Bryant et al. | 604/145 |
| 5,759,712 A | 6/1998 | Hockaday | |
| 5,840,414 A | 11/1998 | Bett et al. | 428/307.7 |
| 6,020,089 A | 2/2000 | Harada et al. | 429/234 |
| 6,032,347 A | 3/2000 | Behr et al. | 29/419.1 |
| 6,054,228 A | 4/2000 | Cisar et al. | 429/18 |
| 6,117,592 A | 9/2000 | Hoshino et al. | 429/235 |
| 6,326,097 B1 * | 12/2001 | Hockaday | 429/34 |
| 6,334,674 B1 | 1/2002 | Ono et al. | 347/86 |
| 6,460,733 B2 | 10/2002 | Acker et al. | |
| 6,460,985 B1 * | 10/2002 | Olsen et al. | 347/86 |
| 6,506,513 B1 | 1/2003 | Yonetsu et al. | |
| 6,597,990 B2 | 7/2003 | Brown | 48/174 |
| 6,652,080 B2 * | 11/2003 | Childs et al. | 347/85 |
| 6,662,964 B2 * | 12/2003 | Higuchi | 220/667 |
| 2001/0049045 A1 | 12/2001 | Hockaday et al. | 429/34 |
| 2001/0051293 A1 | 12/2001 | Narayanan et al. | 429/34 |
| 2002/0157655 A1 | 10/2002 | Streib | |
| 2003/0008193 A1 | 1/2003 | Kinkelaar et al. | |
| 2003/0142178 A1 | 7/2003 | McKinnell et al. | |
| 2003/0162070 A1 | 8/2003 | Hirsch et al. | |
| 2004/0001987 A1 | 1/2004 | Kinkelaar et al. | |
| 2004/0126643 A1 | 7/2004 | Kinkelaar et al. | |
| 2004/0154690 A1 | 8/2004 | Gerhardt et al. | |

FOREIGN PATENT DOCUMENTS

| | | |
|---|---|---|
| DE | 39 07 819 C2 | 7/1991 |
| EP | 0 100 530 A2 | 2/1984 |
| EP | 0 107 396 B1 | 8/1988 |
| EP | 1 087 455 | 3/2001 |
| EP | 1 077 131 B1 | 7/2003 |
| JP | 57-080673 | 5/1982 |
| JP | 59-066066 | 4/1984 |
| JP | 6-275284 | 9/1994 |
| JP | 2001-102069 | 4/2001 |
| JP | 2001-313046 | 11/2001 |
| KR | 2000-0025190 | 5/2000 |
| WO | WO 98/21774 | 5/1998 |
| WO | WO 01/39300 A2 | 5/2001 |
| WO | WO 01/39307 A2 | 5/2001 |
| WO | WO 01/45189 A1 | 6/2001 |
| WO | WO 01/59865 A1 | 8/2001 |
| WO | WO 01/97314 A1 | 12/2001 |

OTHER PUBLICATIONS

Derwent Patent Abstract of DE 3907819.

Patent Abstracts of Japan of Publication No. 57-080673.

Korean Patent Abstracts of 000025190 A.

Patent Abstracts of Japan of Publication No. 59-066066.

Hallmark, J., "Miniature Fuel Cell Solutions for Portable Applications", Power 2000 Manufacturing Conference, San Diego, CA (Sep. 24-27, 2000), 9 pages.

Smotkin, E., "Direct Methanol Fuel Cell Catalysis", Knowledge Foundation's Small Fuel Cells and Battery Technologies for Portable Power Applications Conference Washington DC (Apr. 24, 2001), 11 pages.

Halpert, G., "The Direct Methanol Fuel Cell Prospects for Commercialization", The Road to Methanol Fuel Cell Vehicles A National Forum, Washington DC (Feb. 4-5, 1999), 19 pages.

Hallmark, J., "Motorola's Small Fuel Cell Program", Fuel Cell Catalyst, vol. 1, No. 3 (Spring 2001), 4 pages.

Ashley, S., "Fuel Cells Start to Look Real" Automotive Engineering International (Mar. 2001) pp. 64-80 (Automotive Engineering International Online at www.sae.org/automag/features/fuelcells).

Thomas, S. and Zalbowitz, M., "Fuel Cells—Green Power", Los Alamos National Laboratory (1999) 36 pages.

* cited by examiner

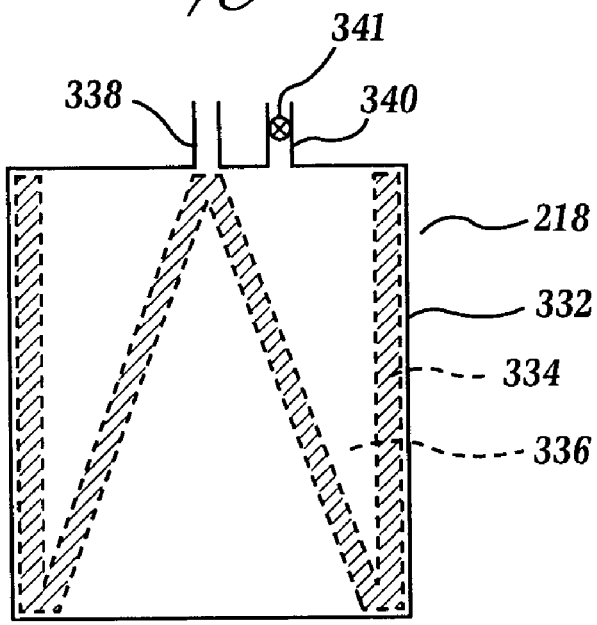
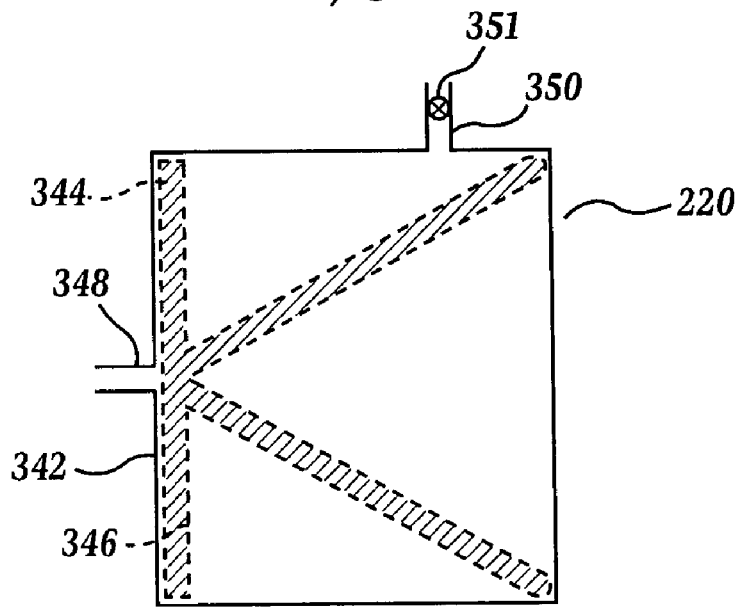

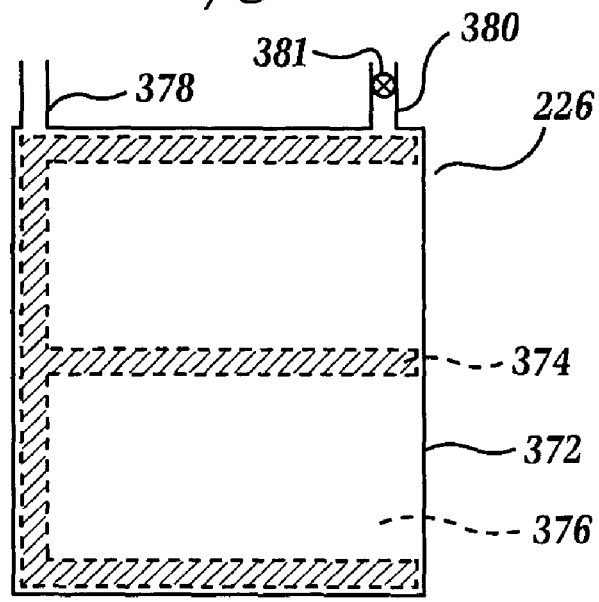
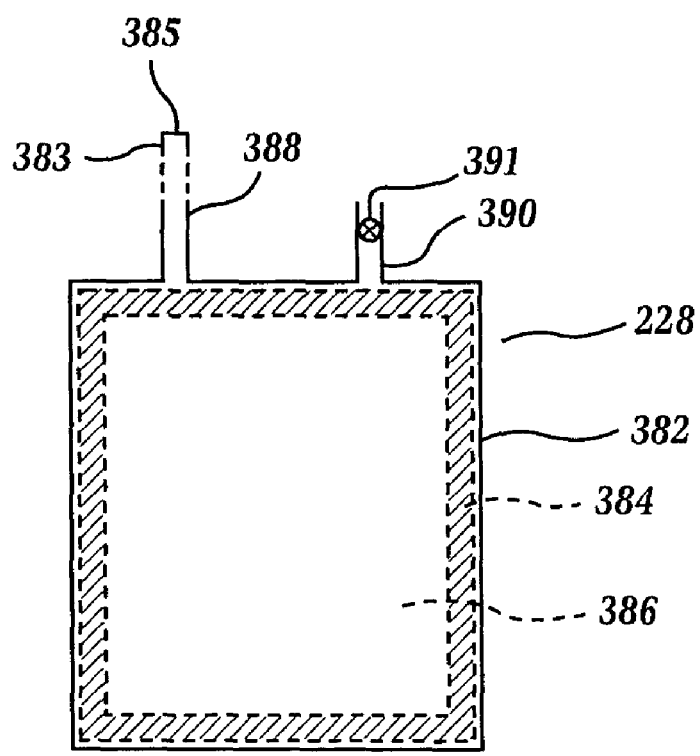

ORIENTATION INDEPENDENT LIQUID FUEL RESERVOIR

CROSS-REFERENCE TO RELATED APPLICATIONS

The instant application claims the benefit of U.S. Provisional Patent Application Nos. 60/411,352, 60/411,353, and 60/411,359, all filed on Sep. 18, 2002, as well as U.S. Provisional Patent Application No. 60/460,406 filed on Apr. 7, 2003. The disclosures of all these provisional applications are incorporated by reference. The instant application is also a continuation-in-part application of U.S. Non-Provisional patent application Ser. No. 10/329,776, filed on Dec. 27, 2002, the disclosure of which is also herein incorporated by reference.

This invention relates to liquid fuel cells in which the liquid fuel is directly oxidized at the anode. In particular, it relates to the reservoir for holding and metering or delivering the liquid fuel to the anode of a liquid fuel cell. This invention also relates to liquid fuel feed systems for micro fuel cell reformers.

BACKGROUND OF THE INVENTION

Electrochemical fuel cells convert reactants, namely fuel and oxidants, to generate electric power and reaction products. Electrochemical fuel cells generally employ an electrolyte disposed between two electrodes (an anode and a cathode). An electrocatalyst is needed to induce the desired electrochemical reactions at the electrodes. Liquid feed solid polymer fuel cells operate in a temperature range of from about 0° C. to the boiling point of the fuel, i.e., for methanol about 65° C., and are particularly preferred for portable applications. Solid polymer fuel cells include a membrane electrode assembly ("MEA"), which comprises a solid polymer electrolyte or proton-exchange membrane, sometimes abbreviated "PEM", disposed between two electrode layers. Flow field plates for directing the reactants across one surface of each electrode are generally disposed on each side of the membrane electrode assembly. There is typically a backing layer (or gas diffusion layer) between the flow field plate and the MEA.

A broad range of reactants have been contemplated for use in solid polymer fuel cells, and such reactants may be delivered in gaseous or liquid streams. The oxidant stream may be substantially pure oxygen gas, but preferably a dilute oxygen stream such as found in air, is used. The fuel stream may be substantially pure hydrogen gas, or a liquid organic fuel mixture. A fuel cell operating with a liquid fuel stream wherein the fuel is reacted electrochemically at the anode (directly oxidized) is known as a direct liquid feed fuel cell.

A direct methanol fuel cell ("DMFC") is one type of direct liquid feed fuel cell in which the fuel (liquid methanol) is directly oxidized at the anode. The following reactions occur:

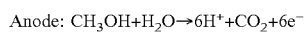

Anode: $CH_3OH + H_2O \rightarrow 6H^+ + CO_2 + 6e^-$

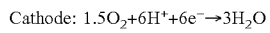

Cathode: $1.5O_2 + 6H^+ + 6e^- \rightarrow 3H_2O$

The hydrogen ions ($H^+$) pass through the membrane and combine with oxygen and electrons on the cathode side producing water. Electrons ($e^-$) cannot pass through the membrane, and therefore are collected and flow from the anode to the cathode through an external circuit driving an electric load that consumes the power generated by the cell. The products of the reactions at the anode and cathode are carbon dioxide ($CO_2$) and water ($H_2O$), respectively. The open circuit voltage from a single cell is about 0.7 to 1 volt. Several direct methanol fuel cells are connected in series to obtain greater voltage.

Other liquid fuels may be used in direct liquid fuel cells besides methanol—e.g., other simple alcohols, such as ethanol or ethylene glycol, or dimethoxymethane, trimethoxymethane, hydrazine and formic acid. Further, the oxidant may be provided in the form of an organic fluid having a high oxygen concentration—i.e., a hydrogen peroxide solution.

A direct methanol fuel cell may be operated on aqueous methanol vapor, but most commonly a liquid feed of a diluted aqueous methanol fuel mixture is used. It is important to maintain separation between the anode and the cathode to prevent fuel from directly contacting the cathode and oxidizing thereon (called "cross-over"). Cross-over results in a short circuit in the cell since the electrons resulting from the oxidation reaction do not follow the current path between the electrodes. To reduce the potential for cross-over of methanol fuel from the anode to the cathode side through the MEA, very dilute aqueous mixtures of methanol (for example, about 5 percent of methanol in water, wherein the methanol concentration is expressed in methanol weight as percent of the total weight of the aqueous mixture) are typically used as the fuel streams in liquid feed DMFCs.

The proton exchange membrane (PEM) is a solid, organic polymer, usually polyperfluorosulfonic acid, that comprises the inner core of the membrane electrode assembly (MEA). Commercially available polyperfluorosulfonic acids for use as PEM are sold by E.I. DuPont de Nemours & Company under the trademark NAFION®. Alternatively, composites of porous polymeric membranes impregnated with perfluoro ion exchange polymers, such as offered by W.L. Gore & Associates, Inc., can be used as the proton exchange membranes. The PEM must be hydrated to function properly as a proton (hydrogen ion) exchange membrane and as an electrolyte.

For efficient function of the fuel cell, the liquid fuel should be controllably metered or delivered to the anode side. The problem is particularly acute for fuel cells intended to be used in portable applications, such as in consumer electronics including cell phones, where the fuel cell orientation with respect to gravitational forces will vary. Traditional fuel tanks with an outlet at the bottom of a reservoir, and which rely on gravity feed, will cease to deliver fuel when the tank orientation changes. In addition, dipping tube delivery of a liquid fuel within a reservoir varies depending upon the orientation of the tube within the reservoir and the amount of fuel remaining in the reservoir. Accordingly, to facilitate use of liquid fuel cells in portable electronic devices, a liquid fuel reservoir that controllably holds and delivers fuel to a liquid fuel cell, regardless of orientation, is desired.

A liquid fuel reservoir containing a wicking member, such as a urethane foam, is disclosed in co-pending U.S. Non-Provisional patent application Ser. No. 10/183,943, filed Jun. 28, 2002.

SUMMARY OF THE INVENTION

The first aspect of the invention relates to a fuel reservoir for a liquid fuel cell or microreformer. This fuel reservoir has a container having walls that define a volume for holding a liquid fuel for the liquid fuel cell or microreformer, wherein the container has an outlet passageway through one of the walls for the exit of the liquid fuel to a location exterior to the container. Preferably, the outlet passageway contains no wicking material inside, especially in the portion of the outlet passageway that penetrates one of the walls of the container. The container may have a regular or irregular cross-sectional shape depending upon the application. Examples of regular cross-sectional shapes are triangular, quadrilateral (e.g. rectangular, square, parallelogram, and trapezoid which is a quadrilateral shape having two parallel sides), pentagon, circular, oval, and elliptic shapes. The walls of the container can be made of a rigid or flexible material. When the container walls are made of a flexible material, the walls are collapsible allowing for easier stowage of an empty liquid fuel reservoir and allowing a liquid fuel reservoir filled with liquid fuel to better adapt to a space inside a fuel cell in which the reservoir may be installed. A wicking structure is disposed within the volume of the container, wherein the wicking structure comprises a wicking structure material which can wick the liquid fuel and wherein the liquid fuel wicked into the wicking structure material can subsequently be discharged out of or released from the wicking structure material. A retainer is preferably provided to hold the wicking structure in a desired orientation within the container volume. When the liquid fuel reservoir contains the liquid fuel, at least a portion of the liquid fuel wicks into the wicking structure material. Such liquid fuel wicked into the wicking structure material subsequently may be delivered or metered out of the wicking structure material for use in a fuel cell or microreformer via the outlet passageway which communicates with the wicking structure. The liquid fuel may be metered or delivered from the wicking structure material to the fuel cell with a liquid delivery means, such as a pump, in fluid communication with the outlet passageway. The liquid fuel reservoir also may include an inlet through the container, said inlet optionally having a one-way valve to permit gas or liquid flow into the volume of the container and prevent the backflow of any fluid out of the container.

After the liquid fuel in the reservoir has been discharged, partially or completely, the outlet passageway or inlet may be used to introduce replenishing liquid fuel into the volume of the container to replace any spent liquid fuel making the fuel reservoir recyclable. Optionally, the container has a sealable cap comprising a membrane through which replenishing liquid fuel can be introduced into the volume of the container upon puncture, e.g. by a needle of a syringe, of the membrane. The membrane should be made of a material resistant to the liquid fuel and puncturable by the needle, which material can reseal after the needle is withdrawn.

The wicking structure material extends to or near at least one extremity of the container remote from the outlet passageway, so as to permit liquid fuel located at such extremity to be wicked through the wicking structure material to the outlet passageway. Preferably, the wicking structure material extends to or near all extremities of the container remote from the outlet passageway, so that all the liquid fuel in the volume maintains, regardless of the orientation of the liquid fuel reservoir and the stage of liquid fuel depletion, fluid communication with the outlet passageway of the container at least via capillarity.

In a preferred embodiment of the liquid fuel reservoir, the volume of the container has a longest dimension. The wicking structure material has a free rise wick height of at least one half of the container volume's longest dimension (more preferably at least the container volume's longest dimension).

The liquid fuel reservoir of the invention can contain a liquid fuel for liquid fuel cells. The liquid fuel can contain or be an aqueous mixture of a simple alcohol, such as ethanol, ethylene glycol, or preferably methanol. The liquid fuel can also be a liquid containing dimethoxymethane, trimethoxymethane, hydrazine or formic acid. To increase the safety when the liquid fuel reservoir is used, the liquid fuel can further include an ingestion deterrent and/or flame brightening additive. Examples of the ingestion deterrent are an additive, such as Bitrex (denatonium benzoate), that adds a bad flavor, or an additive, such as syrup of ipecac, that can induce vomiting upon ingestion. Flame brighteners are typically salts known in the art.

When the ingestion deterrent and/or flame brightening additive is included in the liquid fuel, the liquid fuel stored in the liquid fuel reservoir is preferably exposed to an impurities scavenger, which comprises one scavenging substance or a mixture of scavenging substances, in order to remove the ingestion deterrent and/or flame brightening additive before being fed to the liquid fuel cell or micro reformer. However, even if the ingestion deterrent and/or flame brightening additive is not included in the liquid fuel, the liquid fuel stored in the liquid fuel reservoir may preferably also be exposed to the impurities scavenger before being fed to the liquid fuel cell or micro reformer in order to remove any impurities in the liquid fuel that may poison the components, e.g. the catalysts, electrodes or membrane, in the liquid fuel cell or micro reformer. The scavenging substance can be an impurities absorbent, such as activated carbon, e.g. activated charcoal, amorphous carbon, e.g. carbon black, graphite powders having a high surface area, expanded graphite, silica, silicate, e.g. aluminosilicate (e.g. Fullers Earth, CAS# 8031-18-3) and diatomaceous earth, exchange resins, zeolites, molecular sieves or filter agents, e.g. Celatom FW80, CAS# 68855-54-9, capable of removing the ingestion deterrent, flame brightening additive and/or the impurities in the liquid fuel. Preferably, the scavenging substance is activated carbon. The scavenging substance can be in the form of powders or granules either in a loosen state or supported on a substructure. The particle size of the scavenging substance can be from about 1 nm to about 1 cm, preferably 10 μm to 5 mm, and more preferably 50 μm to 1 mm. The typical surface area of the scavenging substance is about 50 $m^2/g$.

The impurities scavenger can be inside (a) at least one porous internal compartment of the liquid fuel reservoir, (b) the outlet passageway of the liquid fuel reservoir, and/or (c) a filter cartridge having an inlet port and outlet port, wherein the inlet port is attached to the exit port of the outlet passageway, and the outlet port can be connected to a liquid fuel cell or micro reformer. The at least one porous internal compartment is inside the container of the liquid fuel reservoir, wherein the porous internal compartment comprises at least one porous wall enclosing an internal volume holding the impurities scavenger. The at least one porous wall is made of a porous material, e.g. filter paper, a fabric of woven fibers, or a screen, that can allow the liquid fuel to permeate. Preferably, all the walls of the porous internal compartment comprise the porous material. For instance, the impurities scavenger can be placed inside a porous pouch.

In some of the embodiments of the liquid fuel reservoir of the invention, the container contains at least one porous internal compartment. The porous internal compartment can be of any regular shape, e.g. rectangular, square or oval, or it can be of an irregular shape, e.g. it can be in the shape of a pouch. The porous internal compartment, preferably, is of a generally flat shape, such as in the shape of a rectangle, square or oval. Preferably, the at least one porous internal compartment is disposed near, or touching, at least one portion the internal surface of at least one wall of the container, wherein more preferably the at least one portion is free of the wicking structure. Even more preferably, the at least one porous internal compartment has corners that proximate the corners of the at least one wall of the container, and/or has edges that proximate the edges of the at least one wall of the container. Much more preferably, the container contains two porous internal compartments, each of which is disposed near, or touching, at least one portion of the internal surface of one of two opposing walls of the container, wherein most preferably each of the at least one portion of the internal surface is free of the wicking structure. Even much more preferably, the corners and/or edges of each of the two porous internal compartments proximate the corners and/or edges, respectively, of the corresponding opposing walls of the container.

In some of the embodiments of the liquid fuel reservoir of the invention having a liquid fuel containing an ingestion deterrent, when the liquid fuel reservoir is of a disposable variety, the liquid fuel reservoir and the filter cartridge containing the impurities scavenger can be separate entities, so that if the liquid fuel in the reservoir is consumed, the ingestion deterrent would still be effective. In some of the embodiments of the liquid fuel reservoir of the invention having a liquid fuel containing an ingestion deterrent, when the liquid fuel reservoir is used to supply liquid fuel to a liquid fuel cell, the liquid fuel reservoir can be in fluidic communication with the filter cartridge containing the impurities scavenger, so that the impurities scavenger can render the liquid fuel acceptable to the liquid fuel cell. The filter cartridge can be permanently affixed to the liquid fuel reservoir, assuring that any leaked liquid fuel would be treated. The liquid fuel reservoir and the filter cartridge can be supplied as separate entities, which can be assembled together by the user and installed into a liquid fuel cell. The filter cartridge can be designed to specifically not mount onto the liquid fuel reservoir, but mount in separate locations of the liquid fuel cell thereby preventing the user from assembling the two units and having access to untreated fuel. The liquid fuel can be driven from the liquid fuel reservoir by a pressurizing mechanism or drawn from the liquid fuel reservoir by a pump. The impurities scavenger can be replaced as needed to assure a clean liquid fuel supply to the liquid fuel cell.

In some of the embodiments of the liquid fuel reservoir of the invention, the container of the reservoir can further comprise a pressurized pallet or bladder inside, which can push the liquid fuel stored in the container out of the outlet passageway of the container to deliver the liquid fuel to a liquid fuel cell without the application of suction at the outlet passageway or using any pump or liquid drawing means, such as a wicking material, at the outlet passageway. The combination of the capillarity of the wicking structure and the positive pressure generated by the pressurized pallet or bladder will allow the liquid fuel to be delivered, independent of the orientation, to the fuel cell with a fuel reservoir of lower manufacturing cost than fuel reservoirs of the prior art. Instead of the pressurized pallet or bladder, the positive pressure may be obtained by introducing a pressurized or pressurizing gas into the liquid fuel reservoir via an inlet port of the reservoir, wherein the inlet port does not have any valve that impedes or prevents any inflow of gas and the pressurized or pressurizing gas imparts sufficient pressure on the liquid fuel stored in the liquid fuel reservoir to push the liquid fuel out of the reservoir via the outlet passageway of the reservoir. Since an air pump may already be present in certain fuel cell devices, the positive pressure arrangement could reduce the weight by eliminating the need for a liquid pump. Reducing the weight of the liquid fuel reservoir system would potentially allow the fuel reservoir to carry more liquid fuel. Regardless whether the air pump is present in the fuel cell device, the positive pressure arrangement minimizes the complexity of the reservoir design by eliminating the use of vent valves and a self-priming step of a liquid pump. Simplifying the design complexity would make the fuel delivery system less costly.

The pressurized pallet or bladder can be made by providing a container of the reservoir, wherein the container comprises first and second compartments, which can be separated by a flexible membrane. The first compartment comprises at least one wall, a port through the at least one wall of the compartment, at least one extremity remote from the outlet and a wicking structure (a) being in fluid communication with the outlet; and (b) extending from proximate the at least one extremity to proximate the outlet in order to place the at least one extremity in fluid communication with the outlet, in any orientation of the container, and at substantially any stage of liquid fuel depletion, to permit liquid fuel located proximate the at least one extremity to be wicked to the outlet. Preferably, the wicking structure has a solid wicking structure volume which is no more than 50% of the capacity of the first compartment. The port of the first compartment optionally has a valve that can control the inflow and/or outflow of fluid. Alternatively, the port can be plugged when not in use. The second compartment comprises at least one wall and a port through the at least one wall of the compartment. A piece of compressible porous material, preferably a foam such as polyurethane foam, is placed inside the second compartment and then covered with the flexible membrane, wherein the volume of the compressible porous material in a relaxed state is larger than the combined internal capacities of the first and second compartments. Alternatively, the flexible membrane is laminated to the compressible porous material to make assembly easier. The second compartment is attached to the first compartment with the flexible membrane separating the two compartments, so that the internal space inside both compartments is completely filled with the compressible porous material and the flexible membrane, with the compressible porous material slight compressed. Alternatively, the flexible membrane can be eliminated by applying a coating to the surface of the compressible porous material of the second compartment, wherein the coating renders the compressible porous material impermeable to the liquid fuel.

Liquid fuel can be pumped into the first compartment via the port of the first compartment with the valve of the port open or by inserting a perforating device, such as a hollow needle, through the plug of the port of the first compartment, wherein the port of the second compartment is open to allow air to escape the second compartment. If the liquid fuel is introduced via the perforating device, the plug of the port is made of a resealable material that is not sensitive to the liquid fuel. The introduction of the liquid fuel into the first compartment compresses the compressible porous material in the second compartment by applying a positive pressure transmitted via the flexible membrane. After the first compartment is filled with the liquid fuel, the port of the first compartment is closed with the plug or valve. With the compressed porous material, the second compartment can function as a pressurized pallet or bladder.

The properties, e.g. the compressive load index and/or density, of the compressible porous material can be selected to provide the appropriate positive pressure generatable by the porous material in the compressed state. In order to avoid the possibility of the flexible membrane or the compressible porous material of the second compartment covering the port of the first compartment, the port of the first compartment should be covered with a portion of the wicking structure of the first compartment and, preferably, a small guard is installed over the portion of the wicking structure to prevent the portion from being compressed by the flexible membrane or compressible porous material.

Optionally, the port of the second compartment can have a valve or liquid-fuel-swellable material inside. The valve can control the flow of fluid in or out of the port of the second compartment. The liquid-fuel-swellable material comprises a liquid-fuel-swellable substance that can swell when in contact with the liquid fuel. Examples of the liquid-fuel-swellable substance are polymeric materials, such as polystyrene beads and high molecular weight polyethylene glycol, that can swell when come in contact with the liquid fuel. When the flexible membrane or the coating on the surface of the compressive porous material is intact, the liquid fuel cannot permeate it and the liquid-fuel-swellable material is in an amount that does not impede the flow of liquid in or out of the second compartment. But when the flexible membrane or the coating on the surface of the compressive porous material has deteriorated so that the liquid fuel can permeate it, on contact with the liquid fuel that has broken through the flexible membrane or coating, the liquid-fuel-swellable material swells and blocks the port of the second compartment preventing the outflow of the liquid fuel from the second compartment for safety sake.

When the liquid fuel reservoir is in use, the port of the first compartment is opened to allow the liquid fuel stored in the first compartment to be delivered to the fuel cell, wherein the compressible porous material, being in a compressed state, of the second compartment generates a positive pressure on the first compartment. Transfer of the liquid fuel to the connected liquid fuel cell is achieved by energy stored in the compressed porous material in the second compartment and requires no intervention by the user.

The flow rate of the liquid fuel out of the first compartment can be controlled with a valve arrangement installed between the port of the first compartment and the liquid fuel cell. If necessary, the flow rate of the liquid fuel can be augmented with an auxiliary pump. Since the liquid fuel is delivered from the first compartment by the positive pressure generated by the compressed porous material, the pumping requirements for the liquid fuel cell device can be reduced or eliminated resulting in weight reduction and/or cost savings. Once all of the liquid fuel stored in the first compartment is consumed, the liquid fuel reservoir can be removed and the whole operating cycle can be repeated.

Optionally, the second compartment is used as a receptacle to hold any spent fuel or byproducts produced by the liquid fuel cell, wherein the spent fuel or byproducts are introduced into the second compartment via the port of the second compartment. The spent fuel or byproducts forced from the liquid fuel cell can fill the void in the compressible porous material of the second compartment created by the discharge of the liquid fuel from the first compartment. Thus, the second compartment can function as a storage for the spent fuel or byproducts for later disposal. The volume of the spent fuel or byproducts stored in the second compartment can equal the volume of the liquid fuel delivered from the first compartment. The introduction of the spent fuel or byproducts into the second compartment may also aid the compressed porous material in applying positive pressure on the liquid fuel stored in the first compartment.

Within the scope of the invention is a method of delivering a liquid fuel to a liquid fuel cell. The method contains the steps of (1) providing a liquid fuel reservoir of the invention which may or may not contain a pressurized pallet or bladder inside the container of the reservoir, wherein the container holds the liquid fuel and the inlet port does not have any valve that impedes or prevents any inflow of gas; (2) connecting the outlet of the container to the liquid fuel cell; and (3) applying a positive pressure to the container volume via the inlet port to push the liquid fuel out of the container via the outlet of the container in order to deliver the liquid fuel to the liquid fuel cell independent on the orientation of the reservoir.

Another aspect of the invention provides a package for delivering a fuel to a liquid fuel cell having a container defining a volume for holding a liquid fuel for a liquid fuel cell. A wicking structure is held within the container volume and at least a portion of the liquid fuel wicks into the wicking structure. A retainer holds the wicking structure in a desired orientation within the container volume. An outlet passageway through the container communicates with the wicking structure in the container. Once a liquid fuel is introduced into the volume of the container, such liquid fuel may be metered or delivered from the wicking structure and through the outlet passageway with a pump or other metering or liquid delivery means separate from the fuel wicking structure in the container. Preferably, the package is provided with an inlet optionally having a one-way valve to permit gas or liquid flow into the volume of the container but preventing undesired release of gas and fuel from the container. The structures of the container, retainer and wicking structure preferably are the same as those described with reference to the liquid fuel reservoir of the first aspect of the invention disclosed herein.

A further aspect of the invention is a method of dispensing a liquid fuel using a fuel reservoir of the invention. The method includes the steps of: (a) providing a container defining a volume having at least one extremity, said volume holding the liquid fuel; (b) providing a wicking structure within the volume, the wicking structure extending to the at least one extremity, wherein the wicking structure comprises a wicking structure material into which the liquid fuel can wick and from which the liquid fuel can be discharged; (c) wicking at least a portion of the liquid fuel into the wicking structure; and (d) delivering the liquid fuel from the wicking structure to a location exterior to the container through an outlet passageway in the container that communicates with the wicking structure in the container. In a preferred embodiment of the method, the wicking structure in step (b) is held by a retainer in a desired orientation within the volume of the container. Step (d) is preferably carried out by pumping the liquid fuel out of the wicking structure to the exterior location. A gas, such as air or nitrogen, may be introduced into an inlet formed through the container. Preferably, the inlet has a one-way valve to permit gas flow into the container volume without allowing any gas or liquid to leave the container.

The method of dispensing a liquid fuel has a primary application for dispensing liquid fuels, such as simple alcohols, e.g. methanol, ethanol, ethylene glycol, or mixtures thereof, dimethoxymethane, trimethoxymethane, formic acid, hydrazine and hydrogen peroxide, for use in liquid fuel cell applications. The method of dispensing the liquid fuel also has application for the delivery of fuel to microreformers, which fuels also include hydrocarbons, diesel fuel, gasoline, jet fuel, higher molecular weight alcohols and similar fuels. The structures of the container, retainer and wicking structure preferably are the same as those described with reference to the liquid fuel reservoir of the first aspect of the invention disclosed herein.

In yet another aspect of the invention, a method of assembling a fuel cartridge for a liquid fuel cell includes the following steps: (a) providing a container having a proximal end and a distal end and defining a volume for holding a liquid fuel for a liquid fuel cell; (b) providing a cap to seal the distal end of the container; (c) providing a wicking structure within the volume and into which at least a portion of the liquid fuel wicks and from which said liquid fuel subsequently may be delivered or metered; (d) providing a retainer to hold the wicking structure in a desired orientation within the container volume; (e) mounting the wicking structure over at least a portion of the retainer; (f) attaching the retainer to the cap; and (g) slidably inserting the wicking structure and retainer into the volume of the container while inserting the cap on the distal end of the container. Once the fuel cartridge has been assembled, it may be filled with a liquid fuel, preferably liquid fuels intended for use in liquid fuel cell applications, such as simple alcohols, e.g. methanol, ethanol, ethylene glycol or mixtures thereof, dimethoxymethane, trimethoxymethane, formic acid, hydrazine and hydrogen peroxide, or liquid fuels intended for reformers, such as hydrocarbons, diesel fuel, gasoline, jet fuel, and higher molecular weight alcohols. Preferably, the liquid fuel is introduced into the container through the vent, outlet passageway, or a passageway formed through a wall of the container, such as the proximal end or a side wall. The structures of the container, retainer and wicking structure preferably are the same as those described with reference to the liquid fuel reservoir of the first aspect of the invention disclosed herein.

BRIEF DESCRIPTION OF THE DRAWINGS

FIG. 28 is a schematic diagram of a liquid fuel reservoir viewed from the front with an alternative wicking structure having the external volume minimized;

FIG. 29 is a schematic diagram of a liquid fuel reservoir viewed from the front with an alternative wicking structure having the external volume minimized;

FIG. 32 is a schematic diagram of a liquid fuel reservoir similar to the reservoir of FIG. 31 viewed from the front with a wicking structure having the external volume minimized, wherein an outlet passageway is placed at a different location;

FIG. 33 is a schematic diagram of a recyclable or rechargeable liquid fuel reservoir having a sealable, detachable cap containing a membrane;

DETAILED DESCRIPTION OF THE INVENTION

Figure 1:
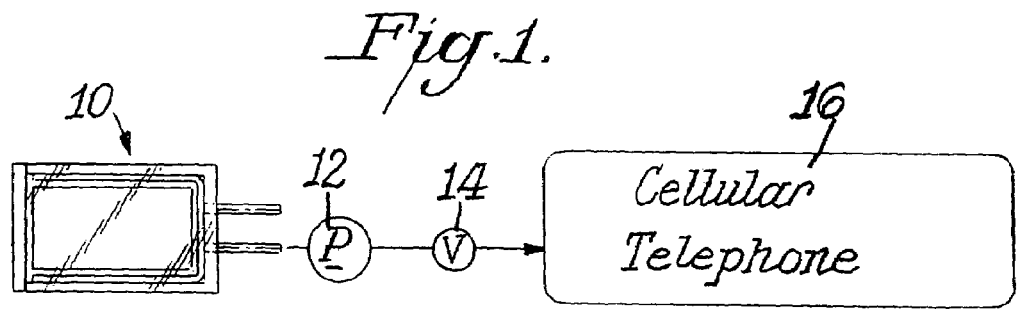
FIG. 1 is a schematic diagram of a liquid fuel delivery system used with a fuel cell to power a fuel cell driven portable electronic device such as a cellular telephone, wherein the liquid fuel delivery system comprises a liquid fuel reservoir of the invention.

In the invention, "wicking" means wicking by capillary action, i.e. moving a liquid by capillary forces. A "wicking structure" is a structure capable of wicking a liquid by capillary action, which liquid may be later released from the structure. The "wicking structure" comprises a wicking material capable of wicking the liquid by capillary action.

The wicking structure can be a porous member made of one or more polymers resistant to the liquid fuel. The wicking structure material can be selected from foams, bundled fibers, matted fibers, needled fibers, woven or nonwoven fibers, Porex and Porex like polymers, porous polymers or inorganic porous materials that can wick the liquid fuel. The wicking structure material preferably is selected from the group consisting of foams, bundled fibers, woven or nonwoven fibers, Porex and porous polymers made by pressing polymer beads. More preferably, the wicking structure material is selected from polyurethane foams (preferably felted polyurethane foams, reticulated polyurethane foams, or felted reticulated polyurethane foams), melamine foams, polyvinyl alcohol foams, or nonwoven felts, woven fibers or bundles of fibers made of polyamide such as nylon, polyethylene, polypropylene, polyester such as polyethylene terephthalate, cellulose, modified cellulose such as Rayon, polyacrylonitrile, and mixtures thereof that can wick the liquid fuel. Certain inorganic porous materials, such as sintered inorganic powders of silica or alumina, can also be used as the wicking structure material. Most preferably, the wicking structure material is a polyurethane foam, e.g. felted polyurethane foam, reticulated polyurethane foam, or felted reticulated polyurethane foam.

The wicking structure material is preferably a polyurethane foam having a density in the range of about 0.5 to about 45 pounds per cubic foot, more preferably about 0.5 to about 25 pounds per cubic foot, even more preferably about 0.5 to about 15 pounds per cubic foot, most preferably about 0.5 to about 10 pounds per cubic foot, and pore sizes in the range of about 10 to about 200 pores per linear inch, preferably about 40 to about 200 pores per linear inch, and most preferably about 75 to about 200 pores per linear inch.

If a felted polyurethane foam, e.g. a felted reticulated polyurethane foam, is selected as the wicking structure material, such foam preferably should have a density in the range of about 1.5 to about 60 pounds per cubic foot and a compression ratio in the range of about 1.1 to about 30, more preferably a density in the range of about 3 to about 40 pounds per cubic foot and a compression ratio in the range of about 1.5 to about 20, and most preferably a density in the range of about 3 to about 10 pounds per cubic foot and a compression ratio in the range of about 3 to about 30. Felted foams of greater compression, however, may be used as the wicking structure materials.

A felted foam is produced by applying heat and pressure sufficient to compress the foam to a fraction of its original thickness. For a compression ratio of 30, the foam is permanently compressed to 1/30 of its original thickness. For a compression ratio of 2, the foam is permanently compressed to 1/2 of its original thickness. Typically, to create a felted foam, the foam is compressed for from 5 to 60 minutes and heated to temperatures from 350° F. to 400° F. During the felting process, the cellular polymer strand network is crushed to a more unidirectional state, where the strands are oriented more in parallel. This is sometimes called an anisotropic cell structure.

A reticulated foam is produced by removing the cell windows from the cellular polymer structure, leaving a network of strands and thereby increasing the fluid permeability of the resulting reticulated foam. Foams may be reticulated by in situ, chemical or thermal methods known to those of skill in foam production.

In the liquid fuel reservoir of the invention, the volume effectively occupied by the wicking structure is preferably minimized. One of the ways of minimizing the volume effectively occupied by the wicking structure is to minimize the external volume of the wicking structure by providing a wicking structure that extends to the extreme parts of the volume within the container, with the central portion of the volume within the container being substantially devoid of the wicking structure material. The central portion of the volume within the container can be made substantially devoid of the wicking structure material by making the wicking structure with no or only a minimal amount of wicking structure material in the central portion of the volume within the container. The "central portion of the volume within the container" is the inner 70%, preferably 80%, more preferably 90%, most preferably 95%, of the volume within the container. Alternatively, the central portion of the volume within the container can be made substantially devoid of the wicking structure material by perforating the wicking structure material. Preferably, the wicking structure material is perforated except in portions of the wicking structure material proximate the walls of the container or except a portion of the wicking structure material in a zone extending from the external surface of the wicking structure adjacent to a wall of the container to a depth of 20% (preferably 10%, and more preferably 5%) of the thickness of the wicking structure at that region, wherein the "thickness of the wicking structure at that region" is the length of a first imaginary line perpendicular to a second imaginary line tangential to the external surface of the wicking structure at that region, which first imaginary line starts at the external surface, extends through the wicking structure material and ends at where the first imaginary line meets an external surface on the opposite side of the wicking structure. When the wicking structure material is perforated, at least a part of the wicking structure material is removed, and consequently the size of the perforation is larger than the nominal size of the pores in the wicking structure material.

One of the ways of minimizing the volume effectively occupied by the wicking structure is to perforate the wicking structure material. The size of the perforation is larger than the nominal size of the pores in the wicking structure material.

By minimizing the amount of the wicking structure material (either by perforating the wicking structure material or by making the central portion of the volume within the container substantially devoid of the wicking structure material), the amount of the liquid fuel that the liquid reservoir can deliver can be maximized because the amount of the liquid fuel that the liquid fuel reservoir can hold can be increased and the amount of the liquid fuel remaining in the wicking structure after all the deliverable liquid fuel is discharged from the liquid reservoir can be decreased. In this preferred embodiment of the liquid fuel reservoir, the volume within the container can have a rectangular or square cross section having eight corners and a square or rectangular shape viewed from the top, and the wicking structure is disposed at least at or proximate the eight corners. For instance, the wicking structure can have a configuration of a square or rectangular sheet with a plurality of perforations, a square or rectangular rim, or a configuration shaped like an alphabet letter "E", "H", "K", "M", "N", or "X". The configuration shaped like the alphabet letter "H" includes a configuration shaped like an uppercase alphabet letter "I" because the alphabet letter "H" is equivalent to the uppercase alphabet letter "I" turned 90°. Similarly, the configuration shaped like the alphabet letter "N" includes a configuration shaped like an alphabet letter "Z". Alternatively, the container can have a curved wall so that the volume within the container can have a round or oval cross section when viewed from above, wherein the wicking structure can be disposed at least as a circular or oval ring along the curved edge of the volume within the container.

Within the scope of the invention, one of the ways of minimizing the external volume of the wicking structure in a liquid fuel reservoir is to have the wicking structure comprising a sheet or layer of the wicking structure material disposed adjacent to all, or all but one, of the lateral walls of the container. In some of the embodiments of the liquid fuel reservoir within this aspect of the invention, the liquid fuel reservoir comprises (a) a container having 5, 6, 7, 8, 9 or 10 walls: a first and second end walls and 3, 4, 5, 6, 7 or 8 lateral walls, respectively, wherein the first and second end walls are opposite to each other and each of the lateral walls is connected to the first and second end walls and to two adjacent lateral walls, wherein the container has a triangular, quadrilateral (preferably square, rectangular, trapezoidal or parallelogram; more preferably, square or rectangular), pentagonal, hexagonal, heptagonal or octagonal cross section, respectively, formed by the lateral walls, said walls defining a volume for holding a liquid fuel for a liquid fuel cell or microformer; wherein the container has an outlet passageway through one of the walls suitable for the exit of the liquid fuel to a location exterior to the container, said outlet passageway optionally having a one-way valve that prevents the backflow of the liquid fuel into the container, and the container optionally having an inlet which optionally has a one-way valve allowing the flow of a gas or the liquid fuel into the container; and (b) a wicking structure disposed within the volume of the container, wherein the wicking structure comprises a sheet or layer of a wicking structure material which can wick the liquid fuel and wherein the liquid fuel wicked into the wicking structure material can subsequently be discharged out of or released from the wicking structure material, and wherein the sheet or layer is disposed along or adjacent to all, or preferably all but one, of the lateral walls of the container, and wherein an edge of the sheet or layer is proximate (or in contact with) a portion of the first end wall and an opposite edge of the sheet or layer is proximate (or in contact with) a portion of the second end wall.

Within the aspect of the invention in which the liquid fuel reservoir has the external volume of the wicking structure minimized, in some of the embodiments, the container has 3 walls: a first and second end walls connected by a curved lateral wall, and a circular, oval or elliptic cross section formed by the curved lateral wall, wherein the wicking structure comprises a sheet or layer of the wicking structure material disposed along or adjacent to the curved lateral wall of the container, and wherein an edge of the sheet or layer is proximate or in contact with the first end wall and an opposite edge of the sheet or layer is proximate or in contact with the second end wall.

For fuel reservoirs intended for use in applications where the container orientation is expected to change during use, the container having a proximal end and a distal end with the proximal end being where the outlet passageway is disposed and the distal end being the end remote to the outlet passageway, the wicking structure preferably contacts at least one portion of the inner surface of the distal end of the container, and the wicking structure communicates with the outlet passageway. More preferably, the wicking structure contacts at least one portion of the inner surface of the distal end of the container and at least one portion, even more preferably a substantial portion, of the inner surface of a sidewall of the container, and the wicking structure also communicates with the outlet passageway. Most preferably, the wicking structure contacts at least one portion of the inner surface of the distal end of the container, at least one portion, even more preferably a substantial portion, of the inner surface of a sidewall of the container, and at least one portion of the inner surface of the proximal end of the container, and the wicking structure also communicates with the outlet passageway. Especially preferable is for the wicking structure to contact at least one portion of the inner surface of the distal end of the container, at least one portion (preferably a substantial portion) of the inner surface of a sidewall of the container, at least one portion of the inner surface of the proximal end of the container, and every extremity of the container volume, wherein the wicking structure communicates with the outlet passageway, so that the wicking structure is in fluid communication with every extremity of the container.

In an embodiment of the liquid fuel reservoir of the invention, a retainer is provided within the container. The retainer holds the wicking structure preferably in contact with at least one portion of the interior surface of the container having a proximal end and a distal end, wherein the outlet passageway is formed through the proximal end and the distal end is the end remote to the outlet passageway. The retainer holds the wicking structure more preferably in contact with at least one portion of the inner surface of the distal end of the container and with at least one portion of an inner surface of a sidewall of the container. Also more preferably, the retainer holds the wicking structure in contact with at least one portion of the inner surface of the distal end of the container and at least one portion (preferably that portion adjacent the outlet passageway) of inner surface of the proximal end of the container. Most preferably, the retainer holds the wicking structure in contact with at least one portion of the inner surface of the distal end of the container, at least one portion of the inner surface of a sidewall of the container, and at least one portion (preferably that portion adjacent the outlet passageway) of the inner surface of the proximal end of the container.

When the container has the retainer inside, the wicking structure is preferably mounted over at least a portion of the retainer, and the retainer is attached to a cap that engages the distal end of the container. With such an embodiment, the wicking structure so mounted over the retainer is slidably insertable into and optionally removable from the container.

In an alternative embodiment, the retainer comprises a connector extending from the inner surface of the distal end or from the inner sidewall surface of the container. The connector grips a portion of the wicking structure material to hold it in position within the container. As an example, the connector is a clamp, a combination of clamps, a toothed edge, or a VELCRO nub, each of which grasps a portion of the wicking structure material. For other embodiments, the wicking structure may be connected to the container by heat sealing, ultrasonic welding, molded in place by inserting the wicking material in an injection molding tool in order to avoid using any adhesive, or adhesive.

When the liquid fuel reservoir is provided with a retainer, the retainer preferably has a perforate structure to permit the liquid fuel to flow through the retainer structure and to minimize the effective volume occupied by the retainer in order to increase the amount of the liquid fuel that the fuel reservoir can hold. The effective volume of the retainer is the solid volume of the retainer, i.e. the volume occupied by the solid material of the retainer. In other words, the solid volume of the retainer is the total or external volume of the retainer minus the void volume of the retainer. The "void volume of the retainer" is the collective volume of any perforations of the retainer. More preferably, the retainer is of a material in the form of a screen, slotted sheet, or perforated sheet, each of which made of an appropriate fuel resistant material. For methanol as the liquid fuel, such fuel resistant materials include polypropylene, polyethylene, polyvinyl chloride, and the like.

While the wicking structure and the retainer, if present, can be sized to fill a substantial portion of the volume of the container, improved results can be achieved where a greater portion of the container volume is filled by the liquid fuel and a lesser portion of the container volume is taken up by the wicking structure and the optional retainer. It is desirable to minimize the volume effectively occupied by any internal structure(s) of the fuel reservoir in order to maximize the amount of liquid fuel that can be held in the container, and permit the liquid fuel in the container to be discharged therefrom in any orientation of the container, and at substantially any stage of liquid fuel depletion in the container with a minimum amount of retained liquid fuel. The internal structure(s) of the fuel reservoir includes the wicking structure in the absence of the retainer, or the wicking structure and the retainer, if present. Thus, it is desirable to minimize the sum of the solid volume of the wicking structure and the solid volume of the retainer, if present. The "solid volume of the wicking structure" is the volume occupied by the solid material of the wicking structure. In other words, the "solid volume of the wicking structure" is the external volume of the wicking structure minus its void volume. The "void volume of the wicking structure" is the total volume of all pores, perforations or interstices in the wicking structure. The "external volume of the wicking structure" is the volume of the wicking structure as defined by the external surface(s) of the wicking structure, so the "external volume of the wicking structure" is the sum of the solid volume and the total volume of all the pores or perforations in the wicking structure. In the event that the void volume of the wicking structure or the retainer is not known, or if a simpler, alternative approach is desired, the sum of the external volume of the wicking structure and the external volume of the retainer, if present, can be minimized in order to increase the amount of liquid fuel that can be held in the container.

Consequently, it is desirable to make the wicking structure comparatively thin. The volume taken up by the wicking structure can be further reduced by forming voids in the wicking structure, such as by perforating or slotting the wicking structure, so long as the wicking function is not impaired.

In an embodiment aimed at increasing the amount of liquid fuel that the fuel reservoir can hold, the solid volume of the wicking structure is preferably no more than 50% (e.g. less than 50%, such as no more than 45%), more preferably no more than 40% (e.g. no more than 25%), even more preferably less than 20% (e.g. no more than 12.5%), much more preferably less than 10% (e.g. no more than 5%), even much more preferably no more than 3%, and most preferably about 1%, of the volume within the container. The void volume of the wicking structure is preferably at least about 50%, more preferably about 60% to 98% (e.g. about 65% to 98%), even more preferably about 70% to 98% (e.g. about 70% to 85%), and most preferably about 80% to 98% (e.g. about 95%), of the external volume of the wicking structure. The solid volume of the retainer, if present, is preferably no more than about 15% (e.g. no more than about 12%), more preferably less than about 10% (e.g. no more than about 7%), much more preferably less than about 5% (e.g. no more than about 3%, such as about 1%) and most preferably less than about 1% (e.g. from about 0.5% to about 0.05%, such as about 0.5%, about 0.25%, about 0.1% or about 0.05%), of the volume within the container.

As an alternative, to increase the amount of the liquid fuel that the fuel reservoir can hold, the external volume of the wicking structure is preferably no more than about 65%, more preferably no more than about 50%, even more preferably no more than about 25%, and most preferably no more than about 10%, of the volume within the container. The external volume of the retainer, if present, is preferably no more than about 20%, more preferably no more than about 10%, even more preferably no more than about 5%, and most preferably no more than about 1%, of the volume within the container.

Referring to the drawings, some of the preferred embodiments of the invention are described below.

Referring first to FIG. 1, a fuel reservoir 10 is shown in combination with a pump 12 that directs liquid fuel such as methanol to a fuel cell 14 (indicated symbolically as a voltage source "V"), which is a source for power to a portable electronic device, such as a cellular telephone 14. The pump 12 communicates with an outlet passageway 24 of the fuel reservoir 10 to pump the liquid fuel out of the container 20 through the outlet passageway (see FIGS. 2 and 3). A gas inlet 26 having a one-way valve (not shown) is provided to the container 20 to permit gas flow into the volume of the container 20. In one of the embodiments, the container 20 is filled with 6 ml. of an aqueous fuel solution containing up to 100% methanol, preferably about 5% methanol. A pump 12 acts on the outlet tube 24 and draws liquid fuel 22 from the wicking structure 32 through the outlet tube 24. Only a slight vacuum needs to be placed on the outlet tube 24 to draw the fuel mixture out of the container.

As shown in greater detail in FIGS. 2-5, the fuel reservoir 10 has a container 20 formed as a case or cartridge that defines an internal volume holding a liquid fuel mixture 22. An outlet tube 24 extends into the container 20 through a proximal surface 38 and the outlet tube 24 communicates between the internal volume of the container 20 and the exterior of the container. A gas inlet tube 26 also extends into the container 20 through cover 38. The gas inlet tube 26 includes a one-way valve (not shown) so as to prevent liquid from flowing out of the container 20. Such a one-way valve may be placed on board the cartridge, or optionally on board the fuel cell. Alternatively, the inlet port may be connected to a waste stream from the fuel cell. Preferably, the gas entering the internal volume of the container 20 is air, but may also be an inert gas, such as nitrogen.

The materials forming the container 20 and tubes 24, 26 have to be fuel resistant. Where the fuel is methanol, the fuel resistant materials can be polypropylene, polyethylene, polyvinyl chloride and other appropriate materials. Where the fuel reservoir 10 is intended for use with a reformer, materials resistant to hydrocarbons should be used. Ideally, the tubes/vents 24, 26 will be injection molded together with the container 20 in one molding step.

A wicking structure 32 is provided within the volume of the container 20. The wicking structure 32 is mounted over a retainer 34. The retainer 34 is formed from a perforated sheet into a bent "U" shape that conforms to the shape of the internal side walls 36 and internal proximal end wall 38 of the container 20. The end portions 42 of the retainer 34 connect to the end cap 44 that closes the distal end of the container 20 when the container is filled with liquid fuel. When the end cap 44 closes the distal end of the container 20, the end cap 44 can be considered as a part, i.e. the distal end wall, of the container. Holes 46 through the thickness of the retainer 34 permit liquid fuel to contact the wicking structure 32. The retainer 34 urges and holds the wicking structure 32 into contact with the internal side walls and the internal proximal wall of the container, as well as an internal surface of the distal end wall 44 of the container. The wicking structure 32 thus is in communication with the internal opening of the outlet tube 24 of the container 20.

The cap 44 preferably also is made from a fuel compatible material, which generally will be the same as the material selected for the remainder of the container. In a preferred embodiment, the cap 44 is ultrasonically welded to the container 20 to create a fluid tight connection between the cap 44 and container 20.

Figure 2:
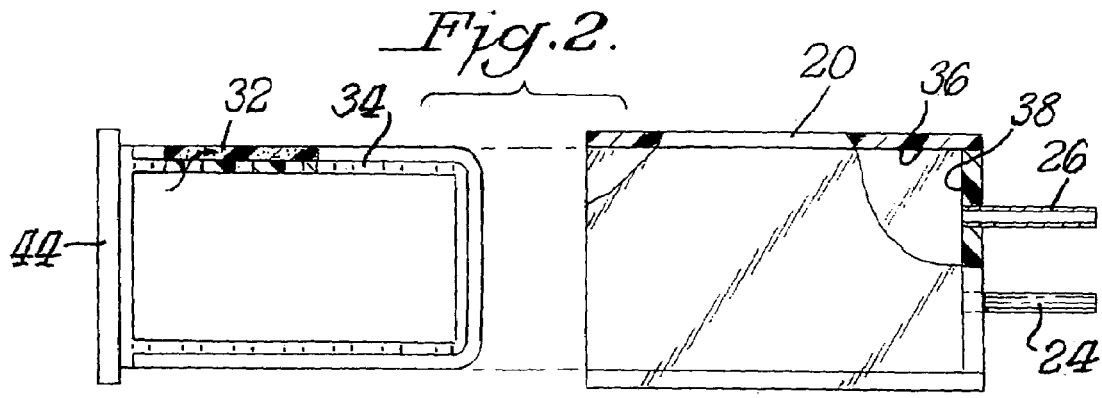
FIG. 2 is an exploded top plan view of the liquid fuel reservoir having a container with a generally rectangular shape shown in FIG. 1 with portions of the drawing partially broken away to show certain structural components.

In the embodiment shown in FIGS. 2-5, the wicking structure 34 is mounted on the retainer 32 and the retainer 32 is connected to the cap 44. As best shown in FIG. 2, when the cap 44 is removed from the container 20, the retainer 34 and wicking structure 32 are slidably removable from the container 20. Conversely, when the cap 44 is re-attached to the container 20, the retainer 34 and wicking structure 32 are slidably engageable with the container 20. The fuel reservoir or package is thus assembled by mounting the wicking structure onto the retainer, connecting the retainer to the cap and slidably engaging the wicking structure, retainer and cap with the container to place the wicking structure in communication with the outlet tube and distal portion(s) of the container volume. As stated, the cap 44 then can be sealingly connected to the container 20, such as by ultrasonic welding.

Figure 3:
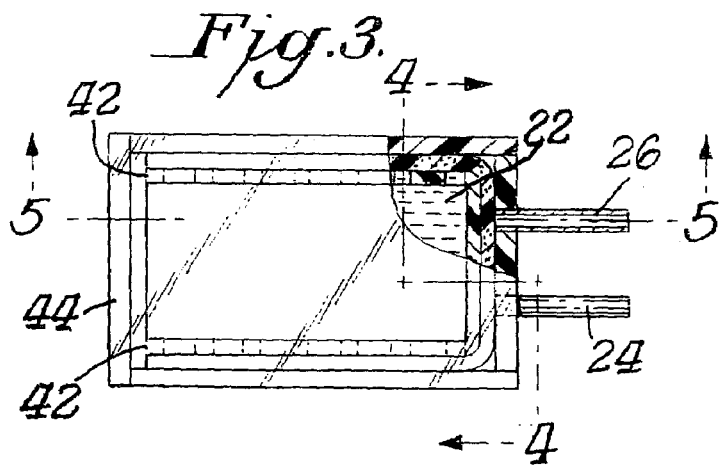
FIG. 3 is a top plan view of the assembled liquid fuel reservoir shown in FIG. 2.
Figure 4:
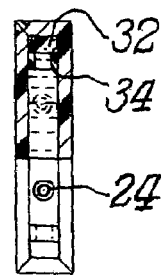
FIG. 4 is a right end view partially in cross-section taken along line 4-4 of FIG. 3.
Figure 5:
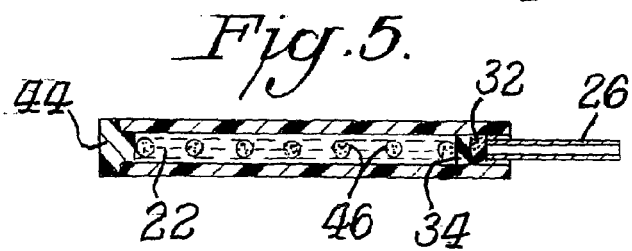
FIG. 5 is a longitudinal cross-sectional view taken along line 5-5 of FIG. 3.

The wicking structure 32 is formed as a thin sheet or layer. Liquid fuel can wick into the wicking structure 32. The fuel reservoir 10 works best when the wicking structure 32 defines a path to direct the liquid fuel from the most distal portions of the container volume to the internal opening of the outlet tube 24. The fuel reservoir 10 may be used in all possible spatial orientations so long as the wicking structure 32 provides such fluid communication between the distal portions and the outlet tube 24. While it is possible to have a wicking structure 32 fill all or substantially all of the internal volume of the container 20, lesser amounts of wicking structure material may be used to direct and help meter or deliver the liquid fuel to the outlet tube 24. Thus, as shown in FIGS. 3 and 4, the wicking structure 32 extends to the distal end surface defining the internal fluid holding volume of the container, but this wicking structure 32 does not contact all internal surfaces of the container.

Referring back to FIG. 1, the connection between outlet tube 24 and the pump 12 may be a quick disconnection, so that the outlet tube 24 may be capped during storage and shipment before the fuel reservoir 10 is installed for use with a portable electronic device. A cap is not shown in FIG. 1, but the distal end of the container can be of any suitable construction that will maintain the liquid fuel within the container.

In an example of the embodiment shown in FIGS. 2 to 5, the wicking structure 32 is a felted polyurethane foam shaped as a thin sheet mounted over the retainer 34. The wicking structure can be a sheet of about 0.4 mm to about 2.5 mm thick. Preferably, the sheet of wicking material is between about 0.8 mm (1/32 inch) and about 1.6 mm (1/16 inch) thick.

The foam was produced with the following mix:

| | |
|---|---|
| Arcol 3020 polyol (from Bayer Corp.) | 100 parts |
| Water | 4.7 |
| Dabco NEM (available from Air Products) | 1.0 |
| A-1 (available for OSi Specialties/Crompton) | 0.1 |
| Dabco T-9 (available from Air Products) | 0.17 |
| L-620 (available from OSi Specialities/Crompton) | 1.3 |

After mixing for 60 seconds and allowed to degas for 30 seconds, 60 parts of toluene diisocyanate were added. This mixture was mixed for 10 seconds and then placed in a 15"×15"×5" box to rise and cure for 24 hours. The resulting foam had a density of 1.4 pounds per cubic foot and a pore size of 85 pores per linear inch. The foam was thermally reticulated, then felted by applying heat (360° F.) and pressure sufficient to compress the foam to $\frac{1}{5}$ of its original thickness (i.e., compression ratio=5). The heat and compressive pressure were applied for about 5 minutes to a thickness of $\frac{1}{32}$ inch (0.8 mm). The resulting felted foam had a density of 7.0 pounds per cubic foot. When this felted foam was installed in a liquid fuel reservoir 10 such as shown in FIGS. 2-5, the liquid fuel reservoir had a 90% or greater fuel delivery efficiency, which means that 90% or more of the liquid fuel that was loaded into fuel-empty container could be discharged from the container and directed to a fuel cell used to power a portable electronic device at any spatial orientation of the fuel reservoir.

The retainer 34 preferably is formed from a material or a composite of materials that will not degrade when exposed to liquid fuels intended to be delivered via the liquid fuel reservoir. The preferred materials for the retainer 34 comprise those materials suitable for forming the container 20. In a most preferred embodiment, the retainer 34 is injection molded plastic, but it may also be formed as a screen or other slotted or perforated structure so long as it is able to retain the wicking structure 32 in place within the container 20.

The container of the fuel reservoir may take various shapes with various regular or irregular cross sections. Examples of regular cross sectional shapes include circular, oval, elliptic, rectangular, square, parallelogram, trapezoidal or triangular shapes. Oblong or other eccentric shapes as designed for installation in portable electronic devices are also within the scope of this invention. One preferred container shape is a generally cylindrical cartridge comparable in size and shape to disposable dry cell batteries, or other known battery cartridge shapes. Alternatively, in addition to the rectangular cross section of FIGS. 2-5, the container 20 is formed with a circular cross section (as shown in FIGS. 6 and 7), and a square cross section (as shown in FIGS. 8-10).

Figure 6:
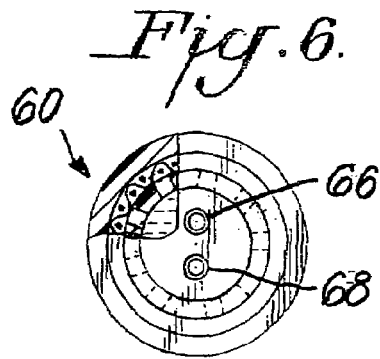
FIG. 6 is left end elevational view partially broken away of an alternative liquid fuel reservoir having a housing with a generally cylindrical shape.
Figure 7:
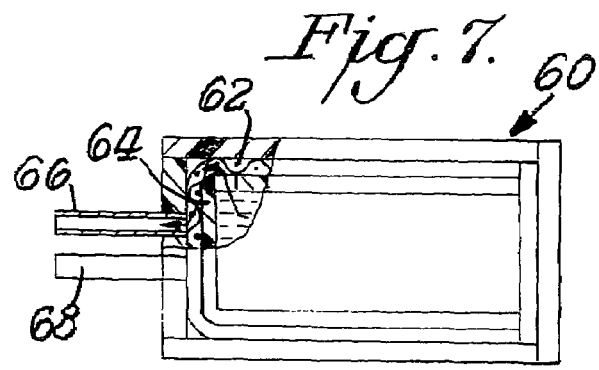
FIG. 7 is a front elevational view partially broken away of the fuel reservoir shown in FIG. 6.

Referring next to FIGS. 6 and 7, the container 60 is formed as a cylinder, with a circular cross section. As with the embodiment shown in FIGS. 2-5, the fuel reservoir includes a wicking structure 62 and a retainer 64 that holds the wicking structure 62 in place within the volume of the container 60. The wicking structure 62 provides a path of liquid communication between the distal portions of the container 60 and the outlet tube 66. A gas inlet tube 68 having a one-way valve (not shown) that permits the entry of a gas into the container and prevents the exit of any liquid fuel is also provided. The wicking structure 62 is formed from a woven material, and the wicking structure is held in contact with the entire internal sidewall of the container 60.

Figure 8:
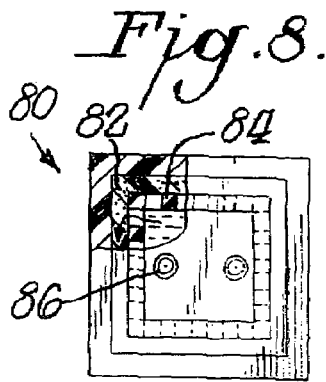
FIG. 8 is a top plan view partially broken away of still another alternative liquid fuel reservoir having a housing with a generally cubic shape.
Figure 9:
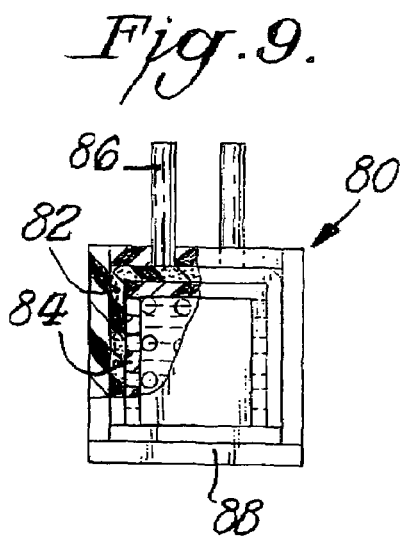
FIG. 9 is a front elevational view partially broken away of the liquid fuel reservoir of FIG. 8.

Referring to FIGS. 8 and 9, the container 80 has a cubic shape with a square cross section. The wicking structure 82 is held in place by retainer 84. The wicking structure 82 is constructed of foam and provides a path of liquid communication between the distal portions of the container 80 and the outlet tube 86. In this embodiment, the retainer 84 is formed as a perforated sheet that holds the wicking structure 82 in contact with the inner side walls and inner proximal surface of the container 80, as well as with portions of the inner distal surface of the container at the four distal corners. The end cap 88 forming the distal end of the container may, but need not, be removable.

Figure 10:
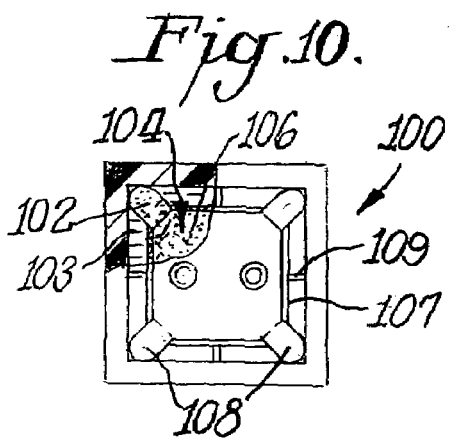
FIG. 10 is a top plan view partially broken away of a further liquid fuel reservoir having a housing with a generally cubic shape with an alternative configuration of wicking material.
Figure 11:
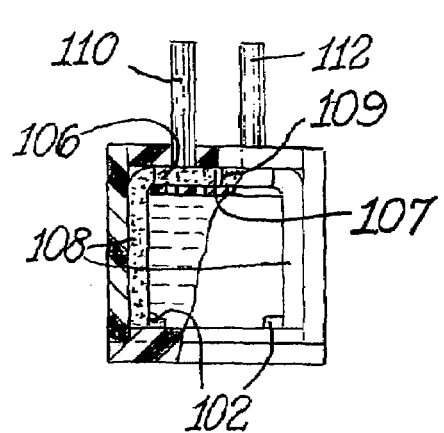
FIG. 11 is a front elevational view partially broken away of the liquid fuel reservoir of FIG. 10.

FIGS. 10 and 11 show an alternative embodiment using a different retainer and wicking structure. The container 100 comprises a generally cubic shape with a square cross section. The container 100 defines an internal volume for storing liquid fuel. L-shaped mounting clamps 102 extend from each corner of the distal internal surface of the container 100. A wicking structure 104 is formed as a central sheet 106 with four downwardly depending legs 108. The legs 108 extend toward the distal end internal surface of the container 100. The legs terminate at end portions that engage the L-shaped mounting clamps 102 at pins 103. In this embodiment, the mounting clamps 102 form the retainer to keep the end portions of the legs of the wicking structure 104 in position within the volume of the container 100. Fuel outlet tube 110 and gas inlet tube 112 extend into the container 100 at the proximal internal surface. The gas inlet tube 112 has a one-way valve (not shown) that permits the entry of a gas into the container. A backing plate 107 is connected to the sidewall of the container 100 with several supports 109 to hold the wicking structure 104 adjacent to the proximal internal surface of the container 100 and in fuel communication with the outlet tube 110. In this embodiment, the wicking structure 104 is positioned so as to direct liquid from the distal corners of the internal volume of the container 100 to the outlet tube 110. Even though the wicking structure does not contact completely any one of the internal sidewalls of the container, the wicking structure functions to direct liquid fuel to the outlet tube so that such fuel may be metered or pumped out of the fuel reservoir. Thus, in any orientation of the container 100, and at any stage of liquid fuel depletion within the container 100, the liquid fuel in the container will contact, or may be placed in contact with, wicking structure 104, either at central sheet 106 directly or through legs 108 to central sheet 106. Although not shown, alternatively the wicking structure can be modified by replacing the central sheet 106 with two linear members joined at the center to form a cross, wherein the ends of the two members are connected to the upper ends of the downwardly depending legs, and wherein the liquid fuel outlet tube extends through the proximal wall of the container to maintain fluid communication with the wicking structure by communicating with one of the two members, preferably with the junction of the two members, i.e. at the center of the cross.

Figure 12:
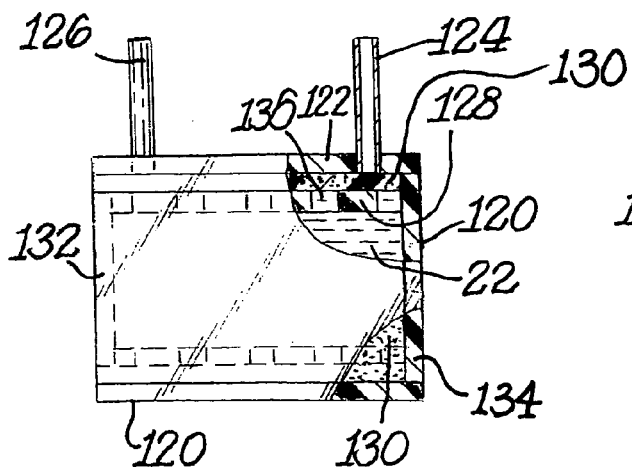
FIG. 12 is a top plan view of another alternative liquid fuel reservoir having a housing with a generally rectangular cross-sectional shape with an alternative configuration of wicking material, inlet and outlet tubes, and with portions of the drawing partially broken away to show certain structural components.
Figure 13:
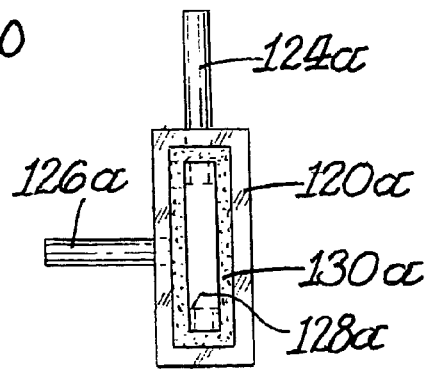
FIG. 13 is a side elevational view of yet another alternative liquid fuel reservoir opened at one end, and having an alternative configuration of wicking material, inlet and outlet tubes.

Referring next to FIG. 12, an alternative structure for a liquid fuel reservoir has a container 120 defining an internal volume for holding a liquid fuel mixture 22. An outlet tube 124 extends into the container 120 through a first sidewall surface 122. The outlet tube communicates between the internal volume of the container 120 and the outside of the container. A gas inlet tube 126 also extends into the container 120 through first sidewall surface 122. The gas inlet tube includes a one-way valve (not shown) that permits the entry of a gas but prevents liquid from flowing out of the container 120. In the embodiment of FIG. 12, the outlet tube 124 and gas inlet tube 126 are disposed along a sidewall of the container 120, rather than along the proximal end wall as shown in earlier embodiments. An embodiment identical to the embodiment of FIG. 12 except for the positions of the inlet and outlet tubes is shown in FIG. 13. The outlet tube 124a is disposed along a sidewall of the container 120a, whereas the gas inlet tube 126a is disposed along a different sidewall in FIG. 13. Such alternative orientations for the inlet and outlet tubes may provide greater flexibility when the liquid fuel reservoir is used to power a portable electronic device.

In FIGS. 12 and 13, a wicking structure 130 is provided within the volume of the container 120. The wicking structure 130 is formed as an internal sleeve defining an inner core that is void of wicking material and having outer surfaces that contact the internal sidewalls of the container 120. The wicking structure 130 is held in contact with the internal sidewalls of the container by a retainer 128 that has perforations or channels 136 extending therethrough. The wicking structure 130 contacts the distal 132 and proximal 134 end walls of the container 120 at the corners thereof where these end walls join the sidewalls. However, the wicking structure 130 does not cover the entire internal surfaces of such distal 132 and proximal 134 end walls. The wicking structure is designed to contact such corners so that the liquid fuel mixture may be drawn into the wicking structure by capillary action independent of either (a) the orientation of the liquid fuel reservoir; or (b) the extent to which the container volume has been drained of the liquid fuel mixture. The wicking structure thus contacts the portions of the container volume most distant from the connection to the outlet tube and associated pump. Moreover, by reducing the amount of the wicking material used to form the wicking structure, less internal volume of the container is filled by the wicking material. Thus, because a portion of the liquid fuel remains within the wicking material as the container volume is emptied of liquid fuel, this embodiment can increase the efficiency of fuel delivery as compared to liquid fuel reservoirs where more wicking material is inserted into the volume of the container.

Figure 14:
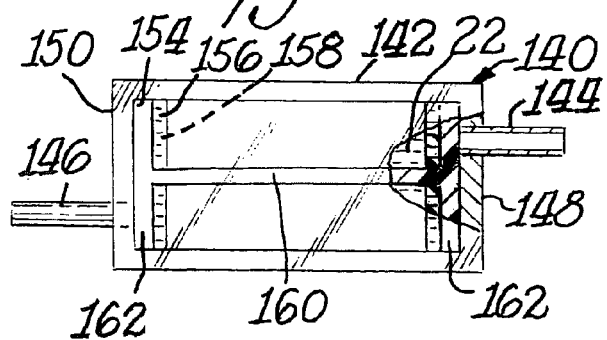
FIG. 14 is a top plan view of still another alternative liquid fuel reservoir having an alternative configuration of wicking material, inlet and outlet tubes, and with portions of the drawing partially broken away to show certain structural components.

FIG. 14 shows yet another embodiment of a liquid fuel reservoir according to the invention in which a container 140 defines an internal volume for holding a liquid fuel mixture 22. An outlet tube 144 extends into the container 140 through a proximal end wall surface 148. The outlet tube communicates between the internal volume of the container 140 and the outside of the container. A gas inlet tube 146 extends into the container 140 through a distal end wall surface 150. The gas inlet tube 146 includes a one-way valve (not shown) so as to prevent liquid from flowing out of the container 140. In the embodiment of FIG. 14, the outlet tube 144 and gas inlet tube 146 are disposed at opposite ends of the container 140, rather than both being disposed from the proximal end wall or side walls as shown in earlier embodiments.

A wicking structure 154 is provided within the volume of the container 140. The wicking structure 154 is formed with an I-beam shape having flanges 162 disposed at each end of a column 160. The flanges 162 are held in contact with the internal proximal end wall 148 and internal distal end wall 150, respectively, with retainers 156 having perforations or holes 158 therethrough. As shown in FIG. 14, the column 160 is disposed centrally with respect to flanges 162 to form the I-beam shape. Alternatively, the column portion could connect the flange portions at other orientations, such as disposed along the internal side wall or disposed at a diagonal. The flanges 162 of the wicking structure 154 shown in FIG. 14 contact the corners of the internal volume of the container 140 where the sidewalls 142 meet the end walls 148, 150. The wicking structure is designed to contact such corners so that liquid fuel may be drawn into the wicking structure by capillary action independent of either (a) the orientation of the liquid fuel reservoir; or (b) the extent to which the container volume has been drained of the liquid fuel mixture. This configuration locates wicking material in the most distant crevices or extremities of the container, and by virtue of the capillarity of the wicking material, puts the distant crevices into fluid communication with the outlet tube and associated pump. Moreover, by reducing the amount of the wicking material used to form the wicking structure, less internal volume of the container is filled by wicking material. Thus, because a portion of the liquid fuel remains within the wicking material as the container volume is emptied of the liquid fuel, this embodiment can increase the efficiency of fuel delivery as compared to liquid fuel reservoirs where more wicking material is inserted into the volume of the container.

Figure 15:
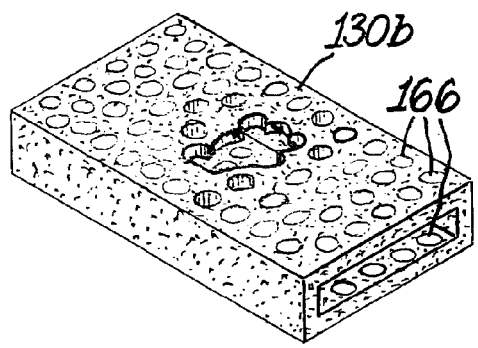
FIG. 15 is a perspective view of a wicking structure defining a hollow core and having perforations therethrough.

The amount of wicking material that is used to form a wicking structure for use in a liquid fuel reservoir according to the invention also can be minimized by removing or eliminating portions of the wicking material without adversely impacting the structural integrity or wicking ability of the wicking material. For example, where a foam is selected for the wicking material, the foam may be perforated by piercing or puncturing the foam to form holes therethrough. As shown in FIG. 15, a wicking structure 130b formed as a sleeve suitable for use in the embodiments of the invention shown in FIGS. 12 and 13, has been punctured to form holes 166 through the thickness of the foam material forming the wicking structure. Such holes can be provided in a regular or irregular pattern, although a regular grid-like pattern is shown in FIG. 15. Moreover, holes may be provided in the side walls of the wicking structure, although holes 166 are shown only through the top and bottom walls of the wicking structure 130b. Sufficient foam material is left in the wicking structure 130b so that such material will wick and deliver the liquid fuel to the outlet tube when pumping force is applied to the outlet.

Figure 16:
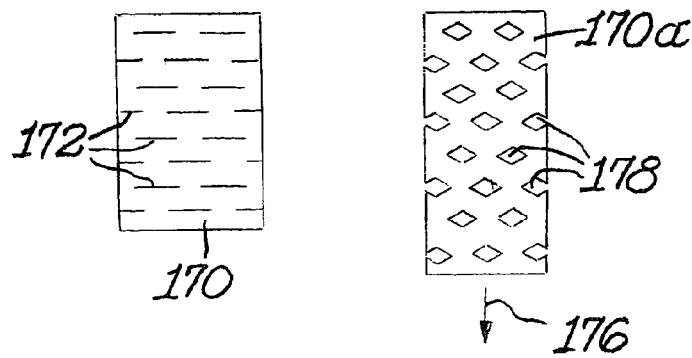
FIG. 16 is a top plan view of the surface of a wicking material having slits formed therein.
Figure 17:
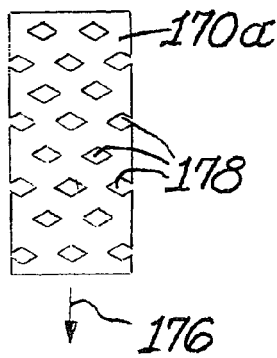
FIG. 17 is a top plan view of a wicking material having expanded slits formed therein.

A wicking structure with acceptable capillary or wicking characteristics but with lesser wicking material may also be formed from expanded foam or other sheet form wicking material. Referring to FIGS. 16 and 17, an expanded foam material is made by slitting through the thickness of a foam sheet 170 to form a series of slits 172 (FIG. 16). The foam sheet 170 is then stretched or pulled in the direction of arrows 176 (FIG. 17) to open the slits 172 to form open elongated slots 178. A wicking structure can then be formed from the expanded foam sheet 170a.

FIGS. 18-37 are schematic diagrams of a number of embodiments of the liquid fuel reservoir of the invention in which the external volume of the wicking structure is minimized to increase the amount of the liquid fuel that the reservoir can hold. For illustration purposes, these liquid fuel reservoirs all have a rectangular shape with a rectangular cross section in FIGS. 18-37. However, liquid fuel reservoirs of similar construction having a different shape, e.g. a rectangular shape with a square cross section or a cubical shape with a square cross section or irregular shapes, are also included within the scope of the invention.

Figure 18:
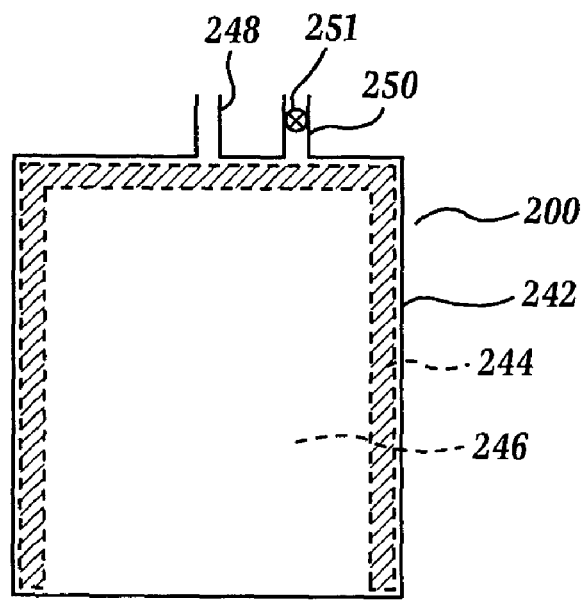
FIG. 18 is a schematic diagram of a liquid fuel reservoir viewed from the front with a wicking structure having the external volume, as defined below, minimized.
Figure 19:
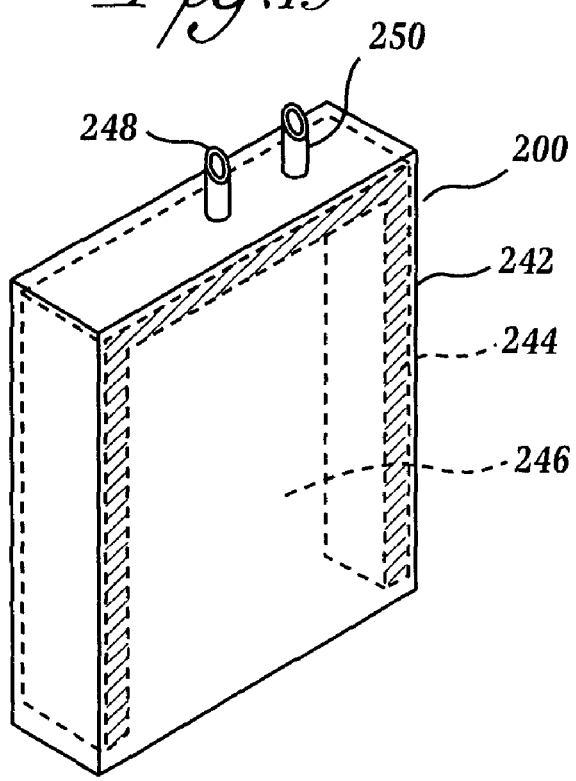
FIG. 19 is a schematic diagram of the liquid fuel reservoir of FIG. 18 presented from a perspective view.

As shown in FIG. 18, a liquid fuel reservoir 200 has a container 242 that defines a volume 246 for holding a liquid fuel mixture. A wicking structure 244 in the shape of two vertical posts linked to a crossbar at the top is provided along the inside top surface and inside side surfaces of the container 242. An outlet tube 248 and inlet tube 250 extend through a top wall of the container. The liquid outlet tube 248 is in liquid communication with the wicking structure 244. The inlet tube 250 has a one-way valve (251) that permits the entry of a fluid into the container and prevents the outflow of any liquid. FIG. 19 is a perspective view of the liquid fuel reservoir of FIG. 18. The wicking structure 244 extends substantially from the front to the back of the volume 246 inside the container 242, for example, by directly contacting the front and back walls of the container or by almost contacting the front and back walls (FIG. 19).

With such a design, every extremity of the volume inside the container is in liquid communication with the liquid outlet tube 248 at least through the wicking structure 244 via capillarity. This allows any liquid fuel inside the container to be delivered to the exterior of the container via a liquid delivery means, such as a pump, connected to the liquid outlet tube 248 regardless of the amount of the liquid fuel that has been discharged from the liquid fuel reservoir and independent of the orientation of the liquid fuel reservoir.

Figure 20:
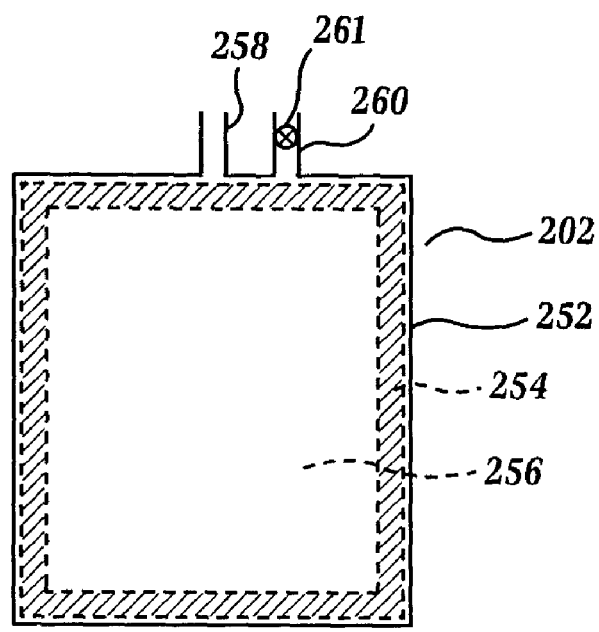
FIG. 20 is a schematic diagram of a liquid fuel reservoir viewed from the front with an alternative wicking structure having the external volume minimized.
Figure 21:
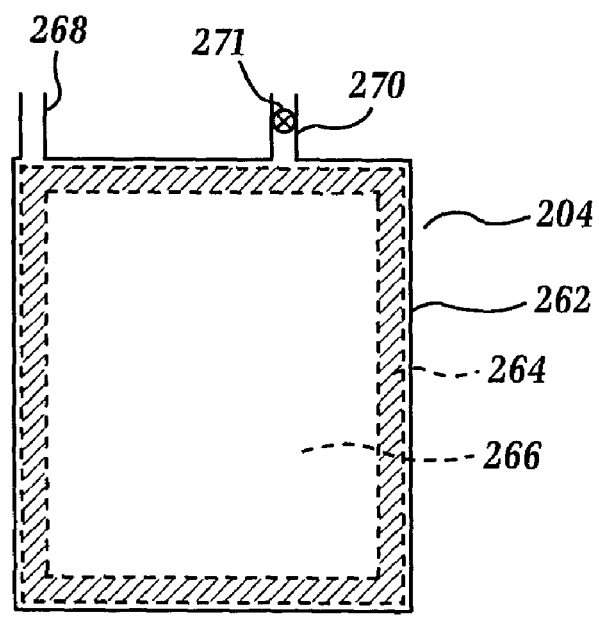
FIG. 21 is a schematic diagram of a liquid fuel reservoir similar to the reservoir of FIG. 20 viewed from the front with a wicking structure having the external volume minimized, wherein an outlet passageway is placed at a different location.

FIGS. 20 and 21 show two other embodiments of the liquid fuel reservoir of the invention having the external volume of the wicking structure minimized. The liquid fuel reservoir 202, 204 includes a container 252, 262 defining a volume 256, 266, a wicking structure 254, 264 in the shape of a rectangular rim, and an outlet tube 258, 268 and an inlet tube 260, 270 extending through a top wall of the container. The outlet tube 258, 268 is in liquid communication with the wicking structure 254, 264. The inlet tube 260, 270 contains a one-way valve (261, 271) that permits the inflow of a fluid and prevents the outflow of any liquid. The wicking structure 254, 264 is in contact with substantially the entire internal surfaces of the top, side and bottom walls of the container 252, 262. Although not shown, the wicking structure 254, 264 extends substantially from the front to the back of the volume of the container 252, 262 by contacting portions of the internal surfaces of the front and back walls of the container along or proximate the junctions of the front or back walls with the top, side or bottom walls. All the extremities of the volume inside the container are in liquid communication with the wicking structure via at least capillarity. The embodiments of FIGS. 20 and 21 differ only in the location of the outlet tube, with the outlet tube 258 disposed near the center of the top wall and the outlet tube 268 disposed near a corner.

Figure 22:
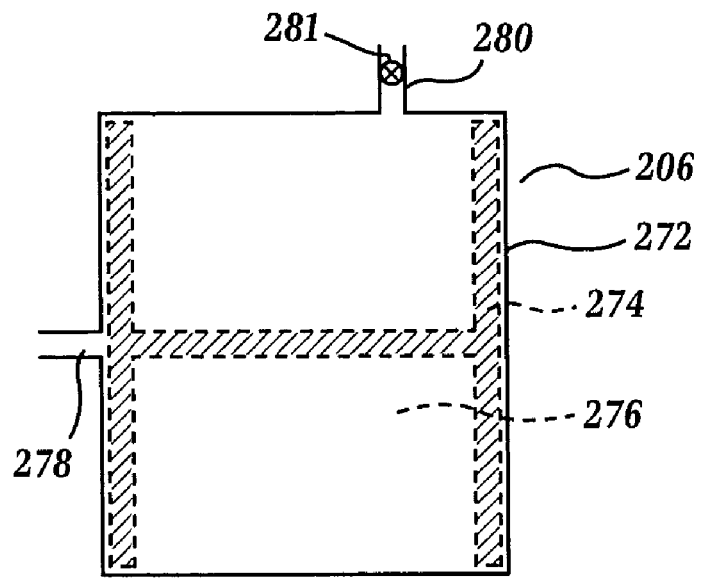
FIG. 22 is a schematic diagram of a liquid fuel reservoir viewed from the front with an alternative wicking structure having the external volume minimized.
Figure 23:
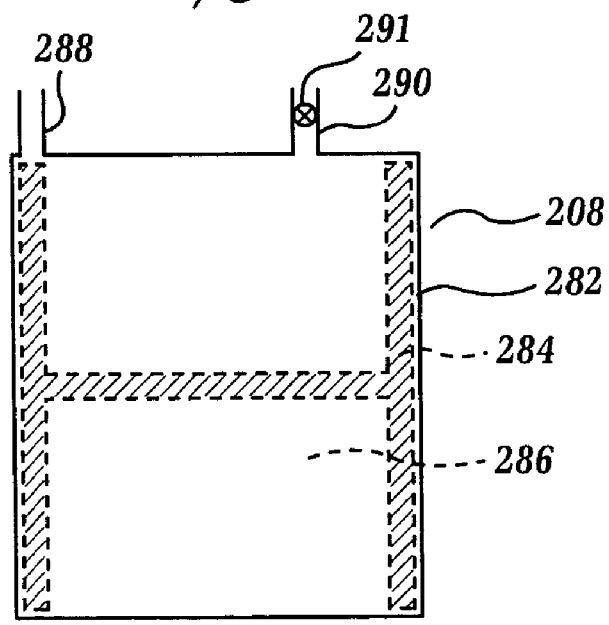
FIG. 23 is a schematic diagram of a liquid fuel reservoir similar to the reservoir of FIG. 22 viewed from the front with a wicking structure having the external volume minimized, wherein an outlet passageway is placed at a different location.

FIGS. 22 and 23 show two other embodiments of the liquid fuel reservoir of the invention having the external volume of the wicking structure minimized. The liquid fuel reservoir 206, 208 includes a container 272, 282 defining a volume 276, 286, a wicking structure 274, 284 in the shape of an alphabet letter "H", an outlet tube 278, 288 extending through a wall of the container, and an inlet tube 280, 290 extending through the same or a different wall of the container. The outlet tube 278, 288 is in liquid communication with the wicking structure 274, 284. The inlet tube 280, 290 contains a one-way valve (281, 291) that permits the inflow of a fluid and prevents the outflow of any liquid. The wicking structure 274, 284 is in contact with substantially the entire internal side surface of the container 272, 282 and two portions each of the internal top and bottom surfaces of the container 272, 282 at or proximate the corners. Although not shown, the wicking structure 274, 284 extends substantially from the front to the back of the volume of the container 272, 282. All the extremities of the volume inside the container are in liquid communication with the wicking structure via at least capillarity. The embodiments of FIGS. 22 and 23 differ only in the location of the outlet tube with the outlet tube 278 extending through a side wall and the outlet tube 288 extending through a top wall of the container.

Figure 24:
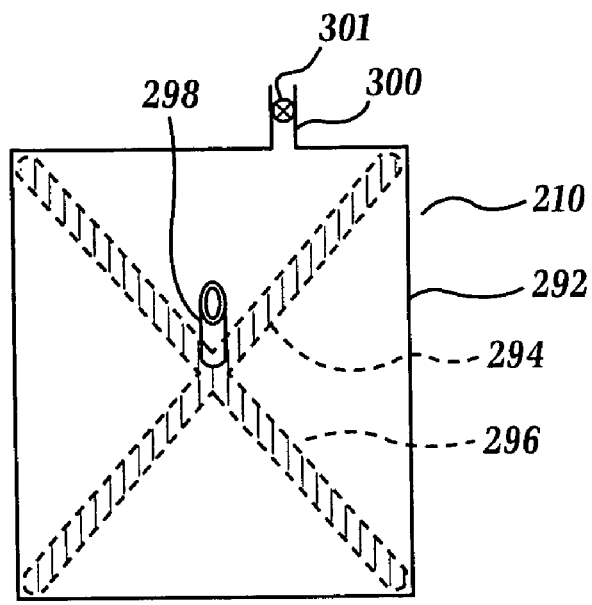
FIG. 24 is a schematic diagram of a liquid fuel reservoir viewed from the front with an alternative wicking structure having the external volume minimized.
Figure 25:
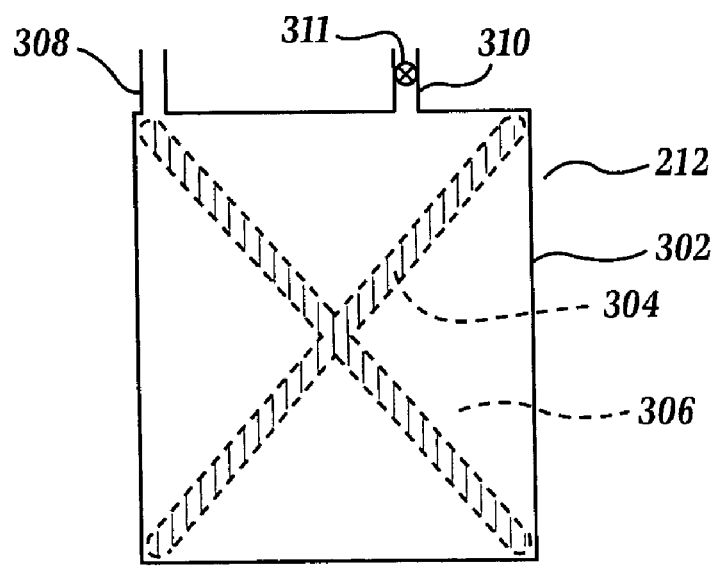
FIG. 25 is a schematic diagram of a liquid fuel reservoir similar to the reservoir of FIG. 24 viewed from the front with a wicking structure having the external volume minimized, wherein an outlet passageway is placed at a different location.

FIGS. 24 and 25 show two other embodiments of the liquid fuel reservoir of the invention having the external volume of the wicking structure minimized. The liquid fuel reservoir 210, 212 includes a container 292, 302 defining a volume 296, 306, a wicking structure 294, 304 in the shape of an alphabet letter "X", an outlet tube 298, 308 extending through a wall of the container, and an inlet tube 300, 310 extending through the same or a different wall of the container. The outlet tube 298, 308 is in liquid communication with the wicking structure 294, 304. The inlet tube 300, 310 contains a one-way valve (301, 311) that permits the inflow of a fluid and prevents the outflow of a liquid. The wicking structure 294, 304 is in contact with portions of the internal surfaces of the container 292, 302 at or proximate the corners. Although not shown, the wicking structure 294, 304 extends substantially from the front to the back of the volume of the container 292, 302. All the extremities of the volume inside the container are in liquid communication with the wicking structure via at least capillarity. The embodiments of FIGS. 24 and 25 differ only in the location of the outlet tube with the outlet tube 298 extending through a side wall and the outlet tube 308 extending through a top wall of the container.

Figure 26:
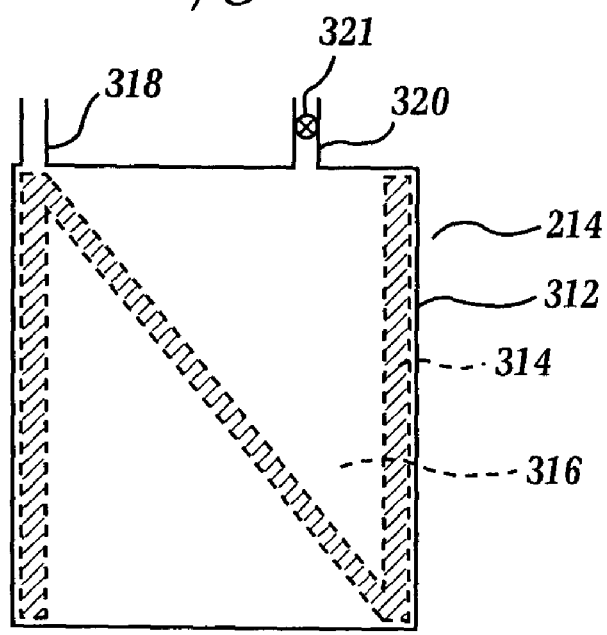
FIG. 26 is a schematic diagram of a liquid fuel reservoir viewed from the front with an alternative wicking structure having the external volume minimized.
Figure 27:
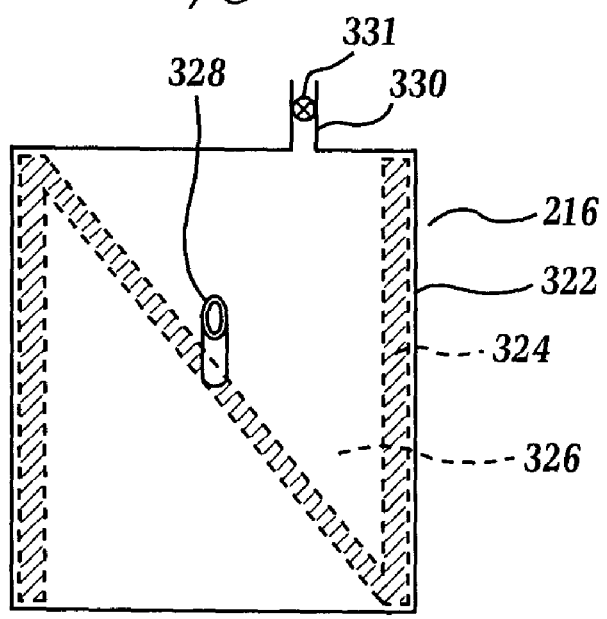
FIG. 27 is a schematic diagram of a liquid fuel reservoir similar to the reservoir of FIG. 26 viewed from the front with a wicking structure having the external volume minimized, wherein an outlet passageway is placed at a different location.

FIGS. 26 and 27 show two other embodiments of the liquid fuel reservoir of the invention having the external volume of the wicking structure minimized. The liquid fuel reservoir 214, 216 includes a container 312, 322 defining a volume 316, 326, a wicking structure 314, 324 in the shape of an alphabet letter "N", an outlet tube 318, 328 extending through a wall of the container, and an inlet tube 320, 330 extending through the same or a different wall of the container. The outlet tube 318, 328 is in liquid communication with the wicking structure 314, 324. The inlet tube 320, 330 contains a one-way valve (321, 331) that permits the inflow of a fluid and prevents the outflow of any liquid. The wicking structure 314, 324 is in contact with substantially the entire internal side surface of the container 312, 322 and two portions each of the internal top and bottom surfaces of the container 312, 322 at or proximate the corners. Although not shown, the wicking structure 314, 324 extends substantially from the front to the back of the volume of the container 312, 322. All the extremities of the volume inside the container are in liquid communication with the wicking structure via at least capillarity. The embodiments of FIGS. 26 and 27 differ only in the location of the outlet tube with the outlet tube 318 extending through a top wall and the outlet tube 328 extending through a side wall of the container.

FIG. 28 illustrates another embodiment of the liquid fuel reservoir of the invention having the external volume of the wicking structure minimized. The liquid fuel reservoir 218 includes a container 332 defining a volume 336, a wicking structure 334 in the shape of an inverted alphabet letter "M", an outlet tube 338 and an inlet tube 340 extending through a top wall of the container. The outlet tube 338 is in liquid communication with the wicking structure 334. The inlet tube 340 contains a one-way valve (341) that permits the inflow of a fluid and prevents the outflow of any liquid. The wicking structure 334 is in contact with substantially the entire internal side surface of the container 332 and two portions each of the internal top and bottom surfaces of the container 332 at or proximate the corners. Although not shown, the wicking structure 334 extends substantially from the front to the back of the volume of the container 332. All the extremities of the volume inside the container are in liquid communication with the wicking structure via at least capillarity.

Figure 30:
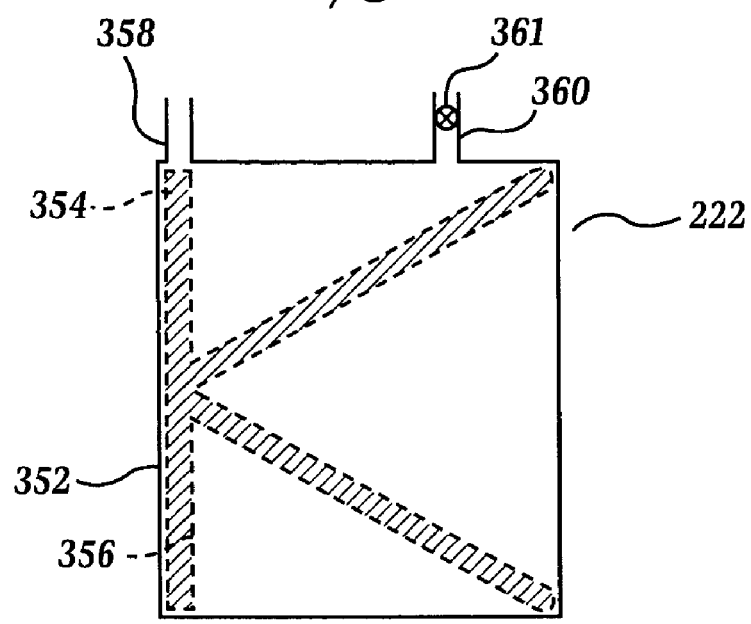
FIG. 30 is a schematic diagram of a liquid fuel reservoir similar to the reservoir of FIG. 29 viewed from the front with a wicking structure having the external volume minimized, wherein an outlet passageway is placed at a different location.

FIGS. 29 and 30 show two other embodiments of the liquid fuel reservoir of the invention having the external volume of the wicking structure minimized. The liquid fuel reservoir 220, 222 includes a container 342, 352 defining a volume 346, 356, a wicking structure 344, 354 in the shape of an alphabet letter "K", an outlet tube 348, 358 extending through a wall of the container, and an inlet tube 350, 360 extending through the same or a different wall of the container. The outlet tube 348, 358 is in liquid communication with the wicking structure 344, 354. The inlet tube 350, 360 contains a one-way valve (351, 361) that permits the inflow of a fluid and prevents the outflow of any liquid. The wicking structure 344, 354 is in contact with substantially an entire internal surface of a side wall of the container 342, 352, the internal surfaces of a portion of the other side wall and a portion of the top wall at or proximate where the other side wall and top wall meet, and the internal surfaces of a portion of the other side wall and a portion of the bottom wall at or proximate where the other side wall and bottom wall meet. Although not shown, the wicking structure 344, 354 extends substantially from the front to the back of the volume of the container 342, 352. All the extremities of the volume inside the container are in liquid communication with the wicking structure via at least capillarity. The embodiments of FIGS. 29 and 30 differ only in the location of the liquid outlet tube with the outlet tube 348 extending through a side wall and the outlet tube 358 extending through a top wall of the container.

The embodiment of FIG. 29 or 30 can be modified by having the wicking structure turned 90°, so that the wicking structure resembles the alphabet letter "K" turned 90° when viewed from the front. In other words, the vertical member of the wicking structure that contacts substantially the entire inner surface of a side wall of the container in FIG. 29 or 30 becomes a horizontal member contacting substantially the entire inner surface of a top wall of the container and the wicking structure further has two slanted members being connected to the horizontal member at a location proximate the center of the horizontal member and extending to contact portions of the inner surfaces of the two side walls and a bottom wall proximate the corners opposite the top wall, i.e. the corners formed by the two side walls and the bottom wall of the container. Alternatively, these embodiments have the wicking structure in the shape of the alphabet letter "K" or "K" turned 90° can be modified by having two slant members not connected to each other, wherein the two slant members are still connected to the vertical or horizontal member, such that the wicking structure is in the shape of a symbol "π" or "π" turned 90° when viewed from the front. In these modified embodiments, the liquid fuel outlet tube should extend through the wall that the vertical or horizontal member of the wicking structure contacts in its substantial entirety, so that the liquid fuel outlet tube communicates with the vertical or horizontal member of the wicking structure. Although not shown, these modified embodiments of the embodiment according FIG. 29 or 30 are within the scope of the present invention.

Figure 31:
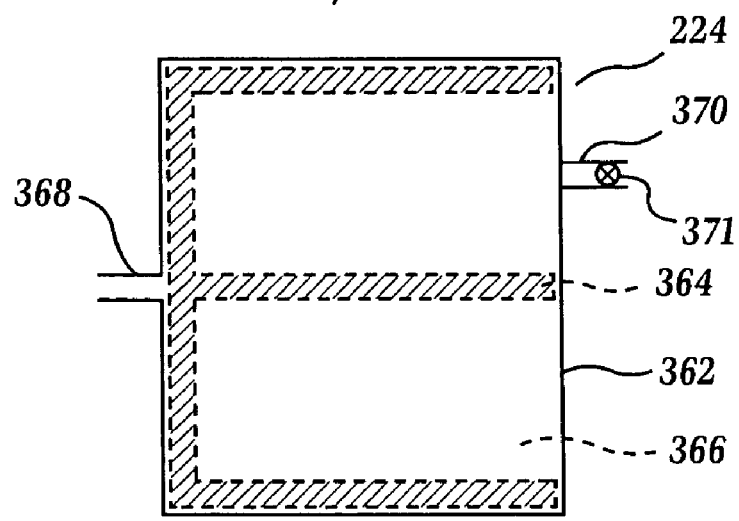
FIG. 31 is a schematic diagram of a liquid fuel reservoir viewed from the front with an alternative wicking structure having the external volume minimized.

FIGS. 31 and 32 show two other embodiments of the liquid fuel reservoir of the invention having the external volume of the wicking structure minimized. The liquid fuel reservoir 224, 226 includes a container 362, 372 defining a volume 366, 376, a wicking structure 364, 374 in the shape of an alphabet letter "E", an outlet tube 368, 378 extending through a wall of the container, and an inlet tube 370, 380 extending through the same or a different wall of the container. The outlet tube 368, 378 is in liquid communication with the wicking structure 364, 374. The inlet tube 370, 380 contains a one-way valve (371, 381) that permits the inflow of a fluid and prevents the outflow of a liquid. The wicking structure 364, 374 is in contact with substantially the entire internal surfaces of a side wall, top wall and bottom wall of the container 362, 372, a portion of the internal surface of the other side wall at or proximate where the other side wall and top wall meet, a portion of the internal surface of the other side wall at or proximate where the other side wall and bottom wall meet, and another portion of the internal surface of the other side wall. Although not shown, the wicking structure 364, 374 extends substantially from the front to the back of the volume of the container 362, 372. All the extremities of the volume inside the container are in liquid communication with the wicking structure via at least capillarity. The embodiments of FIGS. 31 and 32 differ only in the location of the outlet tube with the outlet tube 368 extending through a side wall and the outlet tube 378 extending through a top wall of the container.

Figure 36:
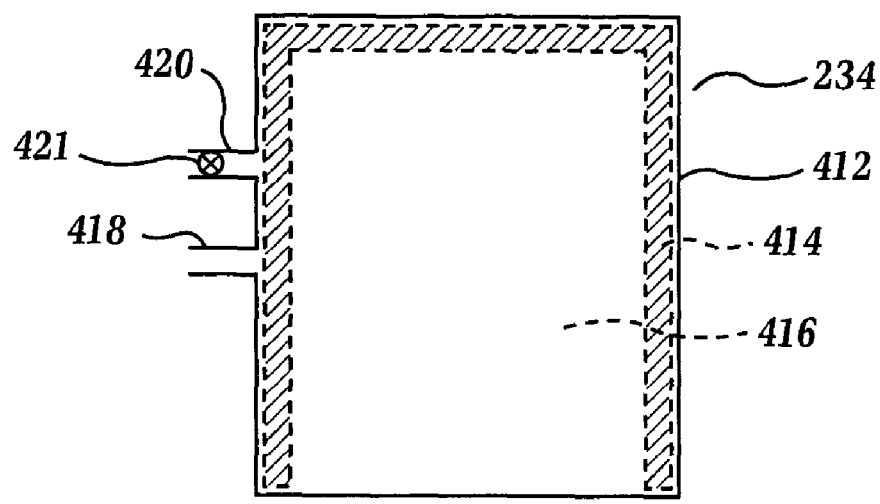
FIG. 36 is a schematic diagram of a liquid fuel reservoir similar to the reservoir of FIG. 18 viewed from the front with a wicking structure having the external volume minimized, wherein an outlet passageway is placed at a different location.
Figure 37:
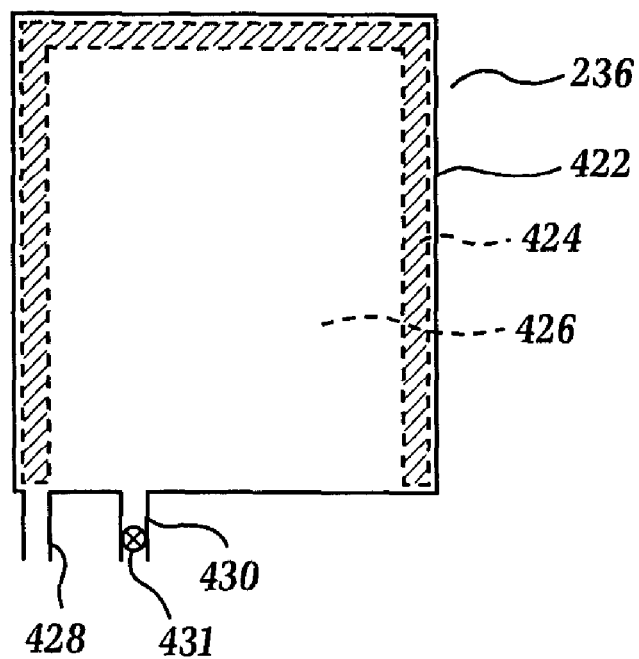
FIG. 37 is a schematic diagram of another liquid fuel reservoir similar to the reservoir of FIG. 18 viewed from the front with a wicking structure having the external volume minimized, wherein an outlet passageway is placed at a different location.

As disclosed above, the location of the liquid fuel outlet passageway can be varied for some of the embodiments of the liquid fuel reservoir of the invention without affecting the aims of the invention. FIGS. 36 and 37 illustrate two more examples of varying the location of the liquid fuel outlet passageway for an embodiment of the liquid fuel reservoir having the external volume of the wicking structure minimized. The embodiments of FIGS. 36 and 37 are the same as that according to FIG. 18 except for the location of the liquid fuel outlet passageway. A liquid fuel reservoir 234, 236 is provided having a container 412, 422 that defines a volume 416, 426 for holding a liquid fuel mixture (FIGS. 36 and 37). A wicking structure 414, 424 in the shape of two vertical posts linked to a crossbar at the top is provided along the inside surfaces of the top and side walls of the container 412, 422. In the embodiment according to FIG. 36, an outlet tube 418 and inlet tube 420 extend through a side wall of the container. In contrast, an outlet tube 428 and inlet tube 430 extend through a bottom wall of the container in the embodiment of FIG. 37. The outlet tube 418, 428 is in liquid communication with the wicking structure 414, 424. The inlet tube 420, 430 has a one-way valve (421, 431) that permits the entry of a fluid into the container and prevents the outflow of any liquid. The wicking structure 414, 424 extends substantially from the front to the back of the volume 416, 426 inside the container 412, 422, for example, by directly contacting the front and back walls of the container or by almost contacting the front and back walls. The present invention includes other embodiments of the liquid fuel reservoir that differ from the embodiments illustrated in the application in the location of the outlet passageway and/or the inlet.

Figure 34:
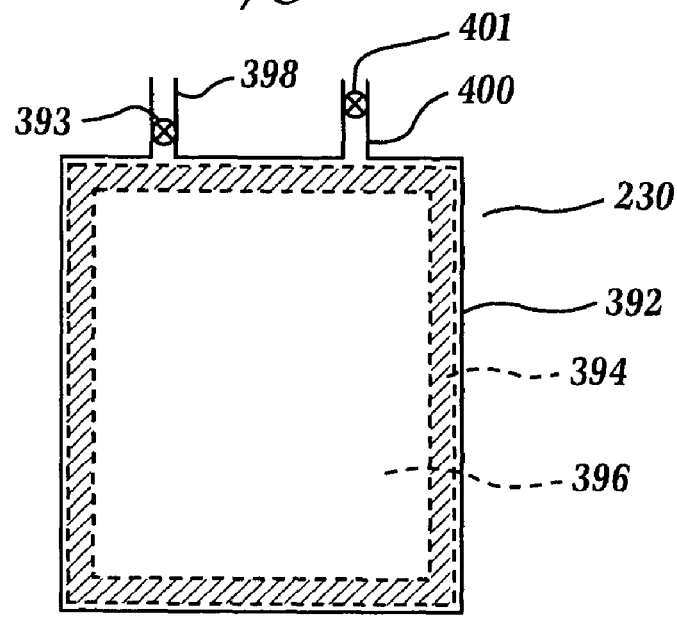
FIG. 34 is a schematic diagram of another recyclable or rechargeable liquid fuel reservoir having an outlet passageway containing a valve.
Figure 35:
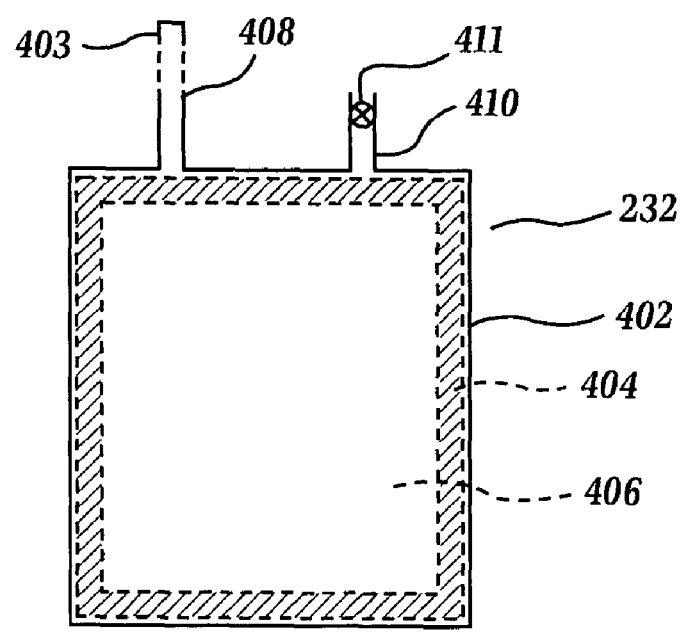
FIG. 35 is a schematic diagram of an alternative recyclable or rechargeable liquid fuel reservoir having a detachable cap at the end of an outlet passageway.

FIGS. 33, 34 and 35 show three embodiments of the recyclable liquid fuel reservoir of the invention having the external volume of the wicking structure minimized. The liquid fuel reservoir 228, 230, 232 includes a container 382, 392, 402 defining a volume 286, 296, 406, a wicking structure 284, 294, 404 in the shape of a rectangular rim, and an outlet tube 388, 398, 408 and an inlet tube 390, 400, 410 extending through the top wall of the container. The outlet tube 388, 398, 408 is in liquid communication with the wicking structure 384, 394, 404. The inlet tube 390, 400, 410 contains a one-way valve (391, 401, 411) that permits the inflow of a fluid and prevents the outflow of any liquid. The wicking structure 384, 394, 404 is in contact with substantially the entire internal surfaces of the top, side and bottom walls of the container 382, 392, 402. Although not shown, the wicking structure 384, 394, 404 extends substantially from the front to the back of the volume of the container 382, 392, 402. All the extremities of the volume inside the container are in liquid communication with the wicking structure via at least capillarity. The embodiments of FIGS. 33, 34 and 35 differ only in the means described below that allows the introduction of fresh liquid fuel into the container to replenish any liquid fuel which has been discharged.

In the recyclable liquid fuel reservoir of FIG. 33, a sealable, detachable cap 383 having a membrane 385 is provided at the end of the outlet tube 388. After the liquid fuel inside the container has been partially or completely discharged, the outlet tube can be disconnected from a liquid fuel cell or liquid fuel reformer and capped with the sealable cap 383. To replenish the container with a liquid fuel, fresh liquid fuel in a syringe can be introduced into the container 382 via injection after the membrane 385 is punctured with a syringe needle. When the syringe needle is withdrawn from the membrane 385 after the container is replenished with the liquid fuel, the membrane provides a liquid seal allowing the liquid fuel reservoir 228 to be stored or shipped for the next use. Alternatively, to replenish the container with a liquid fuel, fresh liquid fuel can be introduced into the container through the one-way valve of the inlet tube 390 after the outlet tube 388 has been capped with the sealable cap 383.

In the recyclable liquid fuel reservoir of FIG. 34, a two-way valve 393 is provided in the outlet tube 398. After the liquid fuel inside the container has been partially or completely discharged, the liquid outlet tube can be disconnected from a liquid fuel cell or liquid fuel reformer and closed off with the two-way valve 393. To replenish the container with a liquid fuel, fresh liquid fuel can be introduced into the container 392 through the outlet tube 398 after the two-way valve 393 is opened, or through the one-way valve of the inlet tube 400 while the two-way valve 393 remained closed. After the container is replenished with the liquid fuel, the liquid fuel reservoir 230 can be stored or shipped for future use (if the two-way valve 393 has been open for liquid fuel replenishment, the valve should be turned off for storage or shipment).

In the recyclable liquid fuel reservoir of FIG. 35, a sealable, detachable cap 403 is provided for the outlet tube 408. The cap 403 is not attached to the outlet tube when the liquid outlet tube is connected to a liquid fuel cell or liquid fuel reformer. After the liquid fuel inside the container has been partially or completely discharged, the outlet tube 408 can be disconnected from the liquid fuel cell or liquid fuel reformer. To replenish the container with a liquid fuel, fresh liquid fuel can be introduced into the container 402 through the inlet tube 410 via the one-way valve with the cap 403 not attached to the outlet tube 408, so that the outlet tube can act as a gas vent. After the container is replenished with the liquid fuel, the outlet tube 408 is closed with the cap 403 allowing the liquid fuel reservoir 232 to be stored or shipped for future use.

The recyclable liquid fuel reservoirs of FIGS. 33-35 are related to the liquid fuel reservoirs of FIGS. 20 and 21 in that the wicking structures of these liquid fuel reservoirs all have a configuration of a rectangular rim. The recyclable liquid fuel reservoirs of FIGS. 33-35 result from modifications of a liquid fuel reservoir similar to the embodiments of FIGS. 20 and 21 by adding a sealable, detachable cap with or without a membrane or a two-way valve at the outlet tube. Similar modifications can be made to the outlet tubes of other embodiments, .e.g. the embodiments of FIGS. 18, 19, and 22-32, of the liquid fuel reservoirs to make recyclable versions of the liquid fuel reservoirs. These recyclable versions of the liquid fuel reservoirs are also within the scope of the invention.

Figure 38:
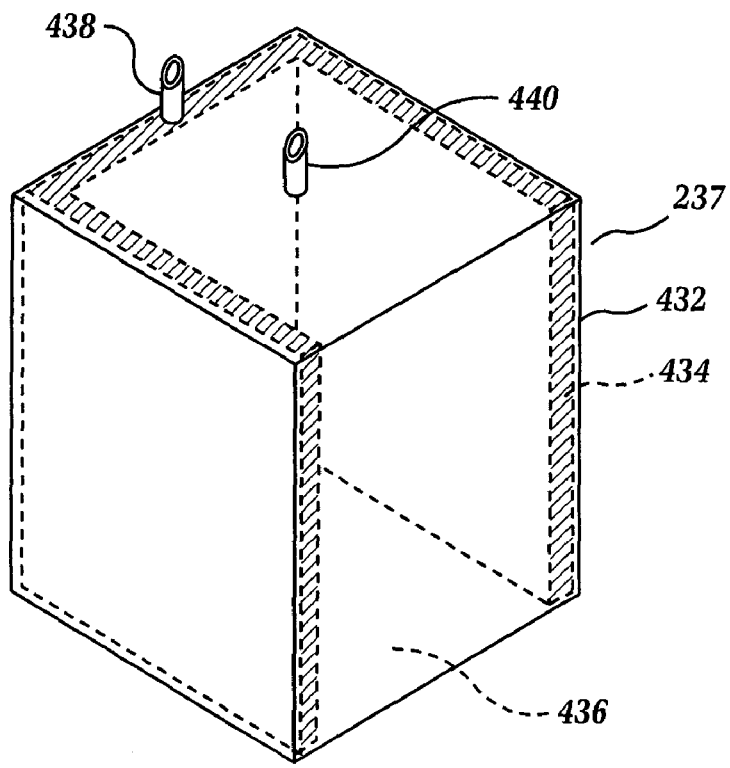
FIG. 38 is a perspective view of another liquid fuel reservoir according to the invention shown schematically with an alternative wicking structure having the external volume minimized.
Figure 39:
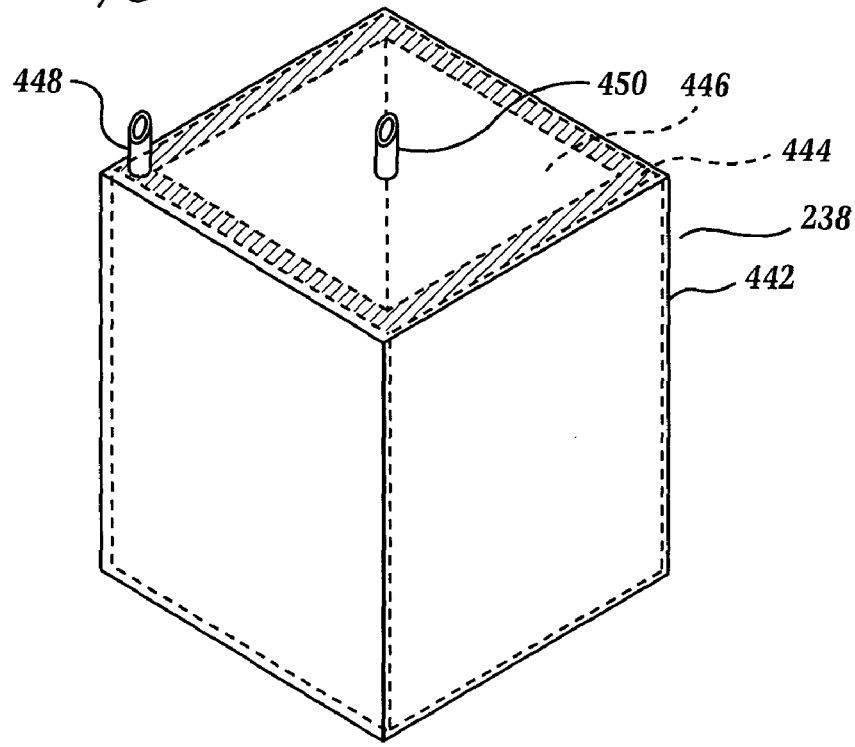
FIG. 39 is a perspective view of another liquid fuel reservoir according to the invention shown schematically with an alternative wicking structure having the external volume minimized.
Figure 40:
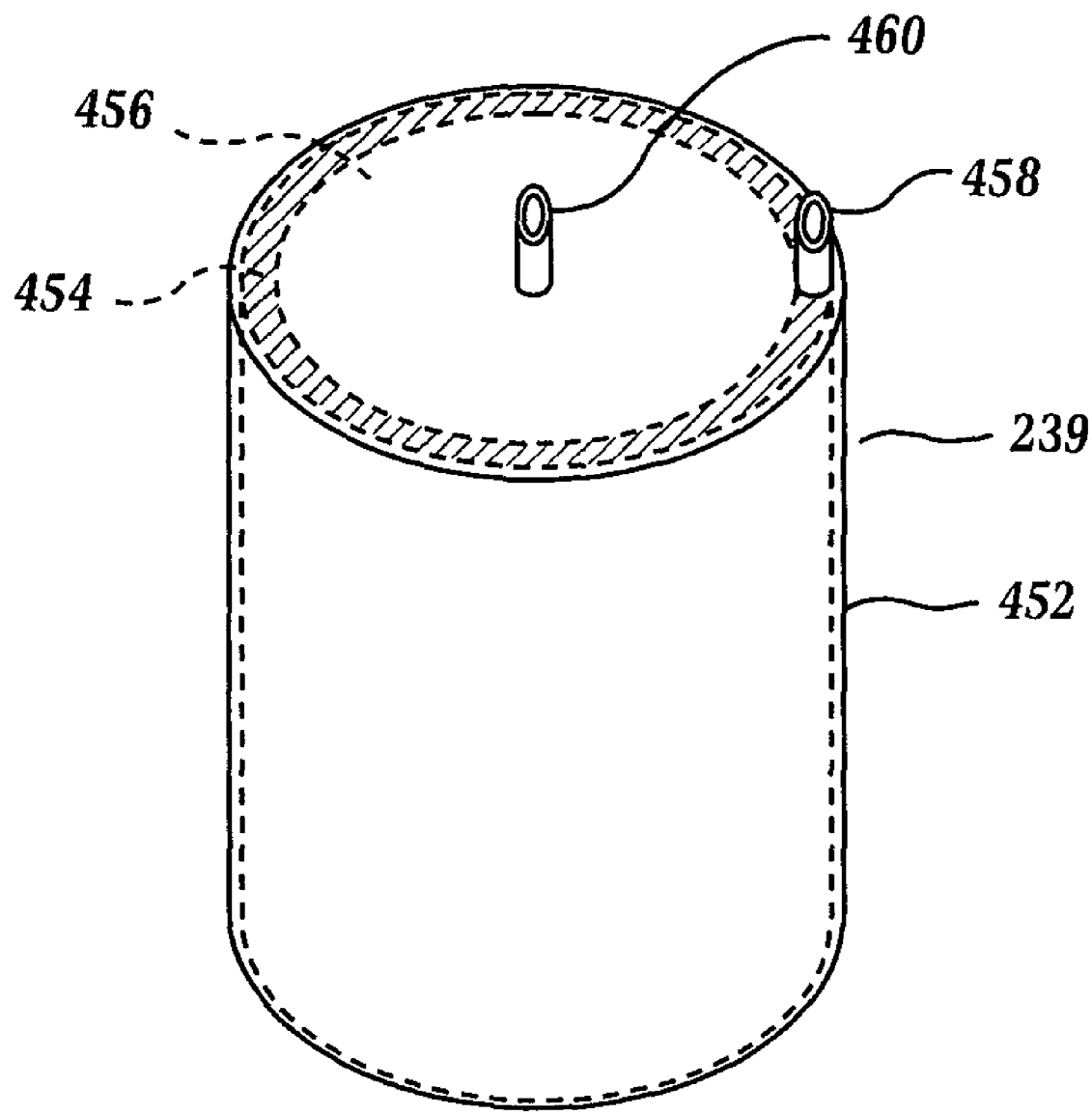
FIG. 40 is a perspective view of another liquid fuel reservoir according to the invention shown schematically with an alternative wicking structure having the external volume minimized.

FIGS. 38-40 show three embodiments of the liquid fuel reservoir of the invention in which the external volume of the wicking structure is minimized. The liquid fuel reservoir 237 in FIG. 38 comprises a container 432 having a square or rectangular cross section and six walls (two end walls and four lateral walls) defining a volume 436 for holding a liquid fuel inside the container. There is a wicking structure 434 having three contiguous sheets of wicking material disposed adjacent to three of the lateral walls of the container. An edge of the sheet of the wicking material is disposed proximate one of the end walls and the opposite edge of the sheet of the wicking material is disposed proximate the remaining end wall. In the embodiment shown in FIG. 38, an outlet passageway 438 and inlet 440 extend through one of the end walls. The liquid fuel reservoir 238 in FIG. 39 comprises a container 442 having a square or rectangular cross section and six walls (two end walls and four lateral walls) defining a volume 446 for holding a liquid fuel inside the container. There is a wicking structure 444 having four contiguous sheets of wicking material disposed adjacent to the lateral walls of the container. An edge of the sheet of the wicking material is disposed proximate one of the end walls and the opposite edge of the sheet of the wicking material is disposed proximate the remaining end wall. In the embodiment shown in FIG. 39, an outlet passageway 448 and inlet 450 extend through one of the end walls. The liquid fuel reservoir 239 in FIG. 40 comprises a cylindrical container 452 having a circular cross section and three walls (two end walls and a curved lateral wall) defining a volume 456 for holding a liquid fuel inside the container. There is a wicking structure 454 having a sheet of wicking material disposed adjacent to the curved lateral wall of the container. Two opposite edges of the wicking structure are disposed proximate the two end walls of the container. In the embodiment shown in FIG. 40, an outlet passageway 458 and inlet 460 extend through one of the end walls.

Figure 41:
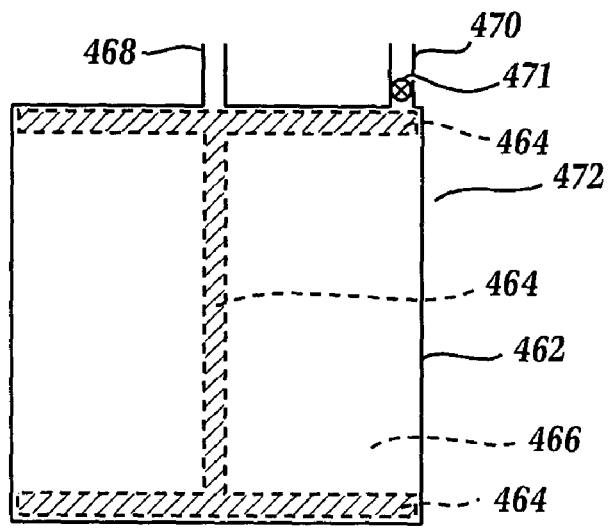
FIG. 41 is a schematic vertical cross-sectional view of a liquid fuel reservoir according to the invention.
Figure 42:
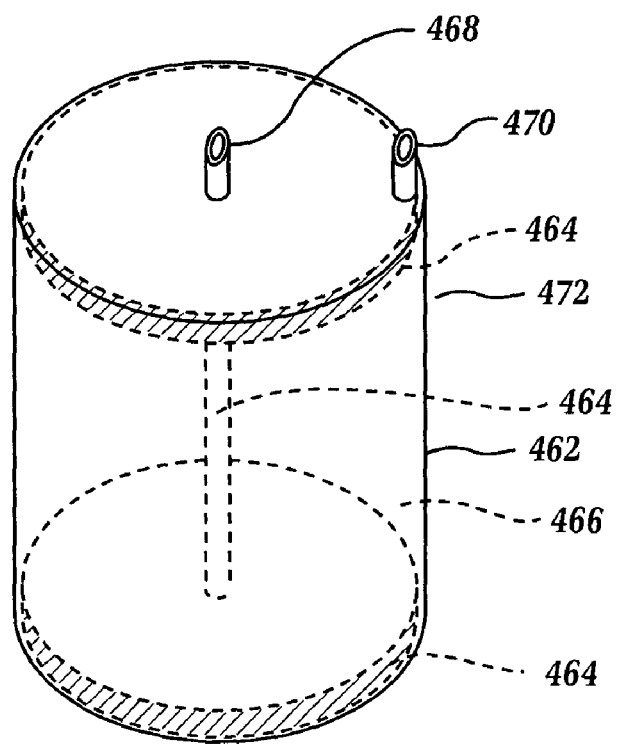
FIG. 42 is a perspective view of the liquid fuel reservoir of FIG. 41, wherein the liquid fuel reservoir is in the shape of a cylinder.
Figure 43:
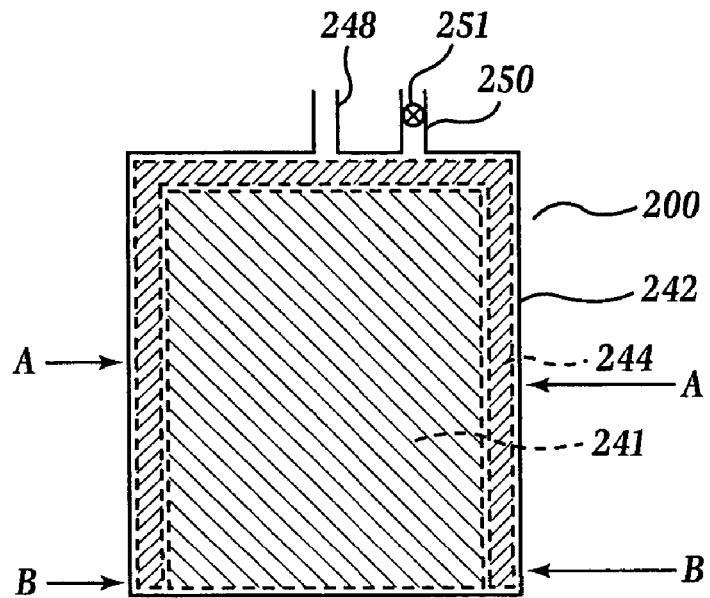
FIG. 43 is a schematic vertical cross-sectional view of one of the embodiments the liquid fuel reservoir of FIG. 18 having at least one porous internal compartment.
Figure 44:
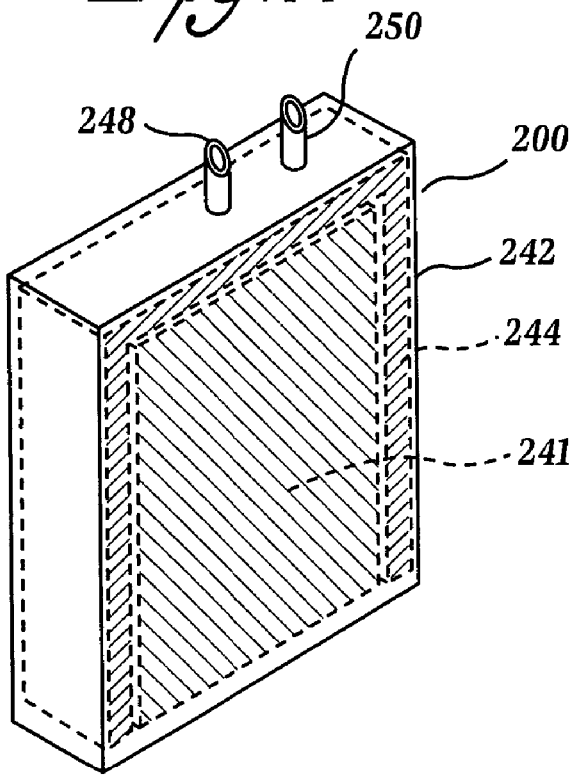
FIG. 44 is a perspective view of the liquid fuel reservoir of FIG. 43.

FIGS. 41 and 42 show one of the embodiments of the liquid fuel reservoir 472 of the invention in a cylindrical shape. The reservoir has a wall 462, which defines a volume 466, an inlet tube 470 with a one-way valve 471, and an outlet tube 468. Inside the reservoir is a wicking structure 464, which comprises two horizontal circular plates proximate the internal surfaces of the two circular ends of the cylindrical reservoir interconnected with a central stalk extending through the volume 466.

Figure 45:
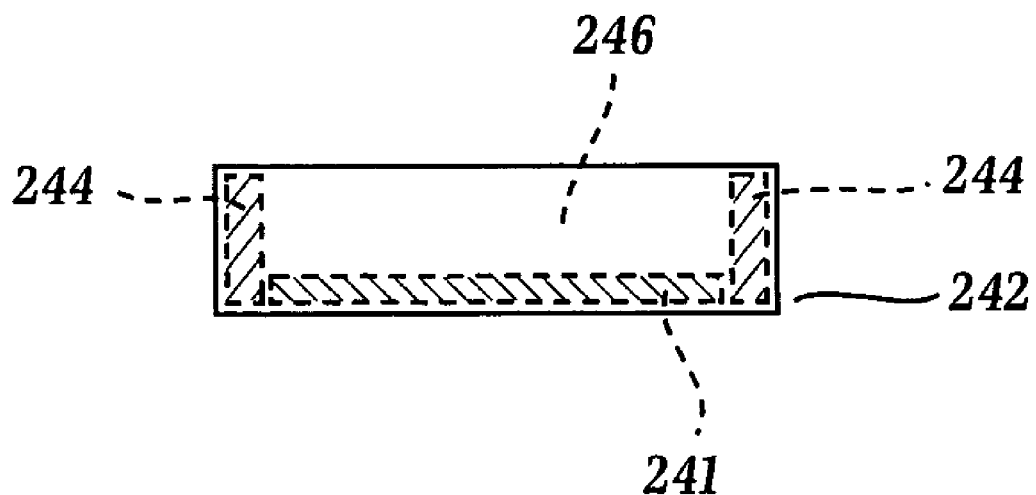
FIG. 45 is a schematic horizontal cross-sectional view of one of the embodiments of the liquid fuel reservoir of FIG. 43 along line A-A, wherein the reservoir has one porous internal compartment.
Figure 46:
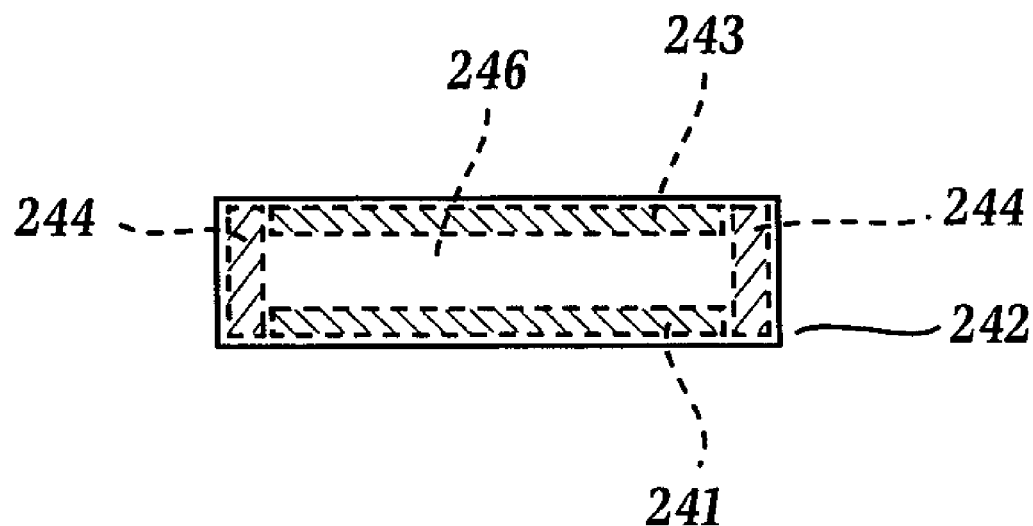
FIG. 46 is a schematic horizontal cross-sectional view of another embodiment of the liquid fuel reservoir of FIG. 43 along line A-A, wherein the reservoir has two porous internal compartments.
Figure 47:
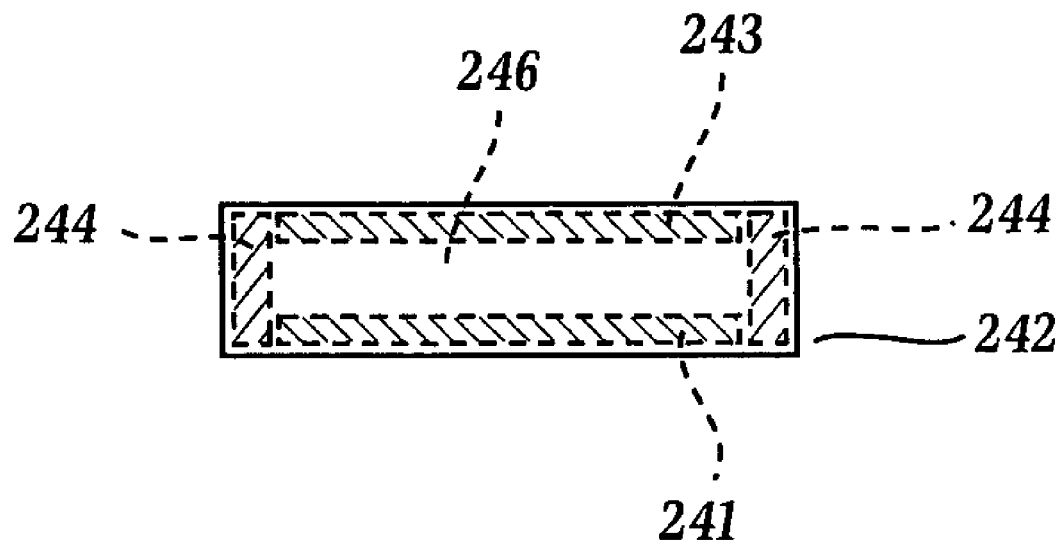
FIG. 47 is a schematic horizontal cross-sectional view of one of the embodiments of the liquid fuel reservoir of FIG. 43 along line B-B, wherein the reservoir has two porous internal compartments.
Figure 48:
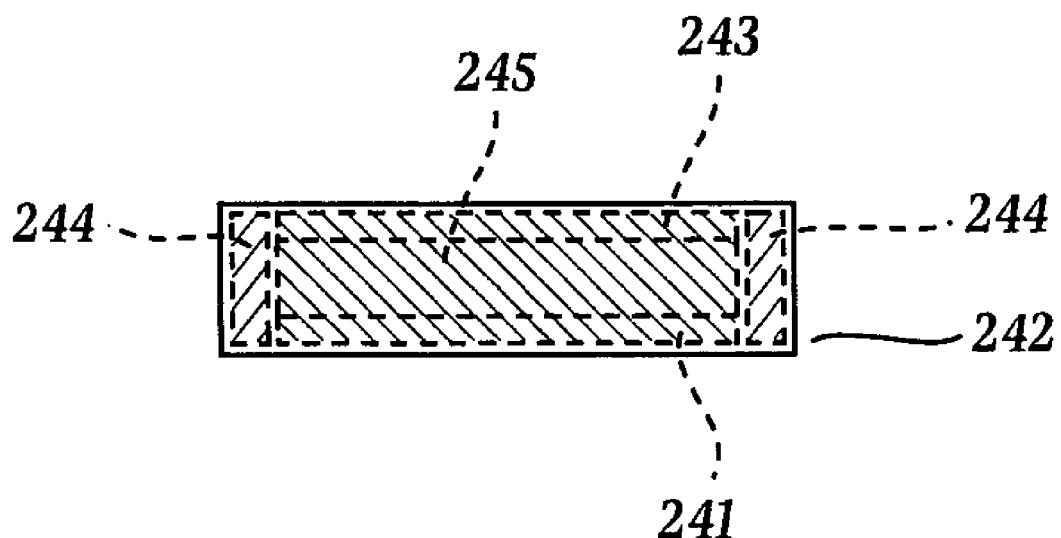
FIG. 48 is a schematic horizontal cross-sectional view of another embodiment of the liquid fuel reservoir of FIG. 43 along line B-B, wherein the reservoir has two porous internal compartments interconnected with a third porous internal compartments. Optionally, the three porous internal compartments can be replaced with one porous internal compartment having a cross section shaped like an alphabet, U, i.e. the three porous internal compartments can merge.

FIGS. 43-48 show some of the embodiments of the liquid fuel reservoir of FIG. 18 having at least one porous internal compartment 241, which contains an impurities scavenger (not shown). FIG. 45 shows an embodiment having only one porous internal compartment 241. FIG. 46 shows another embodiment having two porous internal compartments 241, 243. FIGS. 47 and 48 show two alternative embodiments of the liquid fuel reservoir of FIG. 46, wherein the two porous internal compartments are separated (FIG. 47) or joined at one end with a third porous internal compartment 245 (FIG. 48). Optionally, the three porous internal compartments 241, 243 and 245 can be merged and replaced with one porous internal compartment having a cross section shaped like the alphabet, U.

Figure 49:
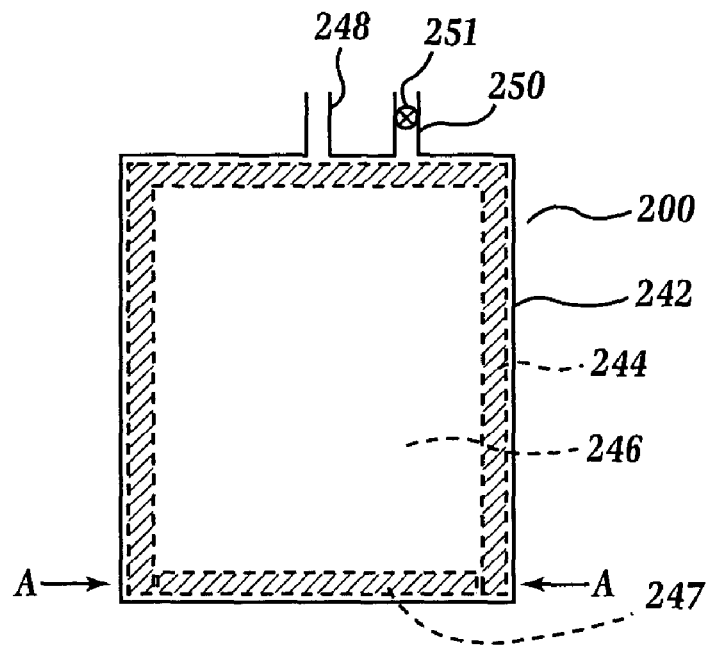
FIG. 49 is a schematic vertical cross-sectional view of one of the embodiments of the liquid fuel reservoir of FIG. 18.
Figure 50:
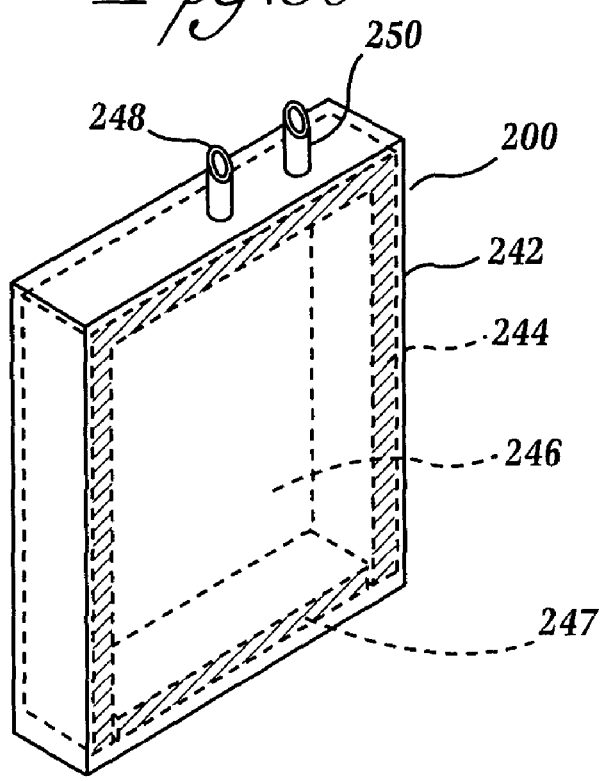
FIG. 50 is a perspective view of the reservoir of FIG. 49.
Figure 51:
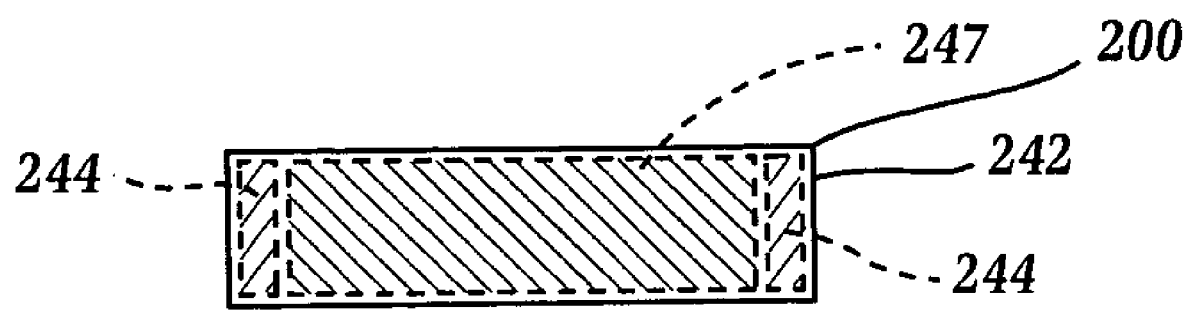
FIG. 51 is a schematic horizontal cross-sectional view of the reservoir of FIG. 49 along line A-A.

FIGS. 49-51 show one of the embodiments of the liquid fuel reservoir of FIG. 18, having one porous internal compartment 247 proximate the internal surface of a wall of the container, wherein the internal surface is devoid of the wicking structure 244.

Figure 52:
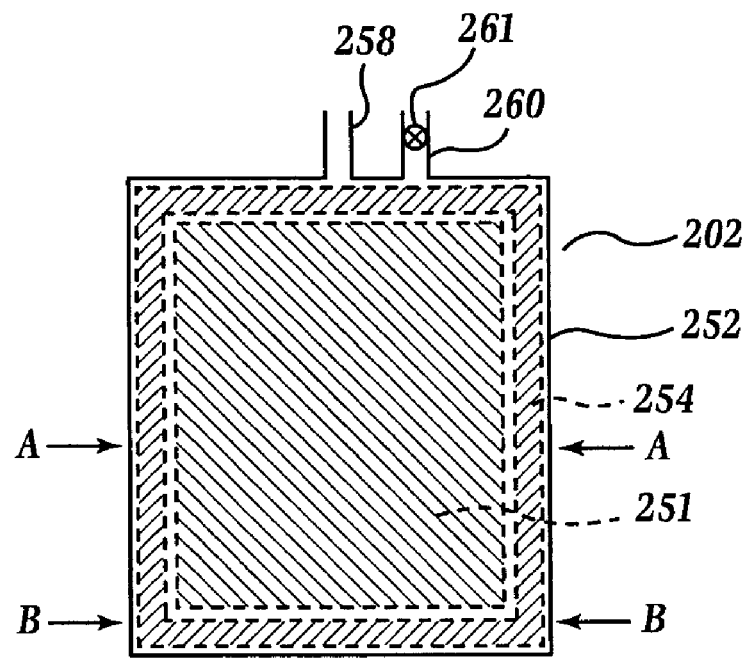
FIG. 52 is a schematic vertical cross-sectional view of one of the embodiments of the liquid fuel reservoir of FIG. 20 having at least one porous internal compartment.
Figure 53:
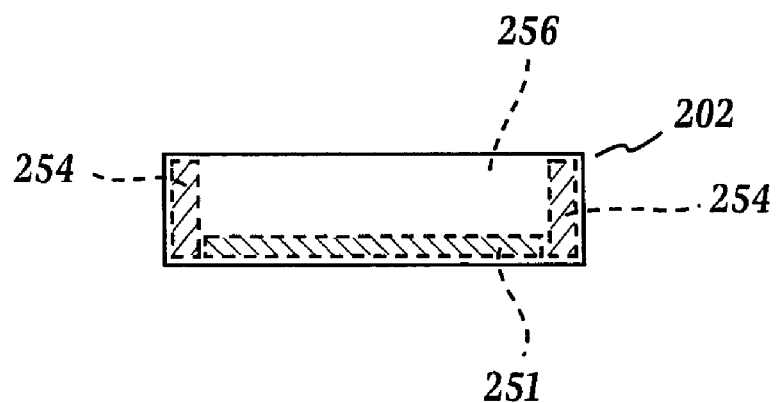
FIG. 53 is a schematic horizontal cross-sectional view of one of the embodiments of the liquid fuel reservoir of FIG. 52 along line A-A.
Figure 54:
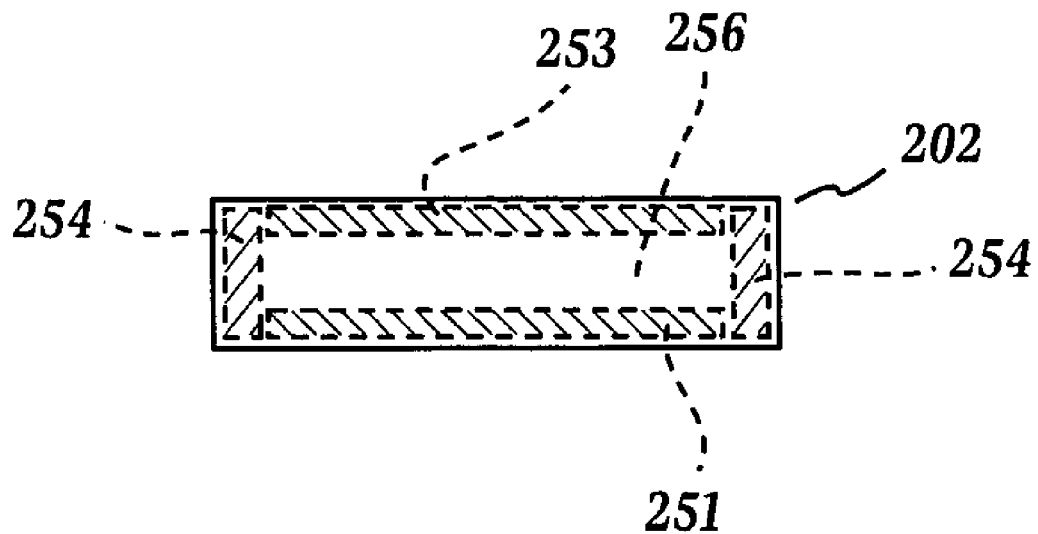
FIG. 54 is a schematic horizontal cross-sectional view of another embodiment of the liquid fuel reservoir of FIG. 52 along line A-A.
Figure 55:
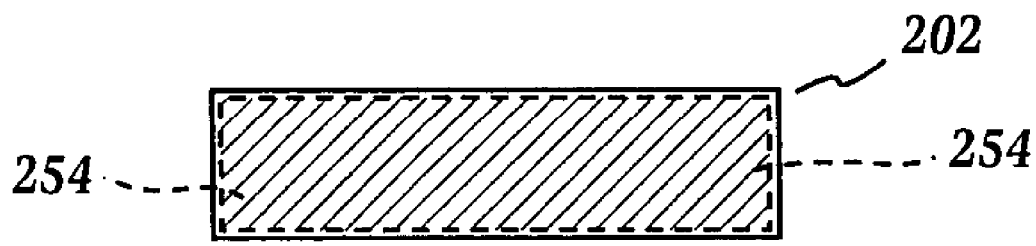
FIG. 55 is a schematic horizontal cross-sectional view of the liquid fuel reservoir of FIG. 52 along line B-B.

FIGS. 52-55 show some of the embodiments of the liquid fuel reservoir of FIG. 20 having at least one porous internal compartment 251 (FIGS. 52 and 53) or two porous internal compartments 251, 253 (FIG. 54). The embodiments have a wicking structure 254 shaped like a rectangular rim that lines the internal surfaces of two side walls and two end walls (FIGS. 52 and 55).

Figure 56:
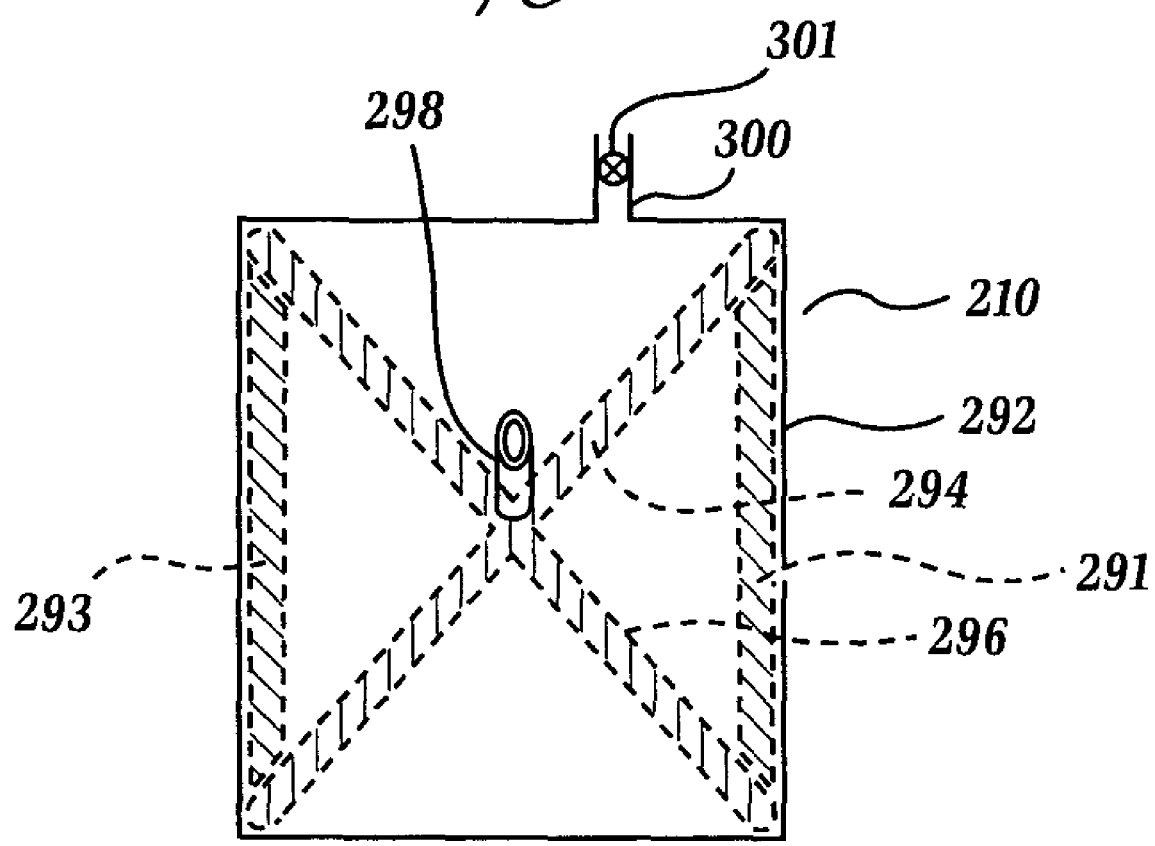
FIG. 56 is a schematic vertical cross-sectional view of one of the embodiments of the liquid fuel reservoir of FIG. 24 having two porous internal compartments.
Figure 57:
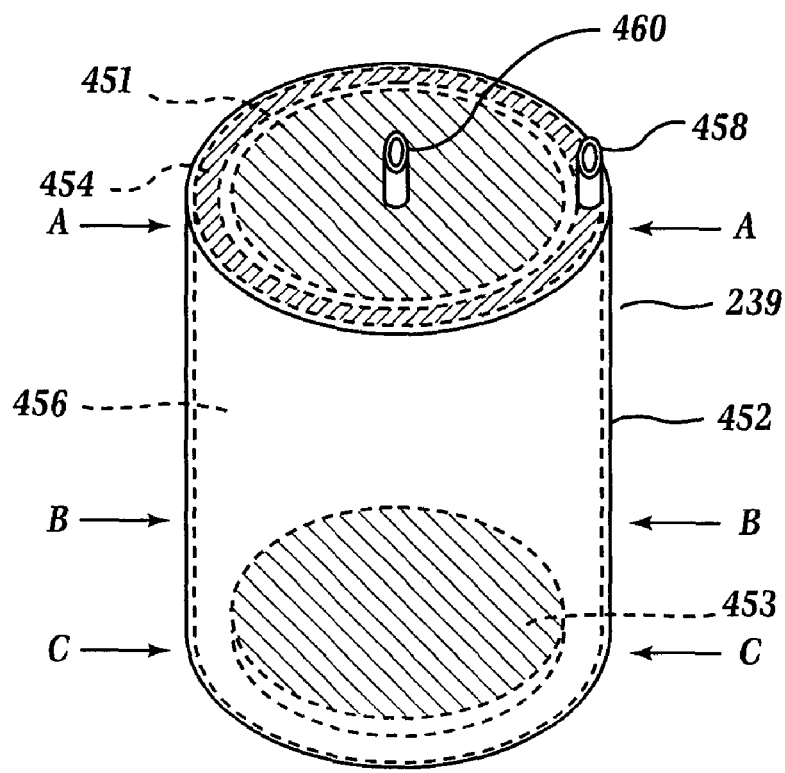
FIG. 57 is a schematic perspective view of one of the embodiments of the liquid fuel reservoir of FIG. 40 having two porous internal compartments.
Figure 58:
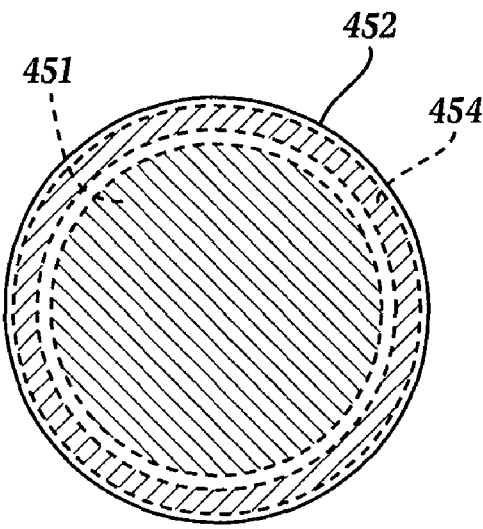
FIG. 58 is a schematic horizontal cross-sectional view of the liquid fuel reservoir of FIG. 57 along line A-A.
Figure 59:
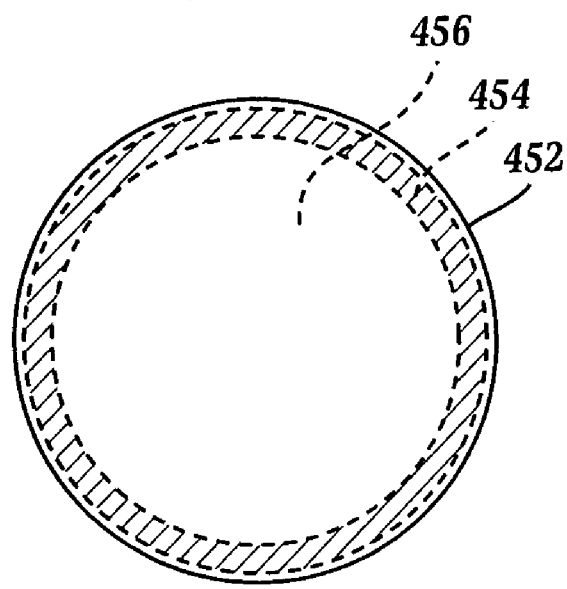
FIG. 59 is a schematic horizontal cross-sectional view of the liquid fuel reservoir of FIG. 57 along line B-B.
Figure 60:
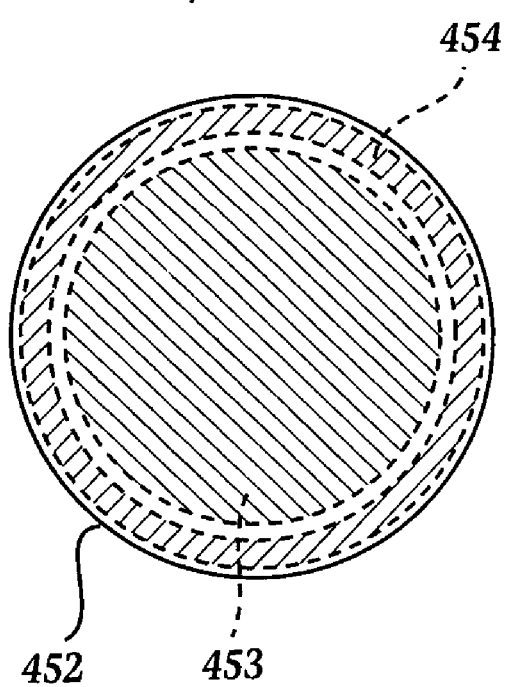
FIG. 60 is a schematic horizontal cross-sectional view of the liquid fuel reservoir of FIG. 57 along line C-C.

FIG. 56 shows an embodiment of the liquid fuel reservoir of FIG. 24 having two porous internal compartments 292, 293 containing an impurities scavenger (not shown).

FIGS. 57-60 show one of the embodiments of the liquid fuel reservoir of FIG. 40 having two porous internal compartments 451, 453, each in the shape of a circular disk containing an impurities scavenger (not shown).

Figure 61:
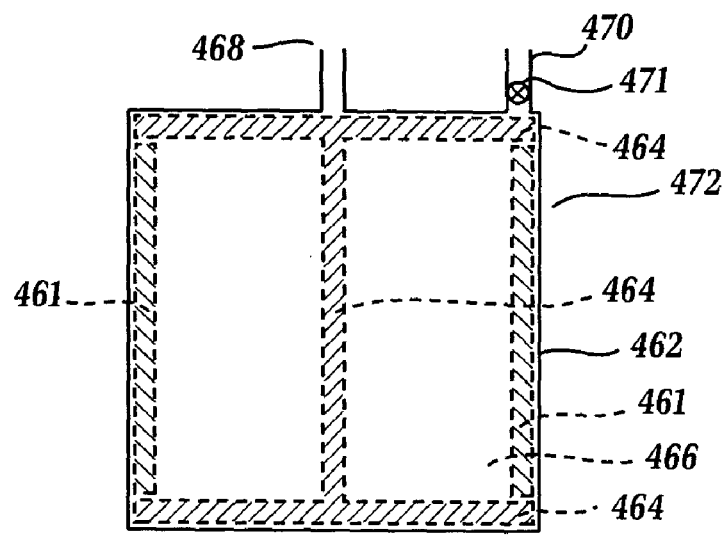
FIG. 61 is a schematic vertical cross-sectional view of one of the embodiments of the liquid fuel reservoir of FIG. 41 having a porous internal compartment.
Figure 62:
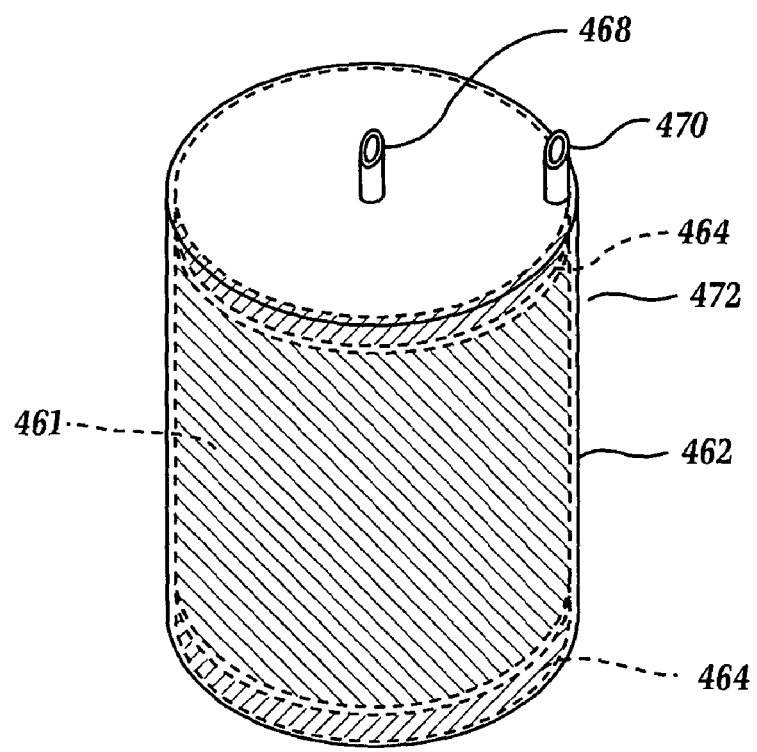
FIG. 62 is a schematic perspective view of the liquid fuel reservoir of FIG. 61.

FIGS. 61 and 62 show one of the embodiments of the liquid fuel reservoir of FIG. 41 having a porous internal compartment 461 in the shape of a cylinder disposed proximate a portion of the internal surface of the circular wall of the cylindrical liquid fuel reservoir, wherein the portion is free of the wicking structure 464.

Figure 63:
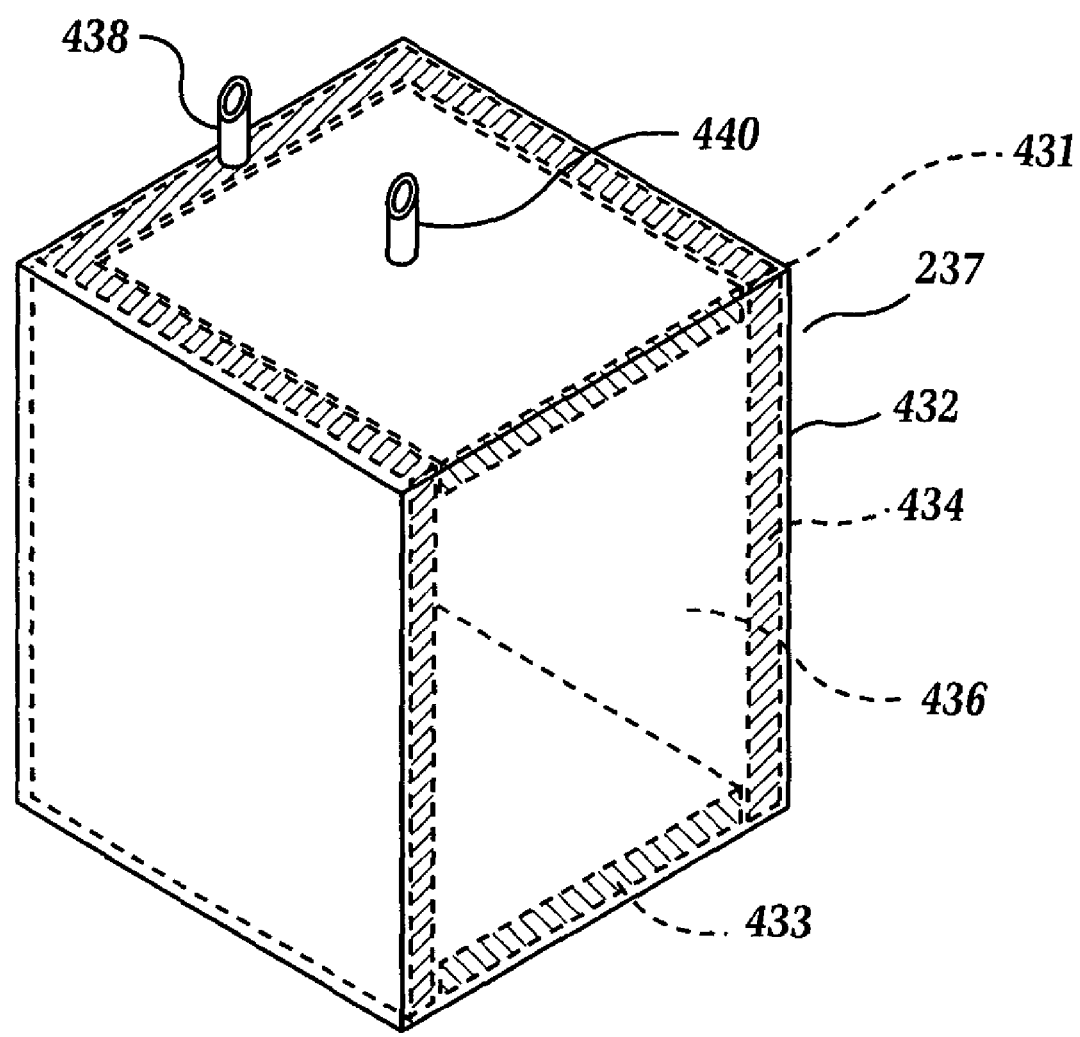
FIG. 63 is a schematic perspective view of one of the embodiments of the liquid fuel reservoir of FIG. 38 having two porous internal compartments.

FIG. 63 shows one of the embodiments of the liquid fuel reservoir of FIG. 38 having two porous internal compartments 431, 433 each in the shape of a square or rectangular flat plate, with the two porous internal compartments disposed proximate a portion of the internal surface of the top and bottom end walls of the container of the reservoir.

Figure 64A:
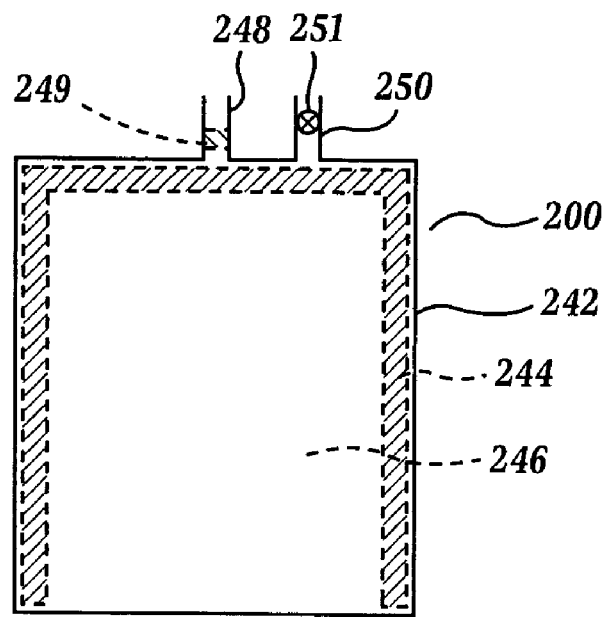
FIG. 64A is a schematic vertical cross-sectional view of one of the embodiments of the liquid fuel reservoir of FIG. 18 containing an impurities scavenger in an outlet passageway.
Figure 64B:
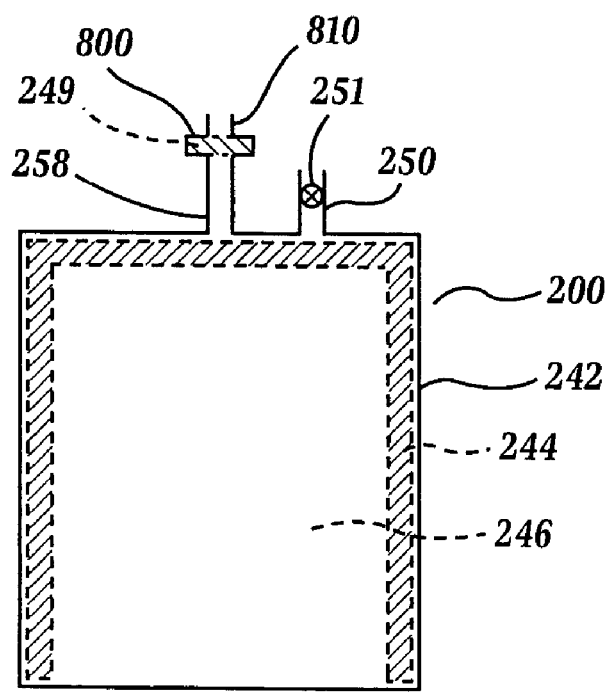
FIG. 64B is a schematic vertical cross-sectional view of one of the embodiments of the liquid fuel reservoir of FIG. 18 containing an impurities scavenger in a filter cartridge connected to an outlet passageway.

The liquid fuel reservoirs of the invention can contain an impurities scavenger in the outlet passageway or a filter cartridge connected to the outlet passageway. For instance, FIG. 64 shows an embodiment of the liquid fuel reservoir of FIG. 18 having an impurities scavenger 249 either in an outlet passageway 248 (FIG. 64A) or in a filter cartridge 800 connected to an outlet passageway 258 (FIG. 64B). The outlet port 810 of the filter cartridge 800 can be attached, directly or indirectly via a pump (not shown), to a liquid fuel cell (also not shown).

Figure 65:
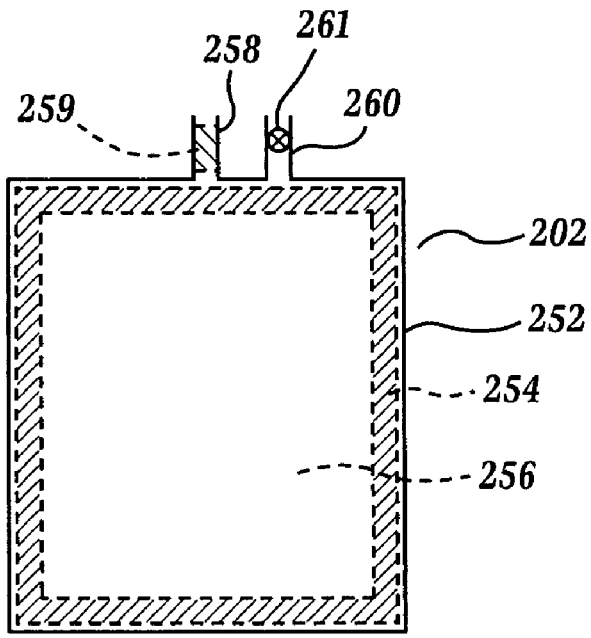
FIG. 65 is a schematic vertical cross-sectional view of one of the embodiments of the liquid fuel reservoir of FIG. 20 containing an impurities scavenger in an outlet passageway.
Figure 66:
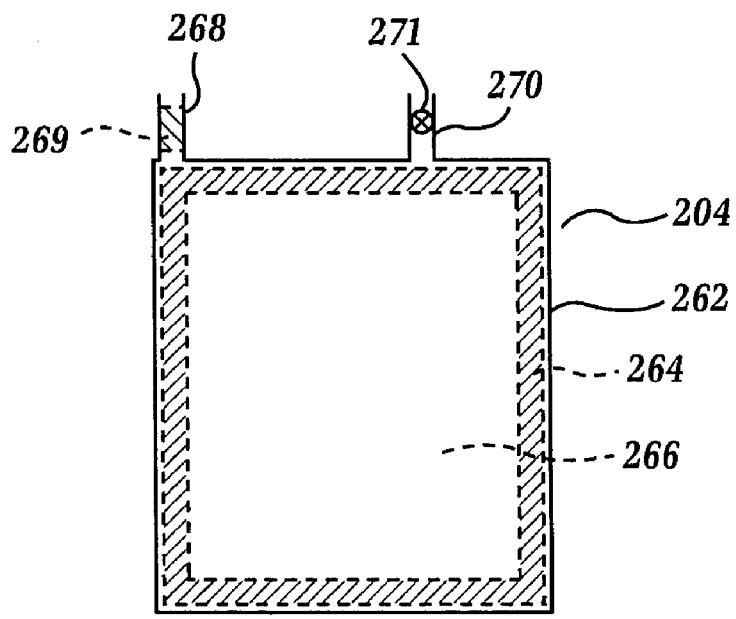
FIG. 66 is a schematic vertical cross-sectional view of one of the embodiments of the liquid fuel reservoir of FIG. 21 containing an impurities scavenger in an outlet passageway.
Figure 67:
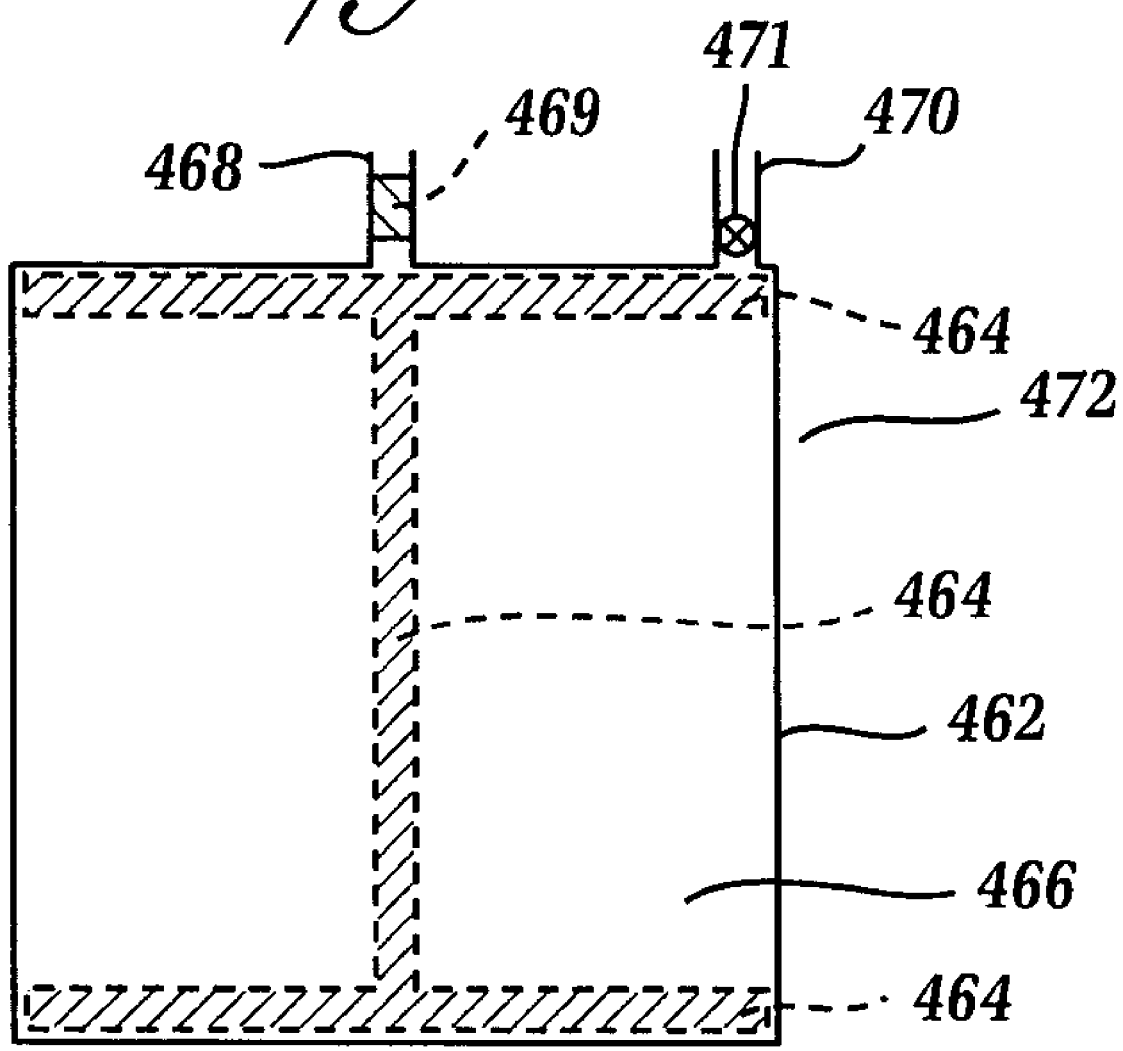
FIG. 67 is a schematic vertical cross-sectional view of one of the embodiments of the liquid fuel reservoir of FIG. 41 containing an impurities scavenger in an outlet passageway.

Examples of some of the embodiments of the liquid fuel reservoir of the invention having an impurities scavenger are shown in FIGS. 65-67. FIGS. 65, 66 and 67 show some of the embodiments of the liquid fuel reservoirs of FIGS. 20, 21 and 41, respectively, wherein the impurities scavenger 259, 269, 469 is located inside an outlet passageway 258, 268, 468.

Figure 68:
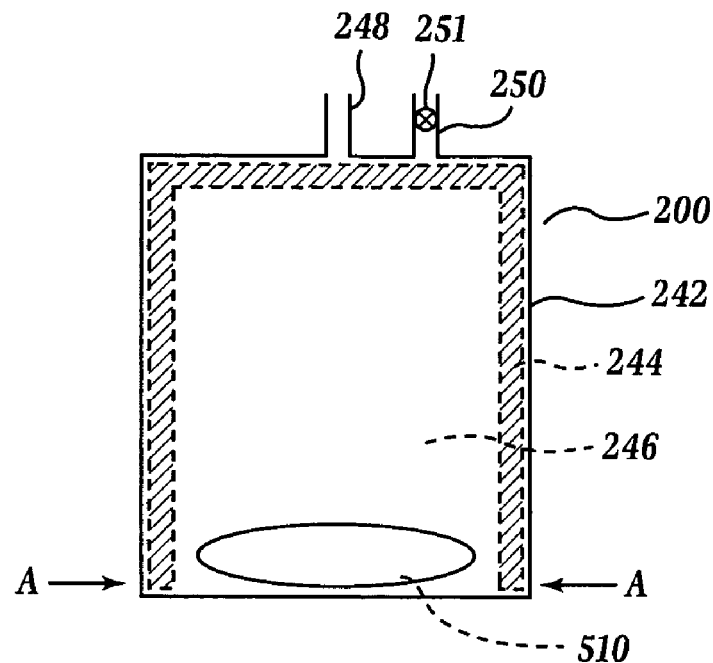
FIG. 68 is a schematic vertical cross-sectional view of one of the embodiments of the liquid fuel reservoir of FIG. 18 containing a pressurized pallet or bladder.
Figure 69:
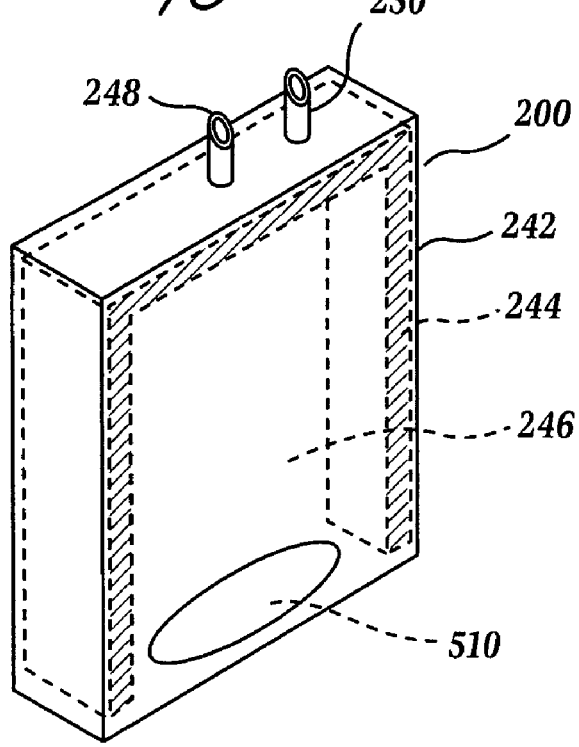
FIG. 69 is a schematic perspective view of the liquid fuel reservoir of FIG. 68.
Figure 70:
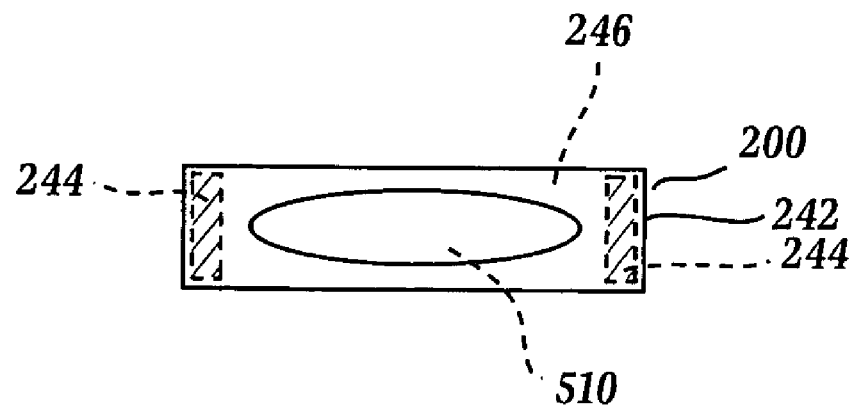
FIG. 70 is a schematic horizontal cross-sectional view of the liquid fuel reservoir of FIG. 68 along line A-A.

FIGS. 68-70 show one of the embodiments of the liquid fuel reservoir of FIG. 18 containing a pressurized pallet or bladder 510.

Figure 71:
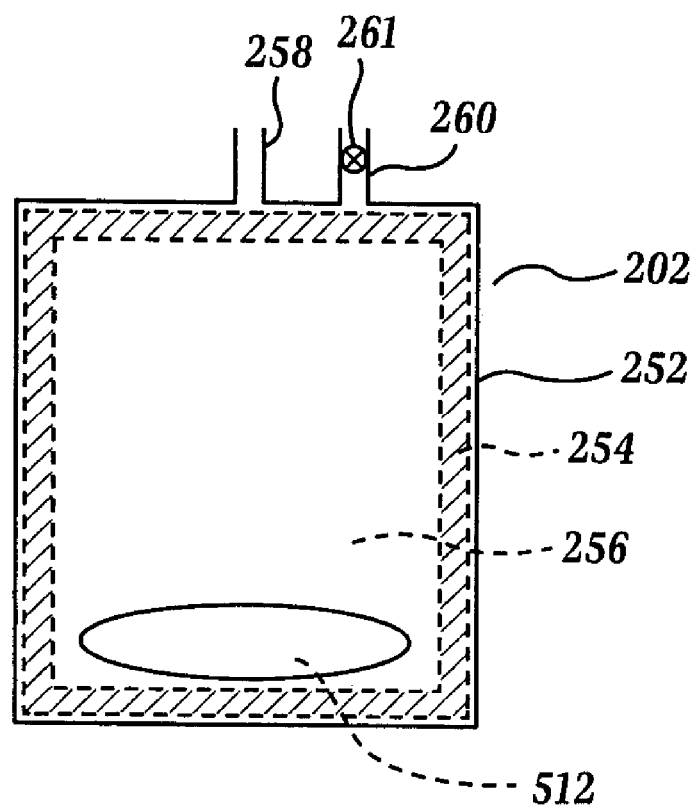
FIG. 71 is a schematic vertical cross-sectional view of one of the embodiments of the liquid fuel reservoir of FIG. 20 containing a pressurized pallet or bladder.
Figure 72:
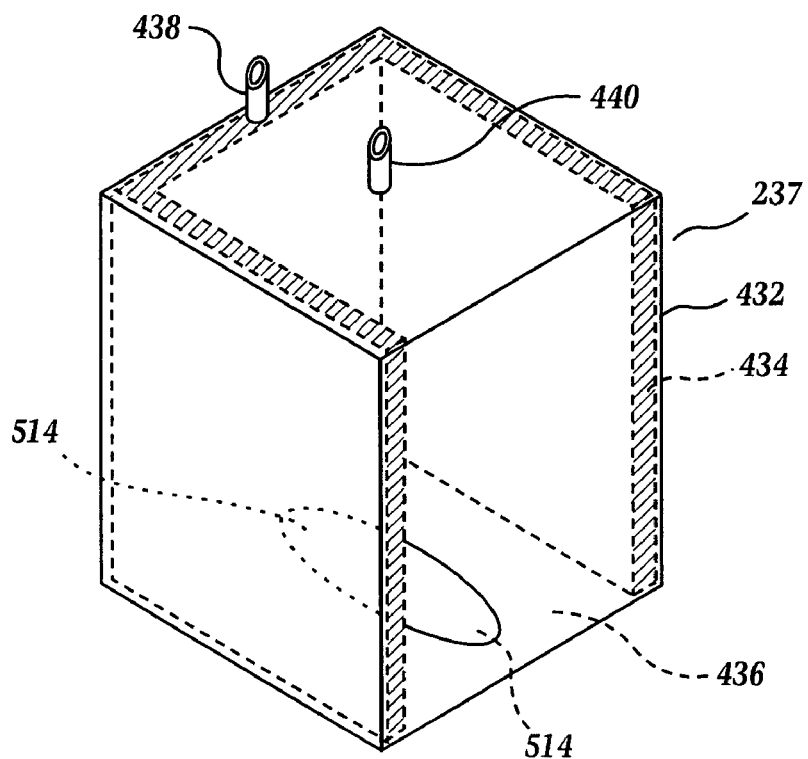
FIG. 72 is a schematic perspective view of one of the embodiments of the liquid fuel reservoir of FIG. 38 containing a pressurized pallet or bladder.
Figure 73:
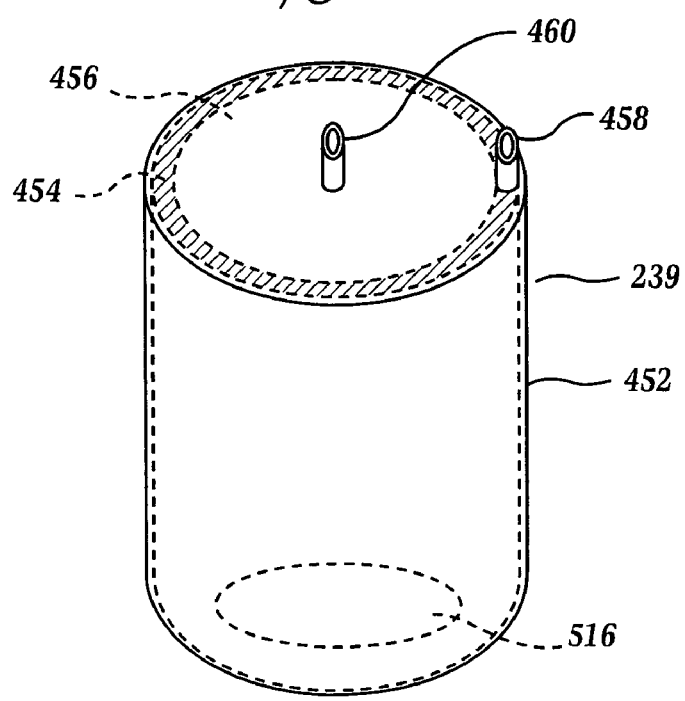
FIG. 73 is a schematic perspective view of one of the embodiments of the liquid fuel reservoir of FIG. 40 containing a pressurized pallet or bladder.

FIGS. 71, 72 and 73 show some of the embodiments of the liquid fuel reservoirs of FIGS. 20, 38 and 40, respectively, containing a pressurized pallet or bladder 512, 514, 516 inside the container.

Figure 74:
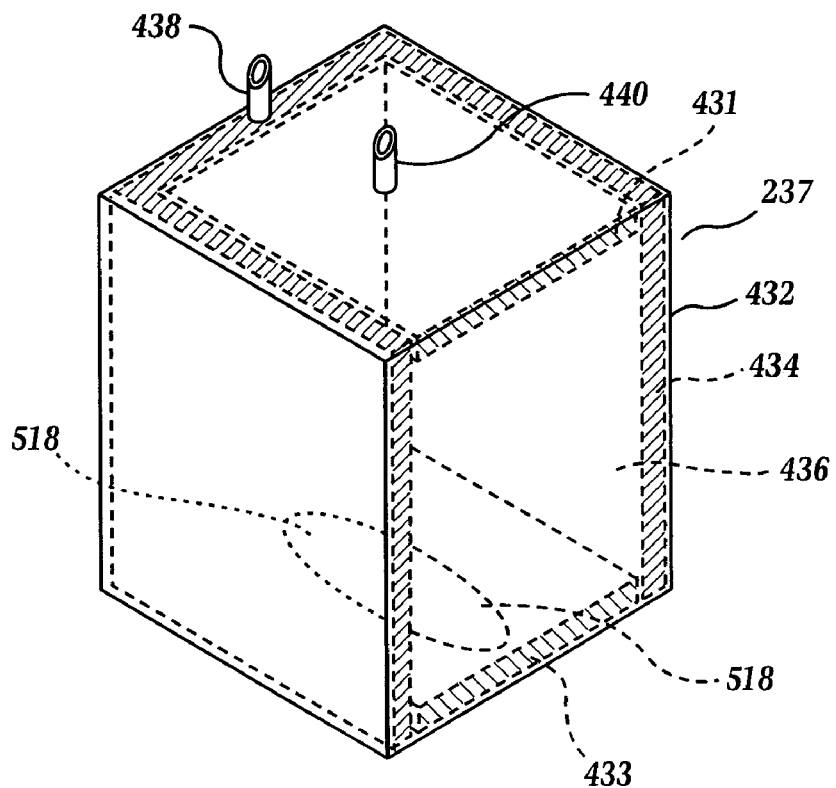
FIG. 74 is a schematic perspective view of one of the embodiments of the liquid fuel reservoir of FIG. 63 containing a pressurized pallet or bladder.

FIG. 74 shows an example of the liquid fuel reservoir of the invention (one of the embodiments of the reservoir of FIG. 38) containing both a pressurized pallet or bladder 518 and at least one porous internal compartment 431, 433 holding an impurities scavenger (not shown). In FIG. 74, two porous internal compartments are shown. But some of the embodiments of the liquid fuel reservoir containing both the pressurized pallet or bladder and at least one porous internal compartment may have other than two porous internal compartments, e.g. it may have one, three or four porous internal compartments holding the impurities scavenger.

Figure 75:
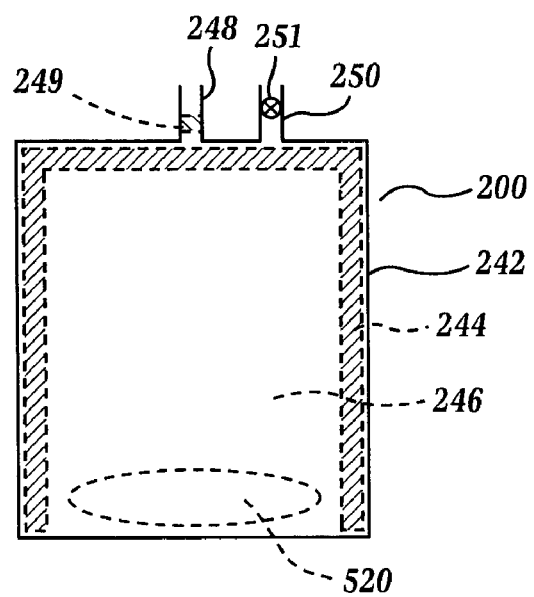
FIG. 75 is a schematic vertical cross-sectional view of one of the embodiments of the liquid fuel reservoir of FIG. 64A containing a pressurized pallet or bladder.

FIG. 75 shows an example of the liquid fuel reservoir of the invention (one of the embodiments of the reservoir of FIG. 18) containing both a pressurized pallet or bladder 520 and an impurities scavenger 249 disposed in the outlet passageway 248.

Figure 76:
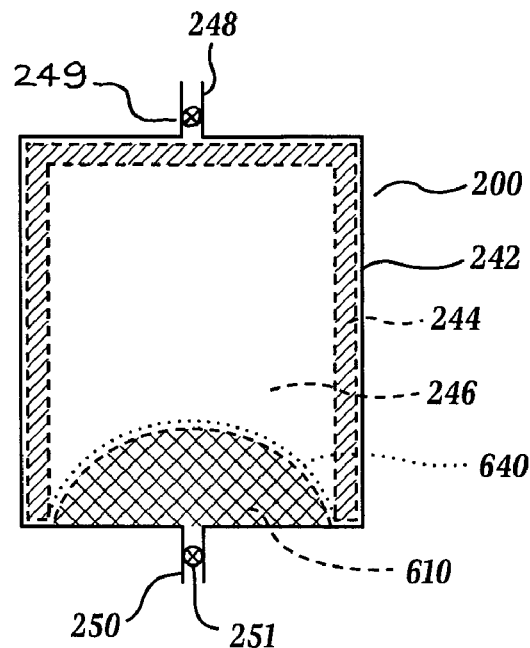
FIG. 76 is a schematic vertical cross-sectional view of one of the embodiments of the liquid fuel reservoir of the invention, modified from the reservoir of FIG. 18, containing a pressurized bladder and recovery receptacle.

FIG. 76 shows an example of the liquid fuel reservoir of the invention (one of the embodiments of the reservoir of FIG. 18 modified by having 249, a valve or needle-penetrable plug, in the outlet passageway 248 and the inlet 250 on a wall opposite the wall penetrated by the outlet passageway 248) containing a compressible porous material 640 covered by a flexible membrane 640 to function as a pressurized bladder and recovery receptacle. The compressible porous material 610 is in a semi-compressed state due to the presence of liquid fuel in the container volume 246. 251 can be a valve, liquid-fuel-swellable material or needle-penetrable plug. When 251 represents a valve and with the valve open, air or spent fuel or byproducts from a liquid fuel cell can be introduced into the pressurized bladder and recovery receptacle. Although not shown, within the scope of the invention is a liquid fuel reservoir of FIG. 76 modified to have another inlet port through a wall of the container, wherein the inlet port is in fluid communication with container volume 246 so that liquid fuel can be introduced into the container volume 246 via the inlet port or outlet passageway 248.

Figure 77:
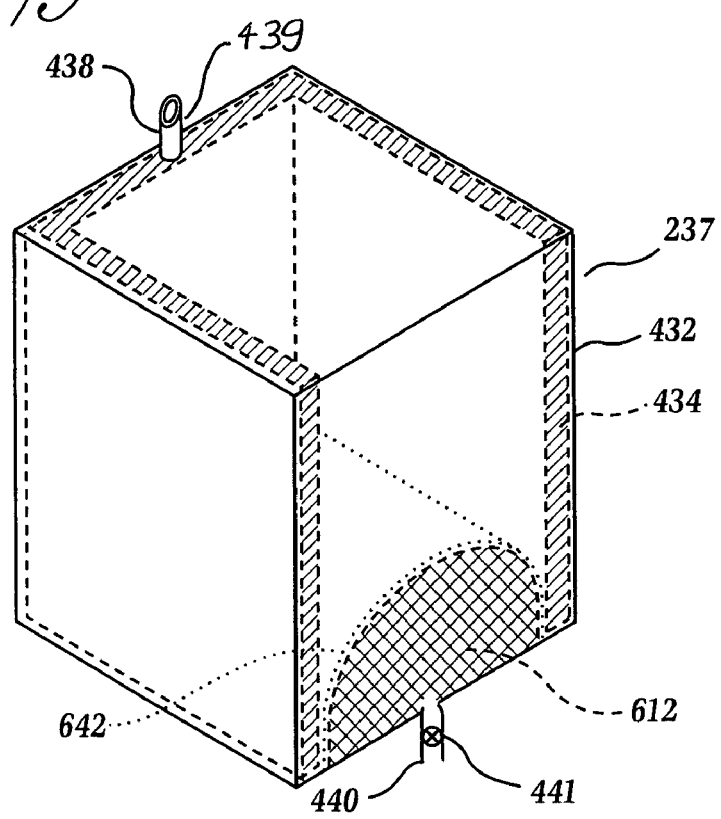
FIG. 77 is a schematic vertical cross-sectional view of another embodiment of the liquid fuel reservoir of the invention, modified from the reservoir of FIG. 38, containing a pressurized bladder and recovery receptacle.

FIG. 77 shows an example of the liquid fuel reservoir of the invention (one of the embodiments of the reservoir of FIG. 38 modified by having 439, a valve or needle-penetrable plug, in the outlet passageway 438 and the inlet 440 on a wall opposite the wall penetrated by the outlet passageway 438) containing a compressible porous material 612 covered by a flexible membrane 642 to act as a pressurized bladder and recovery receptacle. The compressible porous material 612 is in a semi-compressed state due to the presence of liquid fuel in the container volume 436. 441 can be a valve, a liquid-fuel-swellable material or needle-penetrable plug. When 441 represents a valve and with the valve open, air or spent fuel or byproducts from a liquid fuel cell can be introduced into the pressurized bladder and recovery receptacle. Although not shown, within the scope of the invention is a liquid fuel reservoir of FIG. 77 modified to have another inlet port through a wall of the container, wherein the inlet port is in fluid communication with container volume 436 so that liquid fuel can be introduced into the container volume 436 via the inlet port or outlet passageway 438.

Figure 78:
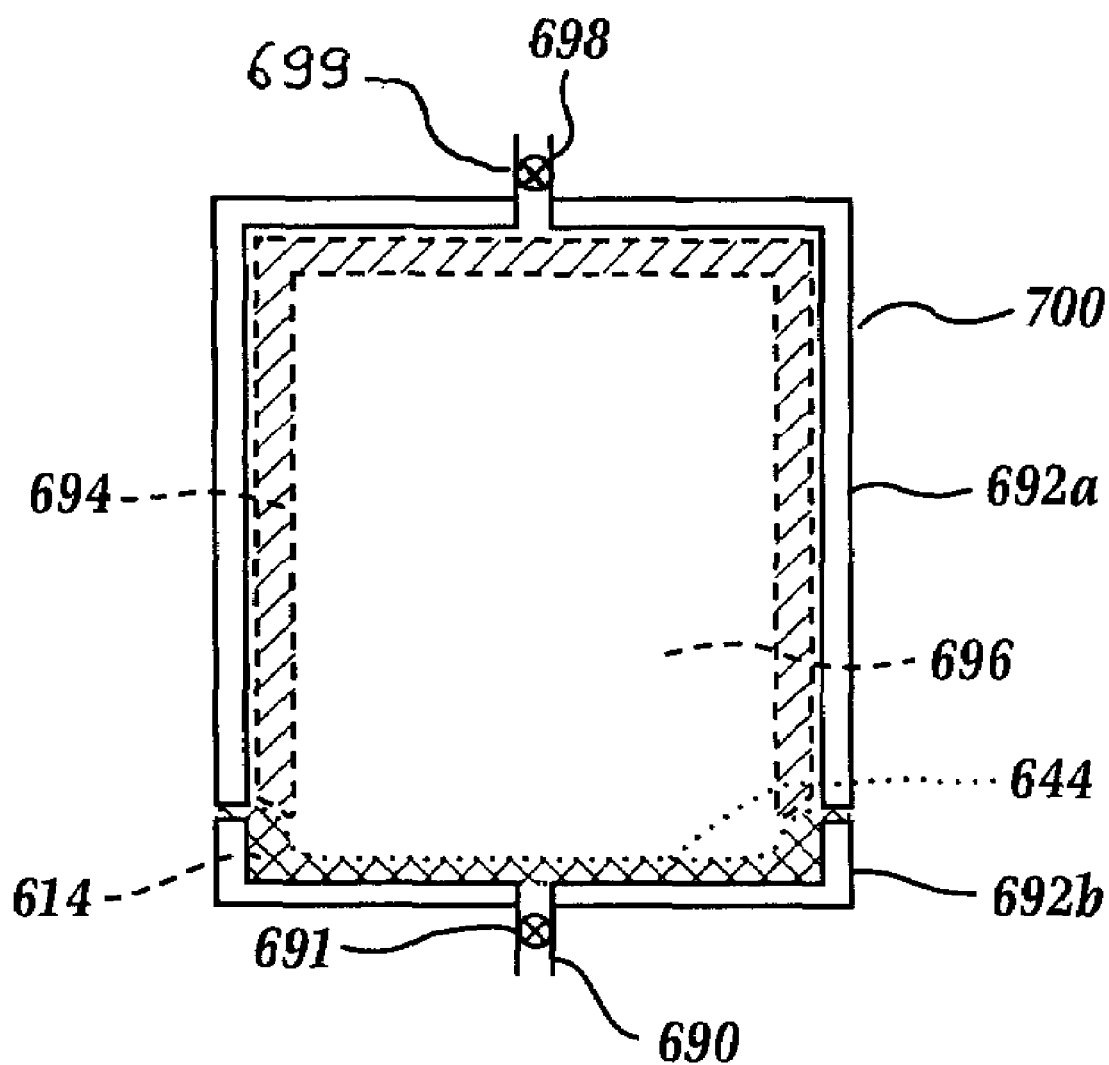
FIG. 78 is a schematic vertical cross-sectional view of one of the embodiments of the liquid fuel reservoir of the invention containing a pressurized bladder and recovery receptacle, wherein the container wall of the reservoir comprises upper and lower parts joined together with portions of a flexible membrane of the pressurized bladder and recovery receptacle.fixed at the junction of the upper and lower parts of the container wall.

FIG. 78 shows an example of the liquid fuel reservoir 700 of the invention having a compressible porous material 614 covered by a flexible membrane 644 to act as a pressurized bladder and recovery receptacle, wherein the side walls of the reservoir container comprise upper part 692*a* and lower part 692*b* joined together to form an airtight junction, with edge portions of the flexible membrane 644 fixed at the junction of the upper and lower parts. The internal surfaces of the upper parts 692*a* of the side walls, as well as the internal surface of the top end wall, of the reservoir container are lined with a wicking structure 694, wherein a port 698 exits the top wall of the container. The port 698 optionally has a valve (699) for controlling the inflow and outflow of fluid. The liquid fuel reservoir can be assembled by providing a compressible foam having a relaxed volume larger than the internal volume of the container, placing the compressible foam inside the lower part of the container wherein a port 690 having an optional valve 691 (alternatively, 691 can represent a liquid-fuel-swellable material or needle-penetrable plug) inside is attached to the bottom end wall of the container, covering the top surface of the compressible foam with the flexible membrane 644, joining the upper and lower parts 692*a*, 692*b* of the container together and fixing edge portions of flexible membrane 644 at the junction of the upper and lower parts to form the pressurized bladder and recovery receptacle 614 inside the reservoir 700. For the sake of clarity in showing the relationship between the edge portions of the flexible membrane 644 and the upper and lower parts 692*a*, 692*b* of the container, small gaps are present between the upper and lower parts 692*a*, 692*b* of the container in FIG. 78. But in reality there are no gaps at the junction of the upper and lower parts 692*a*, 692*b*, which junction is fluid tight. The walls of the container define an internal volume 696. Within the scope of the invention are liquid fuel reservoirs of FIG.

78 modified by moving port 690 to a side wall of the bottom portion of the container. The position of port 698 can also be moved to another location of the upper portion of the container. Alternatively, the wall of the upper portion of the container, e.g. 692a, can be penetrated with an additional port (not shown) for the introduction of liquid fuel into the container.

The volume inside the liquid fuel reservoirs in the drawings can contain a liquid fuel, which optionally has an ingestion deterrent and/or flame brightener (not shown).

methanol solution mixed with each of the impurities scavenging substances. The calculated expected amount of NVR was compared to the actual amount of NVR remaining after the removal of the impurities scavenging substance to calculate the percent of NVR removed by the impurities scavenging substance. Typical concentrations were less than 0.5% NVR in the methanol solution. As shown with the data below, the experiment demonstrated that the impurities scavenging substances can be used in powdered, granulated or pelletized form to remove impurities from the liquid fuel.

|  | 203-67<br>Granulated C<br>Packet Treat | 203-75A<br>Granulated C | 203-75B<br>Norit Darco G-60<br>Carbon | 203-75D<br>Calgon C<br>Pulverized Powder |
|---|---|---|---|---|
| D50% Particle Size | <5 mm | <5 mm | <45 microns | <1 mm |
| Gross | 40.8502 | 40.3634 | 40.3449 | 41.1427 |
| Tare | 40.8419 | 40.3554 | 40.3391 | 41.1381 |
| g NVR | 0.0083 | 0.0080 | 0.0058 | 0.0046 |
| Expected g NVR | 0.0597 | 0.1074 | 0.1046 | 0.1061 |
| g NVR scavenged | 0.0514 | 0.0994 | 0.0988 | 0.1015 |
| % NVR scavenged | 86.1% | 92.6% | 94.5% | 95.7% |
| g Carbon | 2.1 | 4.1 | 4.1 | 4.1 |
| Contact Time w/Solution | 40 hrs | 40 hrs | 42 hrs | 184 hrs |
| g NVR scavenged per g C | 0.0245 | 0.0242 | 0.0241 | 0.0248 |

It is desired to have a fuel reservoir with a 90% or greater, preferably 95% or greater, efficiency in delivery of fuel to a liquid fuel cell or reformer. In this context, percent efficiency means the maximum amount of the fuel that can be drawn out of the container divided by the amount of fuel that was initially loaded into the fuel-empty container of the fuel reservoir. Depending upon the design parameters and use conditions, greater or lesser efficiencies may be acceptable.

The liquid fuel reservoir of the invention can have a combination of two or three of the following features: (a) a pressurized pallet or bladder, (b) the presence of ingestion deterrent and/or flame brightener in a liquid fuel if the reservoir contains the liquid fuel, and (c) the presence of an impurities scavenger in the container, the outlet passageway of the container or a filter cartridge connected to the outlet passageway.

EXAMPLE 1

An experiment was conducted to determine the removal of non-volatile residues (NVR), as impurities, from methanol by the following impurities scavenging substances: granulated carbon (203-67), granulated carbon (203-75A), Norit Darco G-60 (203-75B) and Calgon carbon (203-75D). NVR had been extracted from a piece of foam into the methanol to form a methanol solution containing NVR to be used in the impurities removal experiment. Separately for each of the above impurities scavenging substances, approximately 150 ml of the methanol solution containing NVR was placed in a beaker with a magnetic stir bar and the impurities scavenging substance was added in the amount shown in the table below, mixed for at least 24 hours, subjected to filtration if necessary to remove the impurities scavenging substance, distilled to dryness and weighed to determine the amount of NVR remaining. A control run was performed to determine the weight percent of NVR in the methanol not exposed to the impurities scavenging substance and the weight percent determined in the control run was used to calculate the expected amount of NVR in the

EXAMPLE 2

Figure 79A:
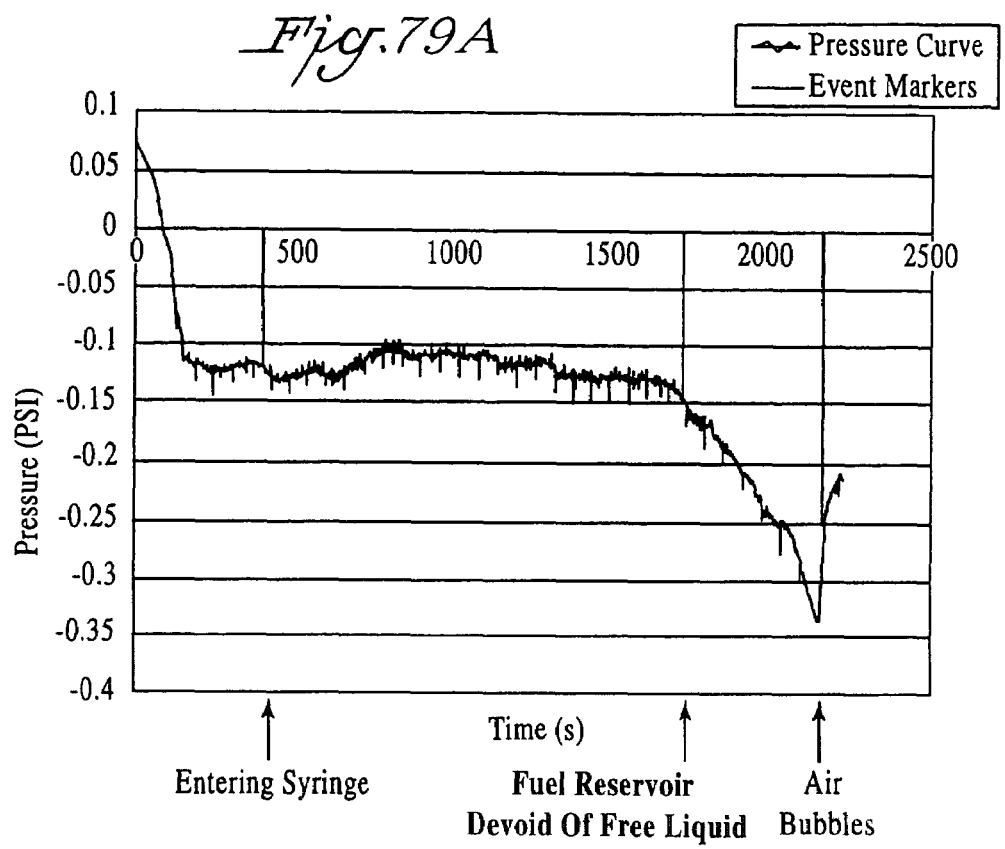
FIG. 79A shows the relationship between pressure and time as recorded in Example 2 when methanol was withdrawn from a liquid fuel reservoir with the liquid fuel reservoir standing up, i.e. the inlet and outlet were at the top of the reservoir.
Figure 80A:
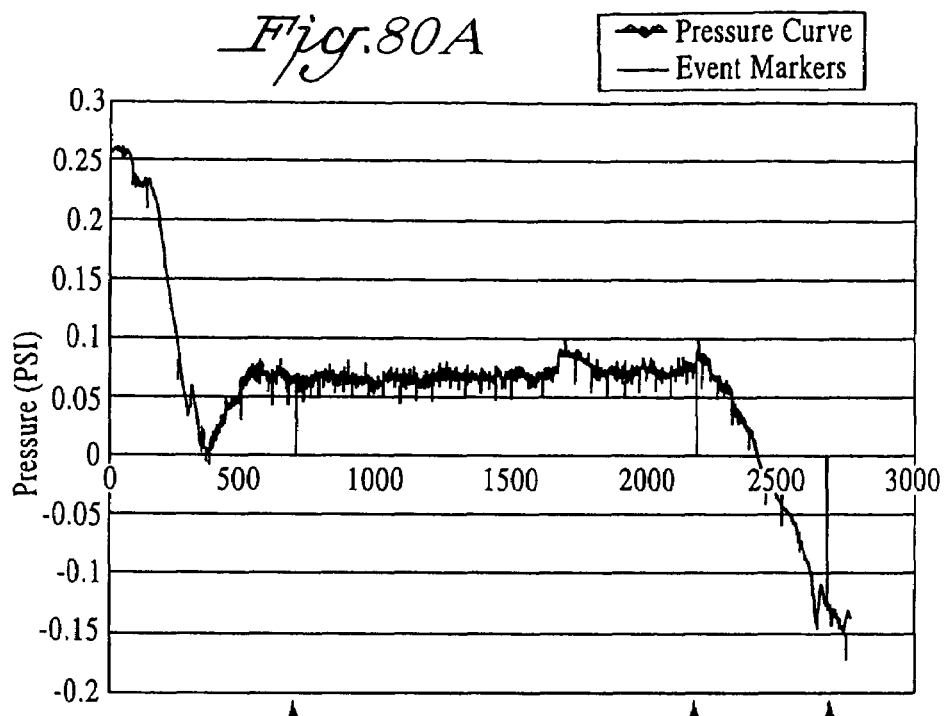
FIG. 80A shows the relationship between pressure and time as recorded in Example 2 when methanol was withdrawn from a liquid fuel reservoir with the liquid fuel reservoir upside down, i.e. the inlet and outlet were at the bottom of the reservoir.

A liquid fuel reservoir of the invention containing a 90-pore, reticulated ether foam felted to firmness 7 as the wicking structure was filled with clean methanol and connected to a syringe pump and pressure transducer. The syringe-pump was set to dispense 10 mL/hr and the pressure flow data were recorded until air entered the system. Negative pressure data were plotted over time (see FIG. 79A with the reservoir standing up, i.e. with both inlet and outlet oriented at the top of the reservoir, and FIG. 80A with the reservoir upside down, i.e. with both inlet and outlet oriented at the bottom of the reservoir).

Figure 79B:
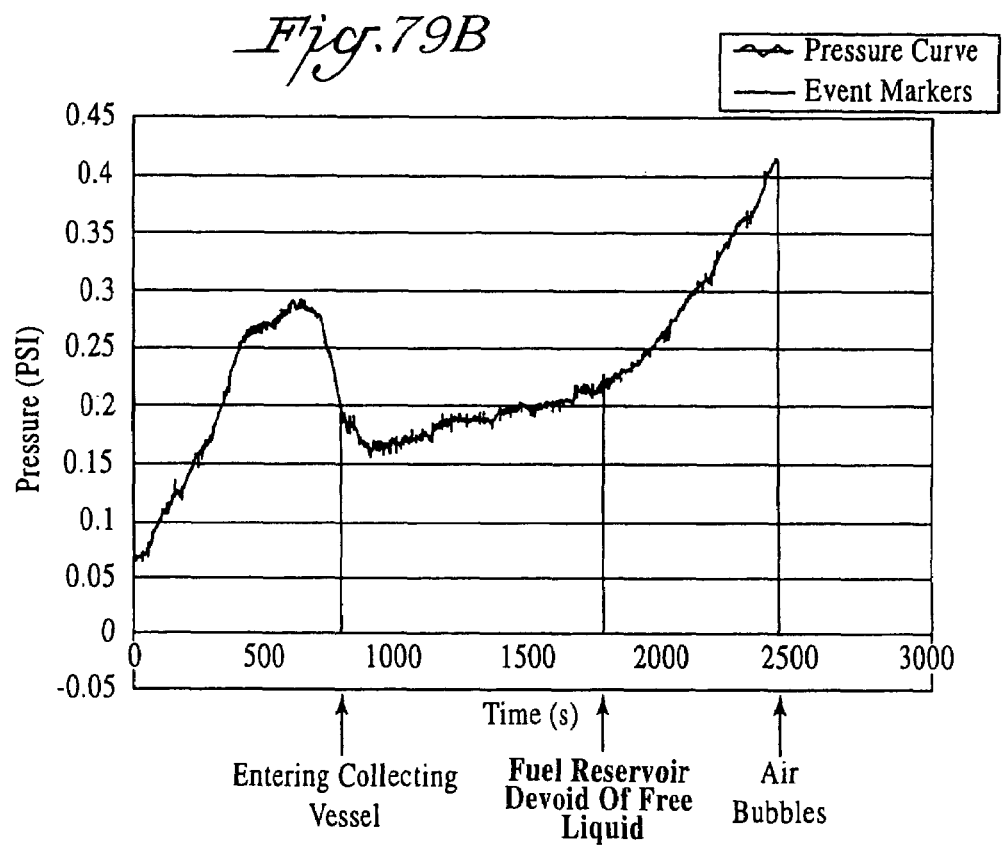
FIG. 79B shows the relationship between pressure and time as recorded in Example 2 when methanol was pushed into a liquid fuel reservoir with the liquid fuel reservoir standing up.
Figure 80B:
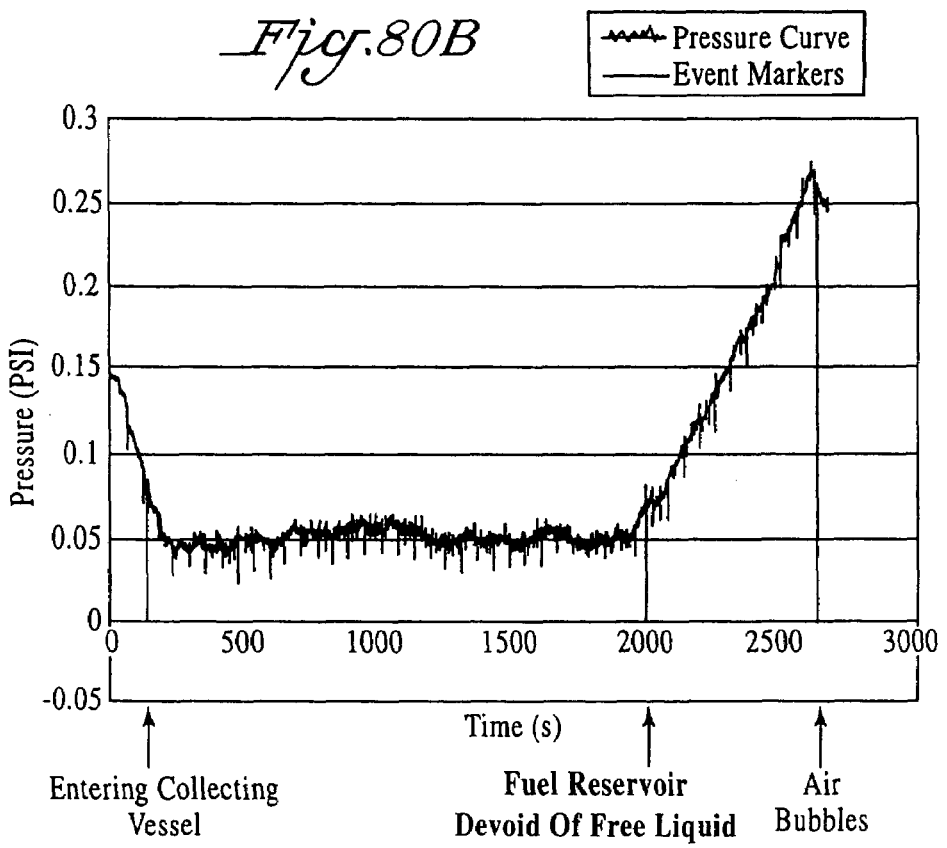
FIG. 80B shows the relationship between pressure and time as recorded in Example 2 when methanol was pushed into a liquid fuel reservoir with the liquid fuel reservoir upside down.

In a separate experiment, the liquid fuel reservoir containing a 90-pore, reticulated ether foam felted to firmness 7 as the wicking structure was filled with clean methanol and connected to a syringe pump and pressure transducer. The syringe-pump was set to withdraw 10 mL/hr and the pressure flow data were recorded until air entered the system. Positive pressure data were plotted over time (see FIG. 79B, with the reservoir standing up, and FIG. 80B, with the reservoir upside down).

These experiments indicate that, independent of the orientation, liquid fuel delivery from a pressurized liquid fuel reservoir of the invention was equally effective in delivering the liquid fuel stored in the reservoir as when the reservoir was attached to a negative pressure pumping system.

The invention has been illustrated by detailed description and examples of the preferred embodiments. Various changes in form and detail will be within the skill of persons skilled in the art. Therefore, the invention must be measured by the claims and not by the description of the examples or the preferred embodiments.

We claim:

1. A liquid fuel reservoir for a liquid fuel cell, said liquid fuel reservoir comprising a container comprising walls defining a container volume capable of holding a liquid fuel, a first port through a wall of the container capable of discharging the liquid fuel to a location exterior of the container volume, at least one extremity remote from the first port and a pressurized pallet or bladder comprising a compressible porous material, wherein the first port has inner and outer ends; and a wicking structure within the container volume and into which the liquid fuel can wick by capillary action and from which the liquid fuel may subsequently be discharged, the wicking structure
(a) having a solid wicking structure volume which is no more than 50% of the container volume;
(b) being in fluid communication with the first; and
(c) extending from proximate the at least one extremity to proximate the inner end of the first port in order to be able to place the at least one extremity in fluid communication with the first port, in any orientation of the container, and at substantially any stage of liquid fuel depletion, to permit liquid fuel located proximate the at least one extremity to be wicked to the first port.

2. The liquid fuel reservoir of claim 1, wherein the solid wicking structure volume is no more than 40% of the container volume.

3. The liquid fuel reservoir of claim 2, wherein the solid wicking structure volume is less than 20% of the container volume.

4. The liquid fuel reservoir of claim 3, wherein the solid wicking structure volume is less than 10% of the container volume.

5. The liquid fuel reservoir of claim 4, wherein the solid wicking structure volume is no more than 5% of the container volume.

6. The liquid fuel reservoir of claim 5, wherein the solid wicking structure volume is no more than 3% of the container volume.

7. The liquid fuel reservoir of claim 6, wherein the solid wicking structure volume is about 1% of the container volume.

8. The liquid fuel reservoir of claim 1, further comprising a retainer shaped to hold the wicking structure in a desired orientation within the container volume.

9. The liquid fuel reservoir of claim 8, wherein said retainer is shaped to hold at least one portion of the wicking structure proximate the at least one extremity of the container.

10. The liquid fuel reservoir of claim 9, wherein the retainer is perforated.

11. The liquid fuel reservoir of claim 9, wherein the retainer is a screen, a slotted sheet or a perforated sheet.

12. The liquid fuel reservoir of claim 8, wherein the retainer has a solid volume of less than about 10% of the container volume.

13. The liquid fuel reservoir of claim 12, wherein the retainer has a solid volume of less than about 5% of the container volume.

14. The liquid fuel reservoir of claim 13, wherein the retainer has a solid volume of about 1% of the container volume.

15. The liquid fuel reservoir of claim 1, wherein the walls of the container comprise at least a proximal wall through which the first extends, a distal wall remote from the first, and a side wall, and the wicking structure contacts at least one portion of an inner surface of the distal wall of the container.

16. The liquid fuel reservoir of claim 15, wherein the wicking structure further contacts at least one portion of an inner surface of the side wall of the container.

17. The liquid fuel reservoir of claim 16, wherein the wicking structure further contacts at least one portion of an inner surface of the proximal wall of the container.

18. The liquid fuel reservoir of claim 15, wherein the wicking structure further contacts at least one portion of an inner surface of the proximal wall of the container.

19. The liquid fuel reservoir of claim 9, wherein the walls of the container comprise at least a proximal wall through which the first port enters, a distal wall remote from the first port, and a side wall, and the retainer holds the wicking structure in an orientation such that the wicking structure contacts at least one portion of an inner surface of the distal wall of the container.

20. The liquid fuel reservoir of claim 19, wherein the retainer holds the wicking structure in an orientation such that the wicking structure further contacts at least one portion of an inner surface of the side wall of the container.

21. The liquid fuel reservoir of claim 20, wherein the retainer holds the wicking structure in an orientation such that the wicking structure further contacts at least one portion of an inner surface of the proximal wall of the container.

22. The liquid fuel reservoir of claim 19, wherein the retainer holds the wicking structure in an orientation such that the wicking structure further contacts at least one portion of an inner surface of the proximal wall of the container.

23. The liquid fuel reservoir of claim 8, wherein the wicking structure is mounted over at least one portion of the retainer.

24. The liquid fuel reservoir of claim 23, wherein the retainer is attached to a cap that engages a distal end of the container.

25. The liquid fuel reservoir of claim 24, wherein the wicking structure is slidably insertable into the volume of the container.

26. The liquid fuel reservoir of claim 8, wherein the retainer comprises a connector extending from the inner surface of a distal or side wall of the container, said connector gripping a portion of the wicking structure to hold it in position within the container.

27. The liquid fuel reservoir of claim 26, wherein the connector is a clamp, a combination of clamps, a toothed edge or a VELCRO nub.

28. The liquid fuel reservoir of claim 1, wherein the wicking structure is connected to the container by heat sealing, ultrasonic welding, adhesive or being molded in place via injection molding.

29. The liquid fuel reservoir of claim 1, wherein the wicking structure comprises a wicking structure material, and wherein said wicking structure material is selected from the group consisting of foams, bundled fibers, matted fibers, nonwoven fibers, woven fibers, needled fibers, porous polymers, Porex, and inorganic porous materials.

30. The liquid fuel reservoir of claim 29, wherein said wicking structure material is selected from the group consisting of foams, bundled fibers, matted fibers, needled fibers, nonwoven fibers, woven fibers, and porous polymers made by compressing polymer beads.

31. The liquid fuel reservoir of claim 30, wherein the wicking structure material is selected from the group consisting of polyurethane foam, melamine foam, polyvinyl alcohol foam, nonwoven felts of polyamide, polypropylene, polyethylene, polyester, cellulose, modified cellulose, polyacrylonitrile, or mixtures thereof, and bundled, matted, needled or woven fibers of cellulose, modified cellulose, polyester, polypropylene, polyethylene, polyacrylonitrile, or mixtures thereof.

32. The liquid fuel reservoir of claim 31, wherein the wicking structure material is a polyurethane foam.

33. The liquid fuel reservoir of claim 32, wherein the wicking structure material is a polyurethane foam having a density in the range of about 0.5 to about 45 pounds per cubic foot, and pore sizes in the range of about 10 to about 200 pores per linear inch.

34. The liquid fuel reservoir of claim 33, wherein the wicking structure material is a polyurethane foam having a density in the range of about 0.5 to about 25 pounds per cubic foot, and pore sizes in the range of about 10 to about 200 pores per linear inch.

35. The liquid fuel reservoir of claim 34, wherein the wicking structure material is a polyurethane foam having a density in the range of about 0.5 to about 15 pounds per cubic foot, and pore sizes in the range of about 40 to about 200 pores per linear inch.

36. The liquid fuel reservoir of claim 35, wherein the wicking structure material is a polyurethane foam having a density in the range of about 0.5 to about 10 pounds per cubic foot, and pore sizes in the range of about 75 to about 200 pores per linear inch.

37. The liquid fuel reservoir of claim 32, wherein the wicking structure material is selected from the group consisting of a felted polyurethane foam, reticulated polyurethane foam, and felted reticulated polyurethane foam.

38. The liquid fuel reservoir of claim 37, wherein the wicking structure material is a felted polyurethane foam or felted reticulated polyurethane foam having a density in the range of about 1.5 to about 60 pounds per cubic foot, prepared with a compression ratio in the range of 1.1 to 30.

39. The liquid fuel reservoir of claim 1, further comprising a liquid delivery means in communication with the first port for delivering the liquid fuel out of the container through the first port.

40. The liquid fuel reservoir of claim 39, wherein the liquid delivery means is a pump.

41. The liquid fuel reservoir of claim 1, further comprising an inlet through a wall of the container, said inlet having a one-way valve to permit gas flow into the container volume and prevent liquid flow out of the container volume.

42. The liquid fuel reservoir of claim 41, further comprising a sealable, detachable cap that can be attached to an end of the first port exterior to the container to make the reservoir recyclable.

43. The liquid fuel reservoir of claim 42, wherein the cap comprises a membrane for the introduction of a liquid fuel into the container volume when the membrane is punctured with a needle, wherein the membrane is self-sealable after the needle is removed.

44. The liquid fuel reservoir of claim 41, further comprising a two-way valve in the first port for the introduction of a liquid fuel into the container volume to make the reservoir recyclable.

45. The liquid fuel reservoir of claim 1, wherein the container volume has a longest dimension, and wherein the wicking structure is capable of wicking the liquid fuel with a free rise wick height of at least one half of the longest dimension.

46. The liquid fuel reservoir of claim 45, wherein the wicking structure is capable of wicking the liquid fuel with a free rise wick height of at least the longest dimension.

47. The liquid fuel reservoir of claim 45, further comprising a retainer shaped to hold the wicking structure in a desired orientation within the container volume.

48. The liquid fuel reservoir of claim 47, wherein said retainer is shaped to hold at least one portion of the wicking structure proximate the at least one extremity of the container.

49. The liquid fuel reservoir of claim 48, wherein the retainer is perforated.

50. The liquid fuel reservoir of claim 48, wherein the retainer is a screen, a slotted sheet or a perforated sheet.

51. The liquid fuel reservoir of claim 47, wherein the retainer has a solid volume of less than about 10% of the container volume.

52. The liquid fuel reservoir of claim 45, wherein the walls of the container comprise at least a proximal wall through which the first port enters, a distal wall remote from the first port, and a side wall, and the wicking structure contacts at least one portion of an inner surface of the distal wall of the container.

53. The liquid fuel reservoir of claim 52, wherein the wicking structure further contacts at least one portion of an inner surface of the side wall of the container.

54. The liquid fuel reservoir of claim 53, wherein the wicking structure further contacts at least one portion of an inner surface of the proximal wall of the container.

55. The liquid fuel reservoir of claim 52, wherein the wicking structure further contacts at least one portion of an inner surface of the proximal wall of the container.

56. The liquid fuel reservoir of claim 47, wherein the wicking structure is mounted over at least one portion of the retainer.

57. The liquid fuel reservoir of claim 56, wherein the retainer is attached to a cap that engages a distal end of the container.

58. The liquid fuel reservoir of claim 57, wherein the wicking structure is slidably insertable into the container volume.

59. The liquid fuel reservoir of claim 45, wherein the wicking structure comprises a wicking structure material, and wherein said wicking structure material is selected from the group consisting of foams, bundled fibers, matted fibers, nonwoven fibers, woven fibers, needled fibers, porous polymers, Porex, and inorganic porous materials.

60. The liquid fuel reservoir of claim 59, wherein said wicking structure material is selected from the group consisting of foams, bundled fibers, matted fibers, needled fibers, nonwoven fibers, woven fibers, and porous polymers.

61. The liquid fuel reservoir of claim 60, wherein the wicking structure material is selected from the group consisting of polyurethane foam, melamine foam, polyvinyl alcohol foam, nonwoven felts of polyamide, polypropylene, polyethylene, polyester, cellulose, modified cellulose, polyacrylonitrile, or mixtures thereof, and bundled, matted, needled or woven fibers of cellulose, modified cellulose, polyester, polypropylene, polyethylene, polyacrylonitrile, or mixtures thereof.

62. The liquid fuel reservoir of claim 61, wherein the wicking structure material is a polyurethane foam.

63. The liquid fuel reservoir of claim 62, wherein the wicking structure material is selected from the group consisting of a felted polyurethane foam, reticulated polyurethane foam, and felted reticulated polyurethane foam.

64. The liquid fuel reservoir of claim 45, further comprising a liquid delivery means in communication with the first port for delivering the liquid fuel out of the container through the first port.

65. The liquid fuel reservoir of claim 64, wherein the liquid delivery means is a pump.

66. The liquid fuel reservoir of claim 45, further comprising an inlet through a wall of the container, said inlet having a one-way valve to permit gas flow into the container volume and prevent liquid flow out of the container volume.

67. The liquid fuel reservoir of claim 66, further comprising a sealable, removable cap that can be attached to an end of the first port exterior to the container to make the reservoir recyclable.

68. The liquid fuel reservoir of claim 67, wherein the cap comprises a membrane for the introduction of a liquid fuel into the container volume upon puncturing the membrane with a needle, wherein the membrane is self-sealable after the needle is removed.

69. The liquid fuel reservoir of claim 66, further comprising a two-way valve in the first port for the introduction of a liquid fuel into the container volume to make the reservoir recyclable.

70. The liquid fuel reservoir of claim 1, wherein the wicking structure has an external volume of no more than about 50% of the container volume.

71. The liquid fuel reservoir of claim 70, wherein the wicking structure has an external volume of no more than about 25% of the container volume.

72. The liquid fuel reservoir of claim 71, wherein the wicking structure has an external volume of no more than about 10% of the container volume.

73. The liquid fuel reservoir of claim 1, having a liquid fuel delivery efficiency of at least 90%.

74. The liquid fuel reservoir of claim 1, wherein the container has extremities remote from the first port, the wicking structure extending proximate the extremities to place the extremities in fluid communication with the first port, in any orientation of the container, and at substantially any stage of liquid fuel depletion, to permit liquid fuel located proximate the extremities to be wicked to the first port.

75. The liquid fuel reservoir of claim 74, further comprising a retainer inside the container to hold the wicking structure in a desired orientation within the container volume.

76. The liquid fuel reservoir of claim 75, wherein the retainer is perforated.

77. The liquid fuel reservoir of claim 75, wherein the retainer has a solid volume of no more than about 10% of the container volume.

78. The liquid fuel reservoir of claim 74, wherein the walls of the container comprise at least a proximal wall through which the first port enters, a distal wall remote from the first port, and a side wall, and the wicking structure contacts at least one portion of an inner surface of the distal wall of the container.

79. The liquid fuel reservoir of claim 78, wherein the wicking structure further contacts at least one portion of an inner surface of the side wall of the container.

80. The liquid fuel reservoir of claim 79, wherein the wicking structure further contacts at least one portion of an inner surface of the proximal wall of the container.

81. The liquid fuel reservoir of claim 78, wherein the wicking structure further contacts at least one portion of an inner surface of the proximal wall of the container.

82. The liquid fuel reservoir of claim 74, wherein the wicking structure comprises a wicking structure material, and wherein said wicking structure material is selected from the group consisting of foams, bundled fibers, matted fibers, nonwoven fibers, woven fibers, needled fibers, porous polymers, Porex, and inorganic porous materials.

83. The liquid fuel reservoir of claim 82, wherein said wicking structure material is selected from the group consisting of foams, bundled fibers, matted fibers, needled fibers, nonwoven fibers, woven fibers, and porous polymers.

84. The liquid fuel reservoir of claim 83, wherein the wicking structure material is selected from the group consisting of polyurethane foam, melamine foam, polyvinyl alcohol foam, nonwoven felts of polyamide, polypropylene, polyethylene, polyester, cellulose, modified cellulose, polyacrylonitrile, or mixtures thereof, bundled, matted, needled or woven fibers of cellulose, modified cellulose, polyester, polypropylene, polyethylene, polyacrylonitrile, or mixtures thereof.

85. The liquid fuel reservoir of claim 84, wherein the wicking structure material is a polyurethane foam.

86. The liquid fuel reservoir of claim 85, wherein the wicking structure material is selected from the group consisting of a felted polyurethane foam, reticulated polyurethane foam, and felted reticulated polyurethane foam.

87. The liquid fuel reservoir of claim 74, further comprising a liquid delivery means in communication with the first port to deliver the liquid fuel out of the container through the first port.

88. The liquid fuel reservoir of claim 87, wherein the liquid delivery means is a pump.

89. The liquid fuel reservoir of claim 74, further comprising an inlet through a wall of the container, said inlet having a one-way valve to permit gas flow into the container volume and prevent liquid flow out of the container volume.

90. The liquid fuel reservoir of claim 89, further comprising a sealable, removable cap that can be attached to an end of the first port exterior to the container to make the reservoir recyclable.

91. The liquid fuel reservoir of claim 90, wherein the cap comprises a membrane for the introduction of a liquid fuel into the container volume upon puncturing the membrane with a needle; wherein the membrane is self-sealable after the needle is removed.

92. The liquid fuel reservoir of claim 89, further comprising a two-way valve in the first port for the introduction of a liquid fuel into the container volume to make the reservoir recyclable.

93. The liquid fuel reservoir of claim 74, having a liquid fuel delivery efficiency of at least 90%.

94. The liquid fuel reservoir of claim 15, wherein the at least one portion of the inner surface of the distal wall of the container is proximate an extremity of the container volume.

95. The liquid fuel reservoir of claim 94, wherein the wicking structure contacts substantially an entire inner surface of the distal wall of the container.

96. The liquid fuel reservoir of claim 16, wherein the at least one portion of the inner surface of the side wall of the container is proximate an extremity of the container volume.

97. The liquid fuel reservoir of claim 96, wherein the wicking structure contacts substantially an entire inner surface of the side wall of the container.

98. The liquid fuel reservoir of claim 19, wherein the at least one portion of the inner surface of the distal wall of the container is proximate an extremity of the container volume.

99. The liquid fuel reservoir of claim 98, wherein the wicking structure contacts substantially an entire inner surface of the distal wall of the container.

100. The liquid fuel reservoir of claim 20, wherein the at least one portion of the inner surface of the side wall of the container is proximate an extremity of the container volume.

101. The liquid fuel reservoir of claim 100, wherein the wicking structure contacts substantially an entire inner surface of the side wall of the container.

102. The liquid fuel reservoir of claim 52, wherein the at least one portion of the inner surface of the distal wall of the container is proximate an extremity of the container volume.

103. The liquid fuel reservoir of claim 102, wherein the wicking structure contacts substantially an entire inner surface of the distal wall of the container.

104. The liquid fuel reservoir of claim 53, wherein the at least one portion of the inner surface of the side wall of the container is proximate an extremity of the container volume.

105. The liquid fuel reservoir of claim 104, wherein the wicking structure contacts substantially an entire inner surface of the side wall of the container.

106. The liquid fuel reservoir of claim 78, wherein the at least one portion of the inner surface of the distal wall of the container is proximate an extremity of the container volume.

107. The liquid fuel reservoir of claim 106, wherein the wicking structure contacts substantially an entire inner surface of the distal wall of the container.

108. The liquid fuel reservoir of claim 79, wherein the at least one portion of the inner surface of the side wall of the container is proximate an extremity of the container volume.

109. The liquid fuel reservoir of claim 108, wherein the wicking structure contacts substantially an entire inner surface of the side wall of the container.

110. The liquid fuel reservoir of claim 74, wherein the wicking structure contacts inner surfaces of the extremities of the container to place every extremity of the container in fluid communication with the first port.

111. The liquid fuel reservoir of claim 74, wherein the container volume has a longest dimension, and wherein the wicking structure is capable of wicking the liquid fuel with a free rise wick height of at least one half of the longest dimension.

112. The liquid fuel reservoir of claim 111, wherein the wicking structure is capable of wicking the liquid fuel with a free rise wick height of at least the longest dimension.

113. The liquid fuel reservoir of claim 112, wherein the solid wicking structure volume is no more than 40% of the container volume.

114. The liquid fuel reservoir of claim 113, wherein the solid wicking structure volume is less than 20% of the container volume.

115. The liquid fuel reservoir of claim 114, wherein the solid wicking structure volume is less than 10% of the container volume.

116. The liquid fuel reservoir of claim 115, wherein the solid wicking structure volume is no more than 5% of the container volume.

117. The liquid fuel reservoir of claim 116, wherein the solid wicking structure volume is no more than 3% of the container volume.

118. The liquid fuel reservoir of claim 117, wherein the solid wicking structure volume is about 1% of the container volume.

119. The liquid fuel reservoir of claim 112, further comprising a retainer shaped to hold the wicking structure in a desired orientation within the container volume.

120. The liquid fuel reservoir of claim 112, wherein the walls of the container comprise at least a proximal wall through which the first port extends, a distal wall remote from the first port, and a side wall, and the wicking structure contacts at least one portion of an inner surface of the distal wall of the container.

121. The liquid fuel reservoir of claim 120, wherein the wicking structure further contacts at least one portion of an inner surface of the side wall of the container.

122. The liquid fuel reservoir of claim 121, wherein the wicking structure further contacts at least one portion of an inner surface of the proximal wall of the container.

123. The liquid fuel reservoir of claim 120, wherein the wicking structure further contacts at least one portion of an inner surface of the proximal wall of the container.

124. The liquid fuel reservoir of claim 112, wherein the wicking structure contacts inner surfaces of the extremities of the container to place every extremity of the container in fluid communication with the first port.

125. The liquid fuel reservoir of claim 1, wherein the walls of the container are made of a flexible material so that the walls are collapsible.

126. The liquid fuel reservoir of claim 15, wherein the walls of the container are made of a flexible material so that the walls are collapsible.

127. The liquid fuel reservoir of claim 45, wherein the walls of the container are made of a flexible material so that the walls are collapsible.

128. The liquid fuel reservoir of claim 74, wherein the walls of the container are made of a flexible material so that the walls are collapsible.

129. The liquid fuel reservoir of claim 74, wherein the container has a rectangular or square cross section, a rectangular or square shape viewed from the front, and six walls with opposite top and bottom walls, opposite first and second side walls, and opposite front and back walls, the wicking structure comprising substantially parallel first and second vertical members each having first and second ends and a horizontal member connected to the first ends of the vertical members proximate junctions of the top wall and the two side walls, the second ends of the vertical members being proximate junctions of the bottom wall and the two side walls, the first vertical member contacting substantially an entire inner surface of the first side wall, the second vertical member contacting substantially an entire inner surface of the second side wall, the horizontal member contacting substantially an entire inner surface of the top wall, the wicking structure having a thickness extending substantially from the front wall to the back wall, wherein a central portion of the container volume substantially lacks any portion of the wicking structure, and wherein the first port is in fluid communication with the wicking structure and extends through a wall of the container.

130. The liquid fuel reservoir of claim 129, further comprising a retainer inside the container holding the wicking structure in a desired orientation.

131. The liquid fuel reservoir of claim 130, wherein the container volume comprises a longest dimension, the wicking material being a polyurethane foam having a free rise wick height of at least one half the longest dimension for the liquid fuel.

132. The liquid fuel reservoir of claim 131, wherein the polyurethane foam has a free rise wick height of at least the longest dimension for the liquid fuel.

133. The liquid fuel reservoir of claim 132, wherein the wicking structure material is selected from the group consisting of a felted polyurethane foam, reticulated polyurethane foam, and felted reticulated polyurethane foam.

134. The liquid fuel reservoir of claim 132, further comprising a liquid delivery means in communication with the first port to deliver the liquid fuel out of the container through the first port.

135. The liquid fuel reservoir of claim 134, wherein the liquid delivery means is a pump.

136. The liquid fuel reservoir of claim 132, further comprising an inlet through a wall of the container, said inlet having a one-way valve to permit gas flow into the container volume and prevent liquid flow out of the container volume.

137. The liquid fuel reservoir of claim 74, wherein the container has a rectangular or square cross section, a rectangular or square shape viewed from the front, and six walls with opposite top and bottom walls, opposite first and second side walls, and opposite front and back walls, the wicking structure resembling the shape of an alphabet letter "H" viewed from the front and comprising substantially parallel first and second vertical members each having first and second ends and a horizontal member connected to the vertical member distant from the first and second ends, the first ends of the vertical members being proximate junctions of the top wall and the two side walls, the second ends of the vertical members being proximate junctions of the bottom wall and the two side walls, the first vertical member contacting substantially an entire inner surface of the first side wall, the second vertical member contacting substantially an entire inner surface of the second side wall, the horizontal member extending through the container volume, the wicking structure having a thickness extending substantially from the front wall to the back wall, wherein a central portion of the container volume substantially lacks any portion of the wicking structure except the horizontal member, and wherein the first port is in fluid communication with the wicking structure via one of the vertical members and extends through a wall of the container.

138. The liquid fuel reservoir of claim 137, further comprising a retainer inside the container holding the wicking structure in a desired orientation.

139. The liquid fuel reservoir of claim 137, wherein the container volume comprises a longest dimension, the wicking material being a polyurethane foam having a free rise wick height of at least one half the longest dimension for the liquid fuel.

140. The liquid fuel reservoir of claim 139, wherein the polyurethane foam has a free rise wick height of at least the longest dimension for the liquid fuel.

141. The liquid fuel reservoir of claim 140, wherein the wicking structure material is selected from the group consisting of a felted polyurethane foam, reticulated polyurethane foam, and felted reticulated polyurethane foam.

142. The liquid fuel reservoir of claim 140, further comprising a liquid delivery means in communication with the first port to deliver the liquid fuel out of the container through the first port.

143. The liquid fuel reservoir of claim 142, wherein the liquid delivery means is a pump.

144. The liquid fuel reservoir of claim 140, further comprising an inlet through a wall of the container, said inlet having a one-way valve to permit gas flow into the container volume and prevent liquid flow out of the container volume.

145. The liquid fuel reservoir of claim 74, wherein the container has a rectangular or square cross section, a rectangular or square shape viewed from the front, and six walls with opposite top and bottom walls, opposite first and second side walls, and opposite front and back walls, the wicking structure resembling the shape of an alphabet letter "K" viewed from the front and comprising a vertical member having two ends and first and second slanted members each having first and second ends, the first ends of the first and second slanted members being connected to the vertical member at the same location distant from the two ends of the first member, the vertical member contacting substantially an entire inner surface of the first side wall, the first slanted member extending across the container volume such that the second end of the first slanted member being proximate a corner formed by the top wall and second side wall, the second slanted member extending across the container volume such that the second end of the second slanted member being proximate a corner formed by the bottom wall and second side wall, the wicking structure having a thickness extending substantially from the front wall to the back wall, wherein a central portion of the container volume substantially lacks any portion of the wicking structure except potions of the slanted members, and wherein the first port is in fluid communication with the wicking structure via the vertical member and extends through a wall of the container.

146. The liquid fuel reservoir of claim 145, further comprising a retainer inside the container holding the wicking structure in a desired orientation.

147. The liquid fuel reservoir of claim 145, wherein the container volume comprises a longest dimension, the wicking material being a polyurethane foam having a free rise wick height of at least one half the longest dimension for the liquid fuel.

148. The liquid fuel reservoir of claim 147, wherein the polyurethane foam has a free rise wick height of at least the longest dimension for the liquid fuel.

149. The liquid fuel reservoir of claim 148, wherein the wicking structure material is selected from the group consisting of a felted polyurethane foam, reticulated polyurethane foam, and felted reticulated polyurethane foam.

150. The liquid fuel reservoir of claim 148, further comprising a liquid delivery means in communication with the first port to deliver the liquid fuel out of the container through the first port.

151. The liquid fuel reservoir of claim 150, wherein the liquid delivery means is a pump.

152. The liquid fuel reservoir of claim 148, further comprising an inlet through a wall of the container, said inlet having a one-way valve to permit gas flow into the container volume and prevent liquid flow out of the container volume.

153. The liquid fuel reservoir of claim 74, wherein the container has a rectangular or square cross section, a rectangular or square shape viewed from the front, and six walls with opposite top and bottom walls, opposite first and second side walls, and opposite front and back walls, the wicking structure resembling the shape of an alphabet letter "K" turned 90. degree. when viewed from the front and comprising a horizontal member having two ends and first and second slanted members each having first and second ends, the first ends of the first and second slanted members being connected to the horizontal member at a location distant from the two ends of the horizontal member, the horizontal member contacting substantially an entire inner surface of the top wall, the first slanted member extending across the container volume such that the second end of the first slanted member being proximate a corner formed by the bottom wall and first side wall, the second slanted member extending across the container volume such that the second end of the second slanted member being proximate a corner formed by the bottom wall and second side wall, the wicking structure having a thickness extending substantially from the front wall to the back wall, wherein a central portion of the container volume substantially lacks any portion of the wicking structure except portions of the slanted members, and wherein the first port is in fluid communication with the wicking structure via the horizontal member and extends through a wall of the container.

154. The liquid fuel reservoir of claim 74, wherein the container has a rectangular or square cross section, a rectangular or square shape viewed from the front, and six walls with opposite top and bottom walls, opposite first and second side walls, and opposite front and back walls, the wicking structure resembling the shape of a symbol "Tr" turned 90.degree. when viewed from the front and comprising a vertical member having top and bottom ends and first and second slanted members each having first and second ends, the vertical member contacting substantially an entire inner surface of the first side wall with the top end of the vertical member proximate a corner formed by the top and first side wall and with the bottom end of the vertical member proximate a corner formed by the bottom and first side wall, the first end of the first slanted member being connected to the vertical member at a location distant from the top end of the vertical member, the first end of the second slanted member being connected to the vertical member at a location between the bottom end of the vertical member and the junction of the first slanted member and the vertical member, the first slanted member extending across the container volume such that the second end of the first slanted member being proximate a corner formed by the top wall and second side wall, the second slanted member extending across the container volume such that the second end of the second slanted member being proximate a corner formed by the bottom wall and second side wall, the wicking structure having a thickness extending substantially from the front wall to the back wall, wherein a central portion of the container volume substantially lacks any portion of the wicking structure, and wherein the first port is in fluid communication with the wicking structure via the vertical member and extends through a wall of the container.

155. The liquid fuel reservoir of claim 74, wherein the container has a rectangular or square cross section, a rectangular or square shape viewed from the front, and six walls with opposite top and bottom walls, opposite first and second side walls, and opposite front and back walls, the wicking structure resembling the shape of a symbol "Tr" when viewed from the front and comprising a horizontal member having first and second ends and first and second slanted members each having first and second ends, the horizontal member contacting substantially an entire inner surface of the top wall with the first end of the horizontal member proximate a corner formed by the top and first side wall and with the second end of the vertical member proximate a corner formed by the top and second side wall, the first end of the first slanted member being connected to the horizontal member at a location distant from the first end of the vertical member, the first end of the second slanted member being connected to the horizontal member at a location between the second end of the horizontal member and the junction of the first slanted member and the horizontal member, the first slanted member extending across the container volume such that the second end of the first slanted member being proximate a corner formed by the bottom wall and first side wall, the second slanted member extending across the container volume such that the second end of the second slanted member being proximate a corner formed by the bottom wall and second side wall, the wicking structure having a thickness extending substantially from the front wall to the back wall, wherein a central portion of the container volume substantially lacks any portion of the wicking structure, and wherein the first port is in fluid communication with the wicking structure via the horizontal member and extends through a wall of the container.

156. The liquid fuel reservoir of claim 74, wherein the container has a rectangular or square cross section, a rectangular or square shape viewed from the front, and six walls with opposite top and bottom walls, opposite first and second side walls, and opposite front and back walls, the wicking structure resembling the shape of an alphabet letter "X" viewed from the front and comprising first and second slanted members each having top and bottom ends, the first and second slanted members being connected at a location distant from the two ends, the top end of the first slanted member proximate a corner formed by the top and first side wall of the container, the first slanted member extending diagonally across the container volume such that the bottom end of the first slanted member being proximate a corner formed by the bottom wall and second side wall, the top end of the second slanted member proximate a corner formed by the top wall and second side wall of the container, the second slanted member extending diagonally across the container volume such that the bottom end of the second slanted member being proximate a corner formed by the bottom wall and first side wall of the container, the wicking structure having a thickness extending substantially from the front wall to the back wall, wherein a central portion of the container volume substantially lacks any portion of the wicking structure except potions of the slanted members.

157. The liquid fuel reservoir of claim 156, wherein the first port is in fluid communication with the wicking structure via a location proximate a junction of the first and second slanted members and extends through the front or back wall of the container.

158. The liquid fuel reservoir of claim 156, further comprising a retainer inside the container holding the wicking structure in a desired orientation.

159. The liquid fuel reservoir of claim 158, wherein the container volume comprises a longest dimension, the wicking material being a polyurethane foam having a free rise wick height of at least one half the longest dimension for the liquid fuel.

160. The liquid fuel reservoir of claim 156, wherein the container volume comprises a longest dimension, the wicking material being a polyurethane foam having a free rise wick height of at least the longest dimension for the liquid fuel.

161. The liquid fuel reservoir of claim 159, wherein the wicking structure material is selected from the group consisting of a felted polyurethane foam, reticulated polyurethane foam, and felted reticulated polyurethane foam.

162. The liquid fuel reservoir of claim 156, further comprising a liquid delivery means in communication with the first port to deliver the liquid fuel out of the container through the first port.

163. The liquid fuel reservoir of claim 162, wherein the liquid delivery means is a pump.

164. The liquid fuel reservoir of claim 156, further comprising an inlet through a wall of the container, said inlet having a one-way valve to permit gas flow into the container volume and prevent liquid flow out of the container volume.

165. The liquid fuel reservoir of claim 74, wherein the container has a rectangular or square cross section, a rectangular or square shape viewed from the front, and six walls with opposite top and bottom walls, opposite first and second side walls, and opposite front and back walls, the wicking structure resembling an alphabet letter "E" turned 90.degree. when viewed from the front and comprising substantially parallel first, second and third vertical members each having first and second ends and a horizontal member having first and second ends the first end of the first vertical member being connected to the first end of the horizontal member proximate a junction of the top and the first side wall, the first end of the third vertical member being connected to the second end of the horizontal member proximate a junction of the top wall and the second side wall, the first end of the second vertical member being connected to the horizontal member at a location between the two ends of the horizontal member, the second end of the first vertical member being proximate a junction of the bottom wall and the first side walls, the second end of the third vertical member being proximate a junction of the bottom wall and the second side walls, the second end of the second vertical member being proximate the bottom wall, the first vertical member contacting substantially an entire inner surface of the first side wall, the third vertical member contacting substantially an entire inner surface of the second side wall, the horizontal member contacting substantially an entire inner surface of the top wall, the wicking structure having a thickness extending substantially from the front wall to the back wall, wherein a central portion of the container volume substantially lacks any portion of the wicking structure except a portion of the second vertical member, and wherein the first port is in fluid communication with the wicking structure and extends through a wall of the container.

166. The liquid fuel reservoir of claim 165, further comprising a retainer inside the container holding the wicking structure in a desired orientation.

167. The liquid fuel reservoir of claim 165, wherein the container volume comprises a longest dimension, the wicking material being a polyurethane foam having a free rise wick height of at least one half the longest dimension for the liquid fuel.

168. The liquid fuel reservoir of claim 167, wherein the polyurethane foam has a free rise wick height of at least the longest dimension for the liquid fuel.

169. The liquid fuel reservoir of claim 167, wherein the wicking structure material is selected from the group consisting of a felted polyurethane foam, reticulated polyurethane foam, and felted reticulated polyurethane foam.

170. The liquid fuel reservoir of claim 165, further comprising a liquid delivery means in communication with the first port to deliver the liquid fuel out of the container through the first port.

171. The liquid fuel reservoir of claim 170, wherein the liquid delivery means is a pump.

172. The liquid fuel reservoir of claim 165, further comprising an inlet through a wall of the container, said inlet having a one-way valve to permit gas flow into the container volume and prevent liquid flow out of the container volume.

173. The liquid fuel reservoir of claim 38, wherein the wicking structure material is a felted polyurethane foam or felted reticulated polyurethane foam having a density in the range of about 3 to about 40 pounds per cubic foot, prepared with a compression ratio in the range of 1.5 to 20.

174. The liquid fuel reservoir of claim 73, wherein the wicking structure material is a felted polyurethane foam or felted reticulated polyurethane foam having a density in the range of about 3 to about 10 pounds per cubic foot, prepared with a compression ratio in the range of 3 to 30.

175. The liquid fuel reservoir of claim 1, wherein the wicking structure material is perforated.

176. The liquid fuel reservoir of claim 175, wherein at least one external surface of the wicking structure material is proximate at least a wall of the container, said wicking structure material being perforated except in a portion of the wicking structure material proximate the at least one external surface.

177. The liquid fuel reservoir of claim 175, wherein at least one external surface of the wicking structure material is proximate at least a wall of the container, said wicking structure material being perforated except in a portion of the wicking structure material extending from the at least one external surface to a depth of about 20% of a thickness of the wicking structure material locally, wherein the thickness locally is the length of a first imaginary line perpendicular to a second imaginary line tangential to the at least one external surface of the wicking structure locally, which first imaginary line starts at the at least one external surface, extends through the wicking structure material and ends at where the first imaginary line meets an external surface of the wicking structure material opposite to the at least one external surface.

178. The liquid fuel reservoir of claim 177, wherein said wicking structure material is perforated except in a portion of the wicking structure material extending from the at least one external surface to a depth of about 10% of the thickness of the wicking structure material locally.

179. The liquid fuel reservoir of claim 178, wherein said wicking structure material is perforated except in a portion of the wicking structure material extending from the at least one external surface to a depth of about 5% of the thickness of the wicking structure material locally.

180. The liquid fuel reservoir of claim 1, wherein the wicking structure has substantially no wicking structure material in the central portion of the volume within the container.

181. The liquid fuel reservoir of claim 180, wherein the central portion of the volume within the container is the inner 70% of the volume within the container.

182. The liquid fuel reservoir of claim 181, wherein the central portion of the volume within the container is the inner 80% of the volume within the container.

183. The liquid fuel reservoir of claim 182, wherein the central portion of the volume within the container is the inner 90% of the volume within the container.

184. The liquid fuel reservoir of claim 183, wherein the central portion of the volume within the container is the inner 95% of the volume within the container.

185. A liquid fuel reservoir for a liquid fuel cell, said liquid fuel reservoir comprising a container comprising walls defining a container volume capable of holding a liquid fuel, a first port through a wall of the container capable of discharging the liquid fuel to a location exterior of the container volume, a second port which penetrates a wall of the container, at least one extremity remote from the first port, and a pressurized pallet or bladder, wherein the first port has inner and outer ends and wherein the pressurized pallet or bladder is connected to the second port, which port allows a fluid to be introduced into the pressurized pallet or bladder; and p1 a wicking structure within the container volume and into which the liquid fuel can wick by capillary action and from which the liquid fuel may subsequently be discharged, the wicking structure (a) having a solid wicking structure volume which is no more than 50% of the container volume;

(b) being in fluid communication with the first; and (c) extending from proximate the at least one extremity to proximate the inner end of the first port in order to be able to place the at least one extremity in fluid communication with the first port, in any orientation of the container, and at substantially any stage of liquid fuel depletion, to permit liquid fuel located proximate the at least one extremity to be wicked to the first port.

186. The liquid fuel reservoir of claim 185, wherein the fluid introduced into the pressurized pallet or bladder is a pressurized fluid.

187. The liquid fuel reservoir of claim 186, wherein the pressurized fluid is a pressurized gas.

188. The liquid fuel reservoir of claim 185, wherein the pressurized pallet or bladder comprises a compressible porous material and a wall impermeable to a liquid fuel.

189. The liquid fuel reservoir of claim 188, wherein the compressible porous material is of a volume, when at a relaxed state, that is larger than the container volume.

190. The liquid fuel reservoir of claim 189, wherein the wall of the pressurized pallet or bladder is impermeable to a spent fuel or byproduct of a liquid fuel cell, and wherein the fluid introduced into the pressurized pallet or bladder is the spent fuel or byproduct.

191. The liquid fuel reservoir of claim 188, wherein the container further comprises a third port through at least one wall of the container for introducing a liquid fuel into the container volume.

192. The liquid fuel reservoir of claim 188, wherein the first port has a valve.

193. The liquid fuel reservoir of claim 188, wherein the pressurized pallet or bladder further comprises a flexible membrane covering a portion of the compressible porous material to prevent any direct contact of the compressible porous material with a liquid fuel when the container is filled with the liquid fuel.

194. The liquid fuel reservoir of claim 188, wherein the pressurized pallet or bladder further comprises a coating covering a portion of the compressible porous material to prevent any direct contact of the compressible porous material with a liquid fuel when the container is filled with the liquid fuel.

195. The liquid fuel reservoir of claim 1, wherein the compressible porous material, when at a relaxed state, has a volume, that is larger than the container volume.

196. The liquid fuel reservoir of claim 195, wherein the first port has a valve.

197. The liquid fuel reservoir of claim 196, wherein the pressurized pallet or bladder further comprises a flexible membrane covering a portion of the compressible porous material to prevent any direct contact of the compressible porous material with a liquid fuel when the container is filled with the liquid fuel.

198. The liquid fuel reservoir of claim 196, wherein the pressurized pallet or bladder further comprises a coating covering a portion of the compressible porous material to prevent any direct contact of the compressible porous material with a liquid fuel when the container is filled with the liquid fuel.

199. The reservoir of claim 1 further comprising an impurities scavenger disposed in at least one of:
   a. a filter cartridge connected to the outer end of the outlet;
   b. the outlet; and
   c. at least one porous internal compartment disposed inside the container, said at least one porous internal compartment comprising at least one porous wall enclosing an internal volume holding the impurities scavenger;

wherein said impurities scavenger comprises at least one impurity scavenging substance that can remove at least one impurity in the liquid fuel.

* * * * *